US008684842B2

(12) United States Patent
Takeda et al.

(10) Patent No.: US 8,684,842 B2
(45) Date of Patent: Apr. 1, 2014

(54) DISPLAY DEVICE, GAME SYSTEM, AND GAME PROCESS METHOD

(75) Inventors: Genyo Takeda, Kyoto (JP); Eizi Kawai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/145,690

(22) PCT Filed: Feb. 2, 2011

(86) PCT No.: PCT/JP2011/000566
§ 371 (c)(1),
(2), (4) Date: Dec. 19, 2011

(87) PCT Pub. No.: WO2011/096204
PCT Pub. Date: Aug. 11, 2011

(65) Prior Publication Data
US 2012/0088580 A1    Apr. 12, 2012

(30) Foreign Application Priority Data

| Feb. 3, 2010 | (JP) | 2010-022022 |
| Feb. 3, 2010 | (JP) | 2010-022023 |
| Aug. 6, 2010 | (JP) | 2010-177893 |
| Aug. 20, 2010 | (JP) | 2010-185315 |
| Aug. 30, 2010 | (JP) | 2010-192220 |
| Aug. 30, 2010 | (JP) | 2010-192221 |
| Nov. 1, 2010 | (JP) | 2010-245298 |
| Nov. 1, 2010 | (JP) | 2010-245299 |

(51) Int. Cl.
*A63F 13/00* (2006.01)

(52) U.S. Cl.
USPC .................. 463/39; 463/36; 463/37

(58) Field of Classification Search
USPC ................................. 436/36, 37, 39
See application file for complete search history.

(56) References Cited

U.S. PATENT DOCUMENTS

| 4,210,329 A | 7/1980 | Steiger et al. |
| 5,009,501 A | 4/1991 | Fenner et al. |
| 5,440,326 A | 8/1995 | Quinn |
| 5,452,104 A | 9/1995 | Lee |
| 5,602,566 A | 2/1997 | Motosyuku et al. |

(Continued)

FOREIGN PATENT DOCUMENTS

| CN | 1593709 A | 3/2005 |
| CN | 1868244 A | 11/2006 |

(Continued)

OTHER PUBLICATIONS

Aug. 20, 2012 Notice of Allowance from U.S. Appl. No. 13/208,719.

(Continued)

*Primary Examiner* — James S McClellan
(74) *Attorney, Agent, or Firm* — Nixon & Vanderhye, P.C.

(57) ABSTRACT

A game system includes a home-console type game device, a controller device, and a portable display device. The portable display device includes an infrared light-emitting portion capable of emitting infrared light. The controller device wirelessly transmits to the game device operation date including data representing a detection result by an image-capturing section, data representing a detection result by an inertia sensor, and data representing an operation performed on an operation button. The game device receives the operation data from the controller device, and performs a game process based on the operation data.

15 Claims, 18 Drawing Sheets

(56) References Cited

U.S. PATENT DOCUMENTS

| | | | |
|---|---|---|---|
| 5,608,449 A | 3/1997 | Swafford, Jr. et al. |
| 5,619,397 A | 4/1997 | Honda et al. |
| 5,825,350 A | 10/1998 | Case, Jr. et al. |
| 5,825,352 A | 10/1998 | Bisset et al. |
| 5,943,043 A | 8/1999 | Furuhata et al. |
| 6,020,891 A | 2/2000 | Rekimoto |
| 6,069,790 A | 5/2000 | Howell et al. |
| 6,084,584 A | 7/2000 | Nahi et al. |
| 6,084,594 A | 7/2000 | Goto |
| 6,104,380 A | 8/2000 | Stork et al. |
| 6,126,547 A | 10/2000 | Ishimoto |
| 6,164,808 A | 12/2000 | Shibata et al. |
| 6,183,365 B1 | 2/2001 | Tonomura et al. |
| 6,201,554 B1 | 3/2001 | Lands |
| 6,208,329 B1 | 3/2001 | Ballare |
| 6,238,291 B1 | 5/2001 | Fujimoto et al. |
| 6,252,153 B1 | 6/2001 | Toyama |
| 6,254,481 B1 | 7/2001 | Jaffe |
| 6,323,846 B1 | 11/2001 | Westerman et al. |
| 6,340,957 B1 | 1/2002 | Adler et al. |
| 6,347,290 B1 | 2/2002 | Bartlett |
| 6,379,249 B1 | 4/2002 | Satsukawa et al. |
| 6,396,480 B1 | 5/2002 | Schindler et al. |
| 6,400,376 B1 | 6/2002 | Singh et al. |
| 6,411,275 B1 | 6/2002 | Hedberg |
| 6,425,822 B1 | 7/2002 | Hayashida et al. |
| 6,466,198 B1 | 10/2002 | Feinstein |
| 6,466,831 B1 | 10/2002 | Shibata et al. |
| 6,498,860 B1 * | 12/2002 | Sasaki et al. ............... 382/103 |
| 6,500,070 B1 | 12/2002 | Tomizawa et al. |
| 6,509,896 B1 | 1/2003 | Saikawa et al. |
| 6,538,636 B1 | 3/2003 | Harrison |
| 6,540,610 B2 | 4/2003 | Chatani |
| 6,540,614 B1 | 4/2003 | Nishino et al. |
| 6,557,001 B1 | 4/2003 | Dvir et al. |
| 6,567,068 B2 | 5/2003 | Rekimoto |
| 6,567,101 B1 | 5/2003 | Thomas |
| 6,567,984 B1 | 5/2003 | Allport |
| 6,570,557 B1 | 5/2003 | Westerman et al. |
| 6,582,299 B1 | 6/2003 | Matsuyama et al. |
| 6,657,627 B1 | 12/2003 | Wada et al. |
| 6,690,358 B2 | 2/2004 | Kaplan |
| 6,716,103 B1 | 4/2004 | Eck et al. |
| 6,798,429 B2 | 9/2004 | Bradski |
| 6,834,249 B2 | 12/2004 | Orchard |
| 6,847,351 B2 | 1/2005 | Noguera |
| 6,856,259 B1 | 2/2005 | Sharp |
| 6,888,536 B2 | 5/2005 | Westerman et al. |
| 6,897,833 B1 | 5/2005 | Robinson et al. |
| 6,908,386 B2 | 6/2005 | Suzuki et al. |
| 6,921,336 B1 | 7/2005 | Best |
| 6,930,661 B2 | 8/2005 | Uchida et al. |
| 6,933,923 B2 | 8/2005 | Feinstein |
| 6,939,231 B2 | 9/2005 | Mantyjarvi et al. |
| 6,954,491 B1 | 10/2005 | Kim et al. |
| 6,966,837 B1 | 11/2005 | Best |
| 6,988,097 B2 | 1/2006 | Shirota |
| 6,990,639 B2 | 1/2006 | Wilson |
| 6,993,451 B2 | 1/2006 | Chang et al. |
| 7,007,242 B2 | 2/2006 | Suomela et al. |
| 7,023,427 B2 | 4/2006 | Kraus et al. |
| 7,030,856 B2 | 4/2006 | Dawson et al. |
| 7,030,861 B1 | 4/2006 | Westerman et al. |
| 7,038,662 B2 | 5/2006 | Noguera |
| 7,053,887 B2 | 5/2006 | Kraus et al. |
| 7,068,294 B2 | 6/2006 | Kidney et al. |
| 7,088,342 B2 | 8/2006 | Rekimoto et al. |
| 7,109,978 B2 | 9/2006 | Gillespie et al. |
| 7,115,031 B2 | 10/2006 | Miyamoto et al. |
| 7,128,648 B2 | 10/2006 | Watanabe |
| 7,140,962 B2 | 11/2006 | Okuda et al. |
| 7,142,191 B2 | 11/2006 | Idesawa et al. |
| 7,158,123 B2 | 1/2007 | Myers et al. |
| 7,173,604 B2 | 2/2007 | Marvit et al. |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,184,020 B2 | 2/2007 | Matsui |
| 7,225,101 B2 | 5/2007 | Usuda et al. |
| 7,233,316 B2 | 6/2007 | Smith et al. |
| 7,254,775 B2 | 8/2007 | Geaghan et al. |
| 7,256,767 B2 | 8/2007 | Wong et al. |
| 7,271,795 B2 | 9/2007 | Bradski |
| 7,275,994 B2 | 10/2007 | Eck et al. |
| 7,280,096 B2 | 10/2007 | Marvit et al. |
| 7,285,051 B2 | 10/2007 | Eguchi et al. |
| 7,289,102 B2 | 10/2007 | Hinckley et al. |
| 7,295,191 B2 | 11/2007 | Kraus et al. |
| 7,301,526 B2 | 11/2007 | Marvit et al. |
| 7,301,527 B2 | 11/2007 | Marvit |
| 7,301,529 B2 | 11/2007 | Marvit et al. |
| 7,321,342 B2 | 1/2008 | Nagae |
| 7,333,087 B2 | 2/2008 | Soh et al. |
| RE40,153 E | 3/2008 | Westerman et al. |
| 7,339,580 B2 | 3/2008 | Westerman et al. |
| 7,352,358 B2 | 4/2008 | Zalewski et al. |
| 7,352,359 B2 | 4/2008 | Zalewski et al. |
| 7,365,735 B2 | 4/2008 | Reinhardt et al. |
| 7,365,736 B2 | 4/2008 | Marvit et al. |
| 7,365,737 B2 | 4/2008 | Marvit et al. |
| 7,376,388 B2 | 5/2008 | Ortiz et al. |
| 7,389,591 B2 | 6/2008 | Jaiswal et al. |
| 7,391,409 B2 | 6/2008 | Zalewski et al. |
| 7,403,220 B2 | 7/2008 | MacIntosh et al. |
| 7,431,216 B2 | 10/2008 | Weinans |
| 7,446,731 B2 | 11/2008 | Yoon |
| 7,461,356 B2 | 12/2008 | Mitsutake |
| 7,479,948 B2 | 1/2009 | Kim et al. |
| 7,479,949 B2 | 1/2009 | Jobs et al. |
| 7,510,477 B2 | 3/2009 | Argentar |
| 7,518,503 B2 | 4/2009 | Peele |
| 7,519,468 B2 | 4/2009 | Orr et al. |
| 7,522,151 B2 | 4/2009 | Arakawa et al. |
| 7,540,011 B2 | 5/2009 | Wixson et al. |
| 7,552,403 B2 | 6/2009 | Wilson |
| 7,570,275 B2 | 8/2009 | Idesawa et al. |
| 7,607,111 B2 | 10/2009 | Vaananen et al. |
| 7,614,008 B2 | 11/2009 | Ording |
| 7,619,618 B2 | 11/2009 | Westerman et al. |
| 7,626,598 B2 | 12/2009 | Manchester |
| 7,647,614 B2 | 1/2010 | Krikorian et al. |
| 7,656,394 B2 | 2/2010 | Westerman et al. |
| 7,663,607 B2 | 2/2010 | Hotelling et al. |
| 7,667,707 B1 | 2/2010 | Margulis |
| 7,692,628 B2 | 4/2010 | Smith et al. |
| 7,696,980 B1 | 4/2010 | Piot et al. |
| 7,699,704 B2 | 4/2010 | Suzuki et al. |
| 7,705,830 B2 | 4/2010 | Westerman et al. |
| 7,710,396 B2 | 5/2010 | Smith et al. |
| 7,719,523 B2 | 5/2010 | Hillis |
| 7,721,231 B2 | 5/2010 | Wilson |
| 7,730,402 B2 | 6/2010 | Song |
| 7,736,230 B2 | 6/2010 | Argentar |
| 7,762,891 B2 | 7/2010 | Miyamoto et al. |
| 7,782,297 B2 | 8/2010 | Zalewski et al. |
| 7,791,808 B2 | 9/2010 | French et al. |
| 7,827,698 B2 | 11/2010 | Jaiswal et al. |
| 7,934,995 B2 | 5/2011 | Suzuki |
| 8,038,533 B2 | 10/2011 | Tsuchiyama et al. |
| 8,105,169 B2 * | 1/2012 | Ogasawara et al. ............. 463/46 |
| 8,246,460 B2 | 8/2012 | Kitahara |
| 8,256,730 B2 | 9/2012 | Tseng |
| 8,317,615 B2 | 11/2012 | Takeda et al. |
| 8,337,308 B2 | 12/2012 | Ito et al. |
| 8,339,364 B2 | 12/2012 | Takeda et al. |
| 2001/0019363 A1 | 9/2001 | Katta et al. |
| 2002/0103610 A1 | 8/2002 | Bachmann et al. |
| 2002/0165028 A1 | 11/2002 | Miyamoto et al. |
| 2003/0027517 A1 | 2/2003 | Callway et al. |
| 2003/0207704 A1 | 11/2003 | Takahashi et al. |
| 2003/0216179 A1 | 11/2003 | Suzuki et al. |

(56) References Cited

U.S. PATENT DOCUMENTS

| | | |
|---|---|---|
| 2004/0023719 A1* | 2/2004 | Hussaini et al. ............... 463/37 |
| 2004/0092309 A1 | 5/2004 | Suzuki |
| 2004/0229687 A1 | 11/2004 | Miyamoto et al. |
| 2004/0266529 A1* | 12/2004 | Chatani ............... 463/40 |
| 2005/0176502 A1 | 8/2005 | Nishimura et al. |
| 2005/0181756 A1 | 8/2005 | Lin |
| 2006/0038914 A1 | 2/2006 | Hanada et al. |
| 2006/0077165 A1 | 4/2006 | Jang |
| 2006/0094502 A1 | 5/2006 | Katayama et al. |
| 2006/0174026 A1 | 8/2006 | Robinson et al. |
| 2006/0250764 A1 | 11/2006 | Howarth et al. |
| 2006/0252537 A1 | 11/2006 | Wu |
| 2006/0252541 A1 | 11/2006 | Zalewski et al. |
| 2006/0267928 A1 | 11/2006 | Kawanobe et al. |
| 2007/0021216 A1* | 1/2007 | Guruparan ............... 463/43 |
| 2007/0049374 A1* | 3/2007 | Ikeda et al. ............... 463/30 |
| 2007/0060383 A1 | 3/2007 | Dohta |
| 2007/0202956 A1 | 8/2007 | Ogasawara et al. |
| 2007/0252901 A1 | 11/2007 | Yokonuma et al. |
| 2007/0265085 A1 | 11/2007 | Miyamoto et al. |
| 2008/0015017 A1 | 1/2008 | Ashida et al. |
| 2008/0024435 A1* | 1/2008 | Dohta ............... 345/156 |
| 2008/0030458 A1 | 2/2008 | Helbing et al. |
| 2008/0039202 A1 | 2/2008 | Sawano et al. |
| 2008/0100995 A1 | 5/2008 | Ryder et al. |
| 2008/0150911 A1* | 6/2008 | Harrison ............... 345/173 |
| 2008/0220867 A1 | 9/2008 | Zalewski et al. |
| 2008/0300055 A1* | 12/2008 | Lutnick et al. ............... 463/39 |
| 2009/0143140 A1 | 6/2009 | Kitahara |
| 2009/0183193 A1* | 7/2009 | Miller, IV ............... 725/10 |
| 2009/0225159 A1 | 9/2009 | Schneider et al. |
| 2009/0254953 A1 | 10/2009 | Lin |
| 2009/0256809 A1 | 10/2009 | Minor |
| 2009/0280910 A1* | 11/2009 | Gagner et al. ............... 463/42 |
| 2009/0322671 A1 | 12/2009 | Scott et al. |
| 2009/0322679 A1 | 12/2009 | Sato et al. |
| 2010/0007926 A1 | 1/2010 | Imaizumi et al. |
| 2010/0045666 A1 | 2/2010 | Kornmann et al. |
| 2010/0083341 A1 | 4/2010 | Gonzalez |
| 2010/0149095 A1 | 6/2010 | Hwang |
| 2010/0156824 A1 | 6/2010 | Paleczny et al. |
| 2011/0021274 A1 | 1/2011 | Sato et al. |
| 2011/0190049 A1 | 8/2011 | Mae et al. |
| 2011/0190050 A1 | 8/2011 | Mae et al. |
| 2011/0190052 A1 | 8/2011 | Takeda et al. |
| 2011/0190061 A1 | 8/2011 | Takeda et al. |
| 2011/0195785 A1 | 8/2011 | Ashida et al. |
| 2011/0285704 A1 | 11/2011 | Takeda et al. |
| 2011/0287842 A1 | 11/2011 | Yamada et al. |
| 2011/0295553 A1 | 12/2011 | Sato |
| 2012/0001048 A1 | 1/2012 | Takahashi et al. |
| 2012/0015732 A1 | 1/2012 | Takeda et al. |
| 2012/0026166 A1 | 2/2012 | Takeda et al. |
| 2012/0040759 A1 | 2/2012 | Ito et al. |
| 2012/0044177 A1 | 2/2012 | Ohta et al. |
| 2012/0046106 A1 | 2/2012 | Ito et al. |
| 2012/0052952 A1 | 3/2012 | Nishida et al. |
| 2012/0052959 A1 | 3/2012 | Nishida et al. |
| 2012/0068927 A1 | 3/2012 | Poston et al. |
| 2012/0088580 A1 | 4/2012 | Takeda et al. |
| 2012/0106041 A1 | 5/2012 | Ashida et al. |
| 2012/0106042 A1 | 5/2012 | Ashida et al. |
| 2012/0108329 A1 | 5/2012 | Ashida et al. |
| 2012/0108340 A1 | 5/2012 | Ashida et al. |
| 2012/0119992 A1 | 5/2012 | Nishida et al. |
| 2012/0258796 A1 | 10/2012 | Ohta et al. |
| 2012/0270651 A1 | 10/2012 | Takeda et al. |

FOREIGN PATENT DOCUMENTS

| | | |
|---|---|---|
| CN | 202270340 U | 6/2012 |
| CN | 202355827 U | 8/2012 |
| CN | 202355828 U | 8/2012 |
| CN | 202355829 U | 8/2012 |
| EP | 0710017 A2 | 5/1996 |
| EP | 0835676 | 4/1998 |
| EP | 0835676 A1 | 4/1998 |
| EP | 1469382 A2 | 10/2004 |
| EP | 1 723 992 | 11/2006 |
| EP | 2158947 A2 | 3/2010 |
| FR | 2 932 998 | 1/2010 |
| JP | 09-294260 | 11/1997 |
| JP | 10-341388 | 12/1998 |
| JP | 2000-222185 | 8/2000 |
| JP | 2002-248267 | 9/2002 |
| JP | 2004-32548 | 1/2004 |
| JP | 3703473 | 2/2005 |
| JP | 2005-269399 | 9/2005 |
| JP | 3770499 | 4/2006 |
| JP | 3797608 | 7/2006 |
| JP | 2006-350986 | 12/2006 |
| JP | 2007-061271 | 3/2007 |
| JP | 2007-075353 | 3/2007 |
| JP | 2007-075751 | 3/2007 |
| JP | 2007-289413 | 11/2007 |
| JP | 2008-264402 | 11/2008 |
| JP | 2009-178363 | 8/2009 |
| JP | 2009-247763 | 10/2009 |
| JP | 2010-17412 | 1/2010 |
| JP | 4601925 | 12/2010 |
| TW | 419388 B | 2/1997 |
| TW | M278452 U | 6/2005 |
| WO | WO 03/007117 | 1/2003 |
| WO | 03/083822 | 10/2003 |
| WO | 2007/128949 | 11/2007 |
| WO | 2007/143632 | 12/2007 |
| WO | 2008/136064 | 11/2008 |
| WO | 2009/038596 | 3/2009 |

OTHER PUBLICATIONS

Jul. 24, 2012 European Search Report for EP 11177775.1, 12 pages.
English-language machine translation for JP 2009-178363.
English-language machine translation for JP 2009-247763.
English-language machine translation for JP 09-294260.
English-language machine translation for JP 2004-032548.
English-language machine translation for JP 4601925.
Mae et al., U.S. Appl. No. 13/017,381, filed Jan. 31, 2011.
Mae et al., U.S. Appl. No. 13/017,527, filed Jan. 31, 2011.
Takeda et al., U.S. Appl. No. 13/019,924, filed Feb. 2, 2011.
Takeda et al., U.S. Appl. No. 13/019,928, filed Feb. 2, 2011.
Taekda et al., U.S. Appl. No. 13/153,106, filed Jun. 3, 2011.
Ito et al., U.S. Appl. No. 13/198,251, filed Aug. 4, 2011.
Ashida et al., U.S. Appl. No. 13/206,059, filed Aug. 9, 2011.
Ashida et al., U.S. Appl. No. 13/206,767, filed Aug. 10, 2011.
Ashida et al., U.S. Appl. No. 13/206,914, filed Aug. 10, 2011.
Ashida et al., U.S. Appl. No. 13/207,867, filed Aug. 11, 2011.
Ito et al., U.S. Appl. No. 13/208,719, filed Aug. 12, 2011.
Ohta et al., U.S. Appl. No. 13/209,756, filed Aug. 15, 2011.
Nishida et al., U.S. Appl. No. 13/211,679, filed Aug. 17, 2011.
Nishida et al., U.S. Appl. No. 13/212,648, filed Aug. 18, 2011.
Takeda et al., U.S. Appl. No. 13/244,685, filed Sep. 26, 2011.
Takeda et al., U.S. Appl. No. 13/244,710, filed Sep. 26, 2011.
Ohta et al., U.S. Appl. No. 13/354,000, filed Jan. 19, 2012.
Takeda et al., U.S. Appl. No. 13/541,282, filed Jul. 3, 2012.
Apr. 26, 2012 Office Action for U.S. Appl. No. 13/019,928, 18 pages.
European Search Report (8 pgs.) dated May 10, 2012 issued in corresponding European Application No. 11739553.3.
Apple Support: "iPhone—Technical Specifications", Apple, Aug. 22, 2008, XP002673788, retrieved from the internet: URL: http://support.apple.com/kb/SP495 [retrieved on Apr. 13, 2012].
"iPhone—Technical Specifications", Apple, Feb. 19, 2010, Retrieved from the Internet: URL:http://support.apple.com/kb/SP2, retrieved on Oct. 24, 2011, 4 pages.
European Search Report issued for corresponding European Patent Application No. 11176479.1-1241, dated Nov. 24, 2011, 6 pages.
European Search Report issued for corresponding European Patent Application No. 11176478.3-1241, dated Nov. 24, 2011, 6 pages.
European Search Report issued for corresponding European Patent Application No. 11176477.5-1241, dated Nov. 24, 2011, 8 pages.

(56) References Cited

OTHER PUBLICATIONS

European Search Report issued for corresponding European Patent Application No. 11176475.9-1241, dated Nov. 24, 2011, 8 pages.
PersonalApplets: "Gyro Tennis App for iPhone 4 and iPod Touch 4$^{th}$ gen" YouTube, Aug. 9, 2010, http://www.youtube.com/watch?v=c7PRFbqWKIs, 2 pages.
jhrogersii, "Review: Gyro Tennis for iPhone", iSource, Sep. 17, 2010, http://isource.com/2010/09/17/review-gyro-tennis-for-iphone/, 10 pages.
Mar. 16, 2012 Office Action for U.S. Appl. No. 13/019,924, 14 pages.
EPO Search Report for Application No. 11777775.1, Feb. 1, 2012, 6 pages.
Australian Examination Report dated Jun. 25, 2013, corresponding to AU Application No. 2011213764.
Office Action dated Apr. 15, 2013 in corresponding U.S. Appl. No. 13/198,251.
Office Action dated May 20, 2013 in corresponding U.S. Appl. No. 13/206,767.
IGN Staff, "PS3 Games on PSP?", URL: http://www.ign.com/articles/2006/10/25/ps3-games-on-psp, Publication date printed on article: Oct. 2006.
Marcusita, "What Benefits Can I Get Out of My PSP on My PS3", URL: http://web.archive.org/web/20080824222755/http://forums.afterdawn.com/thread_view.cfm/600615, Publication date printed on article: Dec. 15, 2007.
Rob Aspin et al., "Augmenting the CAVE: An initial study into close focused, inward looking, exploration in IPT systems," 11$^{th}$ IEE International Symposium Distributed Simulation and Real-Time Applications, pp. 217-224 (Oct. 1, 2007).
D. Weidlich et al., "Virtual Reality Approaches for Immersive Design," CIRP Annals, Elsevier BV, NL, CH, FR, vol. 56, No. 1, pp. 139-142 (Jan. 1, 2007).
G.W. Fitzmaurice et al., "Virtual Reality for Palmtop Computers," ACM Transactions on Information Systems, ACM, New York, NY, vol. 11, No. 3, pp. 197-218 (Jul. 1, 1993).
Johan Sanneblad et al., "Ubiquitous graphics," Proceedings of the Working Conference on Advanced Visual Interfaces, AVI '06, pp. 373-377 (Oct. 1, 2006).
Office Action dated Oct. 16, 2012 in Australian Application No. 2011204815.
Office Action dated Sep. 18, 2012 in Australian Application No. 2011213764.
Office Action dated Sep. 10, 2012 in Australian Application No. 2011213765.
English-language machine translation for JP 2002-248267, Sep. 2002.
English-language machine translation for JP 2007-075751, Mar. 2007.
English-language machine translation for JP 2008-264402, Nov. 2008.
Ito et al., U.S. Appl. No. 13/687,057, allowed.
Xbox 360 Controller, XP-002717641 dated Sep. 12, 2013.

\* cited by examiner

DISPLAY DEVICE, GAME SYSTEM, AND GAME PROCESS METHOD

This application is the U.S. national phase of International Application No. PCT/JP2011/000566 filed 2 Feb. 2011 which designated the U.S. and claims priority to JP Patent Application No. 2010-022022 filed 3 Feb. 2010, JP Patent Application No. 2010-022023 filed 3 Feb. 2010, JP Patent Application No. 2010-177893 filed 6 Aug, 2010, JP Patent Application No. 2010-185315 filed 20 Aug. 2010, JP Patent Application No. 2010-192220 filed 30 Aug. 2010, JP Patent Application No. 2010-192221 filed 30 Aug. 2010, JP Patent Application No. 2010-245298 filed 1 Nov. 2010 and JP Patent Application No. 2010-245299 filed 1 Nov. 2010, the entire contents of each of which are hereby incorporated by reference.

TECHNICAL FIELD

The present invention relates to a display device for displaying a game image, and the like, which is a portable display device that can be carried around by the user, and to a game system and a game process method using such a display device.

BACKGROUND ART

There are conventional game systems in which the player can perform a game operation by moving the controller device itself (e.g., see Patent Document 1). For example, a game system described in Patent Document 1 uses the image-capturing means of the controller device to capture an image of a marker device, and uses information obtained from the image captured (captured image) as a game input, thus allowing for an operation of moving the controller device itself. Specifically, since it is possible to determine the position or the attitude of the controller device from the position of the marker device in the captured image, the position of the marker device is obtained as the information described above to perform a game process in accordance with the position of the marker device in the game system. Note that in the game system, while the position at which the marker device is placed is arbitrary, the marker device is normally placed around the display device because it feels natural for the user to use the controller device while pointing it toward the screen on which the game image is displayed.

CITATION LIST

Patent Document

[Patent Document 1] Specification of Japanese Patent No. 4265814

SUMMARY OF INVENTION

Technical Problem

As described above, in the game system, the user uses the controller device while pointing it toward the display device. The game system typically uses a non-portable, fixedly-installed display device such as a television. Therefore, where the captured image is used as an input, the user needs to use the controller device while always pointing it toward the fixedly-installed display device. That is, with the game system, the orientation in which the controller device can be used may be limited, and there is room for improvement with the degree of freedom in operations to be performed on the controller device.

It is therefore an object of the present invention to provide a display device, a game system and a game process method with which it is possible to improve the degree of freedom in operations to be performed on the controller device.

Solution to Problem

The present invention employs the following configurations (1) to (14) to attain the object mentioned above.

(1)

An example of the present invention is a game system including a home-console type game device, a controller device, and a portable display device.

The game device includes an operation data reception section, a game process section, a game image generation section, a game image compression section, and a data transmission section. The operation data reception section receives operation data from the controller device. The game process section performs a game process based on the operation data. The game image generation section successively generates a first game image based on the game process. The game image compression section successively compresses the first game image to generate compressed image data. The data transmission section successively wirelessly transmits the compressed image data to the portable display device.

The controller device includes an image-capturing section, an inertia sensor, at least one operation button, and an operation data transmission section. The image-capturing section is capable of detecting infrared light. The operation data transmission section wirelessly transmits the operation data to the game device, wherein the operation data includes data representing a detection result from the image-capturing section, data representing a detection result from the inertia sensor, and data representing an operation performed on the operation button.

The portable display device includes an infrared light-emitting portion, a game image reception section, a game image expansion section, and a display section. The infrared light-emitting portion is capable of emitting infrared light. The game image reception section successively receives the compressed image data from the game device. The game image expansion section successively expands the compressed image data to obtain the first game image. The display section successively displays the first game image obtained by the expansion.

The "game device" may be any device as long as it is an information processing device capable of performing a game process, and generating an image based on the game process. The game device may be a single-purpose information processing device for games, or a general-purpose information processing device such as an ordinary personal computer.

The "controller device" may further include other components, in addition to the components above. For example, the controller device may further include display means and sound outputting means. The "detection result from the image-capturing section" may be the image itself captured by the image-capturing section, or information obtained from the image (e.g., the marker coordinates to be described later, etc.).

The term "portable" means it has such a size that it can be held in hand and moved around by the user, and the position thereof can be moved to an arbitrary position. Note however that the "portable display device" may be used while being moved in the game as in for example the first to fourth game examples to be described later, or may be used while being fixedly placed (not moved) in the game as in for example the fifth game example to be described later.

The "game system" only needs to include the game device, the controller device, and the portable display device, and may or may not include the external display device displaying the second game image to be described later. That is, the game system may be provided in a form where the external display device is not included or in a form where it is included.

With the configuration (1) above, the portable display device includes the infrared light-emitting portion and the display section, and the controller device includes the image-capturing section, wherein the game process is performed based on the detection result from the image-capturing section. Therefore, the user can perform a game operation by pointing the image-capturing section of the controller device toward the infrared light-emitting portion of the portable display device. Here, since the display device is portable, the user can place the display device at an arbitrary position, and can therefore use the controller device while pointing it in an arbitrary orientation. Thus, with the configuration (1) above, it is possible to improve the degree of freedom in operations to be performed on the controller device, as compared with conventional game systems where the orientation in which the controller device can be used may be limited.

With the configuration (1) above, the portable display device only needs to perform at least the expansion process for the image data, and the game process may be performed on the game device side. Even if the game process becomes more complicated, it only increases the computation on the game device side, and does not substantially influence the amount of computation of the image expansion process by the portable display device. Therefore, even if a complicated game process is required, the computational load on the portable display device side can be kept within a predetermined range, and the portable display device is not required of high information processing capabilities. This makes it easier to reduce the size and weight of the portable display device, and makes it easier to manufacture the portable display device.

Moreover, with the configuration (1) above, since the first game image is transmitted, in a compressed form, from the game device to the portable display device, the game image can be wirelessly transmitted at a high speed, and the delay from when the game process is performed until the game image is displayed is kept small.

(2)

The game system may further include a marker device capable of emitting infrared light. Then, the game image generation section further generates a second game image based on the game process. The game device further includes an image outputting section and a light emission control section. The image outputting section successively outputs the second game image to an external display device which is separate from the portable display device. The light emission control section controls the light emission of the marker device.

The "external display device" only needs to be separate from the portable display device, and may include any device, in addition to a television 2 in the embodiment to be described later, as long as it is capable of displaying the second game image generated by the game device. For example, the external display device may be formed as an integral unit (in a single casing) with the game device.

With the configuration (2) above, the game system includes a marker device separate from the infrared light-emitting portion of the portable display device, and the second game image is displayed on an external display device separate from the portable display device on which the first game image is displayed. Thus, where the marker device is placed around the external display device, the user can use the controller device while pointing it to either one of the two display devices. That is, since the user can operate the controller device while pointing it to either one of the two display devices, the degree of freedom in operations to be performed on the controller device is further improved.

Moreover, with the configuration (2) above, since the portable display device can be placed arbitrarily, it is possible to arbitrarily set the positional relationship between the two display devices. Therefore, by placing the two display devices at appropriate positions in accordance with the content of the game, it is possible to realize a more realistic operation using the controller device, and to realize a game with better playability (see the fifth game example to be described later). By changing the positional relationship between the two display devices as necessary, it is possible to accommodate various games where two display devices are used in various positional relationships.

With the configuration (2) above, since the second game image can be displayed on the external display device, two different types of game images can be presented to the player. Therefore, the game space can be expressed in various methods with two types of game images. Thus, with the configuration (2) above, it is possible to present to the player game images that are easier to view and easier to perform game operations with.

(3)

The game system may include two controller devices. Then, the game process section performs the game process based on the operation data received from the controller devices.

With the configuration (3) above, a game operation can be performed while pointing one controller device toward the portable display device, and a game operation can be performed while pointing the other controller device toward the marker device. Therefore, where the marker device is placed around the external display device, two players can simultaneously play a game (e.g., the fifth game example to be described later) in which the controller device and the display device are used as a set.

(4)

The light emission control section may control the light emission of the marker device and the infrared light-emitting portion in accordance with content of the game process.

To "control (the light emission of the marker device and the infrared light-emitting portion) in accordance with content of the game process" includes to control the light emission in accordance with the type of the game program executed by the game device, and to control the light emission in accordance with the game status (the object being controlled by the player, the manner in which the object is being controlled, or the status of the game's progress) during the execution of the same game program.

With the configuration (4) above, the game device can control which one of the marker device and the infrared light-emitting portion is to be lit (or both are to be lit) in accordance with the content of the game process. Here, depending on the content of the game, only one of the two light-emitting devices, i.e., the marker device and the infrared light-emitting portion of the portable display device, may be used. Where two light-emitting devices are both lit, one may not be able to accurately perform an operation using the controller device because the game device cannot determine from which light-emitting device the image-capturing section of the controller device is detecting the infrared light. In contrast, with the configuration (4) above, light can be emitted from an appropriate one of the two light-emitting devices in accordance with the content of the game process, and it is therefore possible to accommodate various games, and to prevent an operation with the controller device from being inaccurate due to erroneous detection.

(5)

The light emission control section may generate control data representing control instructions for the light emission of the infrared light-emitting portion. Then, the data transmission section wirelessly transmits the control data to the portable display device. The portable display device further includes a control data reception section for receiving the control data from the game device. The infrared light-emitting portion operates based on the received control data.

The "data transmission section" may transmit the "control data" together with the image data, or may transmit it at a different point in time from the transmission of the image data. That is, even where the image data are successively transmitted, transmit data are transmitted only when necessary, and do not need to be successively transmitted together with the image data.

With the configuration (5) above, the game device can easily control the light emission of the infrared light-emitting portion by transmitting the control data to the portable display device.

(6)

An example of the present invention is a portable display device capable of wirelessly communicating with a game device. The game device receives, from a controller device including an image-capturing section capable of detecting infrared light, data representing a detection result of the image-capturing section, and successively transmits, to the display device, compressed image data which is obtained by compressing a game image generated based on a game process performed based on the data.

The display device includes an infrared light-emitting portion, a game image reception section, a game image expansion section, and a display section. The infrared light-emitting portion is capable of emitting infrared light. The game image reception section successively receives the compressed image data from the game device. The game image expansion section successively expands the compressed image data to obtain the game image. The display section successively displays the game image obtained by the expansion.

With the configuration (6) above, as with the configuration (1) above, the portable display device includes the infrared light-emitting portion and the display section, and the controller device includes the image-capturing section, wherein the game process is performed based on the detection result from the image-capturing section. Therefore, as with the configuration (1) above, the user can place the display device at an arbitrary position, and can therefore use the controller device while pointing it in an arbitrary orientation, thus improving the degree of freedom in operations to be performed on the controller device.

With the configuration (6) above, as with the configuration (1) above, the portable display device is not required of high information processing capabilities, thus making it easier to reduce the size and weight of the portable display device, and making it easier to manufacture the portable display device. With the configuration (6) above, since the game image is transmitted, in a compressed form, from the game device to the portable display device, the game image can be wirelessly transmitted at a high speed, and the delay from when the game process is performed until the game image is displayed is kept small.

(7)

The display device may further include a touch panel, an inertia sensor, and an operation data transmission section. The touch panel is provided on a screen of the display section. The operation data transmission section wirelessly transmits to the game device operation data including output data of the touch panel and the inertia sensor. Then, the game device performs the game process based on the operation data.

With the configuration (7) above, the portable display device can function also as a controller device. For example, where the display device is used in the game system, the user can perform an operation by moving the display device itself while looking at the screen of the display section, or the display device can be used as display means such that it is placed at an arbitrary position and another controller device is used while being pointed toward the display device. That is, with the configuration (7) above, a multi-purpose device can be provided as it can be used either as a controller device or as a display device.

(8)

The game device may wirelessly transmit a game sound generated based on the game process to the display device. Then, the game device further includes a game sound reception section for receiving the game sound from the game device; and a speaker for outputting the game sound received by the game sound reception section.

With the configuration (8) above, the game sound wirelessly transmitted from the game device to the display device may be transmitted in a compressed form as in the embodiment to be described later, or may be transmitted in an uncompressed form.

With the configuration (8) above, as with the game image, the game sound can be outputted from the display device.

(9)

The portable display device may further include a microphone. Then, the operation data transmission section further wirelessly transmits data of sound detected by the microphone to the game device.

With the configuration (9) above, the data of sound wirelessly transmitted from the controller device to the game device may be transmitted in a compressed form as in the embodiment to be described later, or may be transmitted in an uncompressed form.

With the configuration (9) above, the sound (microphone sound) detected by the microphone of the controller device is transmitted to the game device. Therefore, the game device can use the microphone sound as the game sound, or use a result performing a sound recognition process on the microphone sound as the game input.

(10)

The display device may further include a camera and a camera image compression section. The camera image compression section compresses a camera image captured by the camera to generate compressed captured image data. Then, the operation data transmission section further wirelessly transmits the compressed captured image data to the game device.

With the configuration (10) above, the camera image captured by the camera of the display device is transmitted to the game device. Therefore, the game device may use the camera image as the game image, or use a result of performing an image recognition process on the camera image as the game input. With the configuration (5) above, since the camera image is transmitted in a compressed form, the camera image can be wirelessly transmitted at high speed.

(11)

The display device may include a plurality of front surface operation buttons, and direction input sections capable of specifying directions. The plurality of front surface operation buttons are provided on a front surface of the display device, on which a screen of the display section is provided, on opposite sides of the screen. The direction input sections are provided on the front surface on opposite sides of the screen. Then, the operation data further includes data representing operations performed on the plurality of front surface operation buttons and the direction input sections.

With the configuration (11) above, the operation buttons and the direction input sections are provided on opposite sides of the screen of the display device. Therefore, since the player can operate the operation buttons and the direction input sections while holding the display device (typically with the thumbs), it is possible to easily operate the operation buttons and the direction input sections even while performing the operation of moving the display device.

(12)

The display device may further include a plurality of back surface operation buttons and a plurality of side surface operation buttons. The plurality of back surface operation buttons are provided on a back surface of the display device. The back surface is a surface opposite to the front surface of the display device, on which the screen of the display section and the touch panel are provided. The plurality of side surface operation buttons are provided on a side surface between the front surface and the back surface. Then, the operation data further includes data representing operations performed on the plurality of back surface operation buttons and the side surface operation buttons.

With the configuration (12) above, operation buttons are provided on the back surface and the side surface of the display device. Therefore, since the player can operate these operation buttons while holding the display device (typically with the index fingers or the middle fingers), it is possible to easily operate the operation buttons even while performing the operation of moving the display device.

(13)

The display device may further include a magnetic sensor. Then, the operation data further includes data of a detection result of the magnetic sensor.

With the configuration (13) above, the display device includes the magnetic sensor, and the output result of the magnetic sensor is used in the game process in the game device. Therefore, the player can perform the game operation by moving the display device. Since the game device can determine the absolute attitude of the display device in the real space from the output result from the magnetic sensor, it is possible to accurately calculate the attitude of the display device by using the output result from the inertia sensor and the output result from the magnetic sensor, for example.

(14)

While the inertia sensor may be any inertia sensor, it may include, for example, a 3-axis acceleration sensor and a 3-axis gyrosensor.

With the configuration (14) above, by using two types of sensors, i.e., an acceleration sensor and a gyrosensor, as the inertia sensor, it is possible to accurately calculate the movement and the attitude of the portable display device.

Another example of the present invention may be embodied as a game process method carried out in the game system of the configurations (1) to (5).

ADVANTAGEOUS EFFECTS OF INVENTION

According to the present invention, a portable display device is provided with an infrared, light-emitting portion, and a game image is displayed on the display device so that it is possible to use a controller device while pointing it in an arbitrary direction, and it is possible to improve the degree of freedom in operations to be performed on the controller device.

DESCRIPTION OF EMBODIMENTS

[1. General Configuration of Game System]

Figure 1:
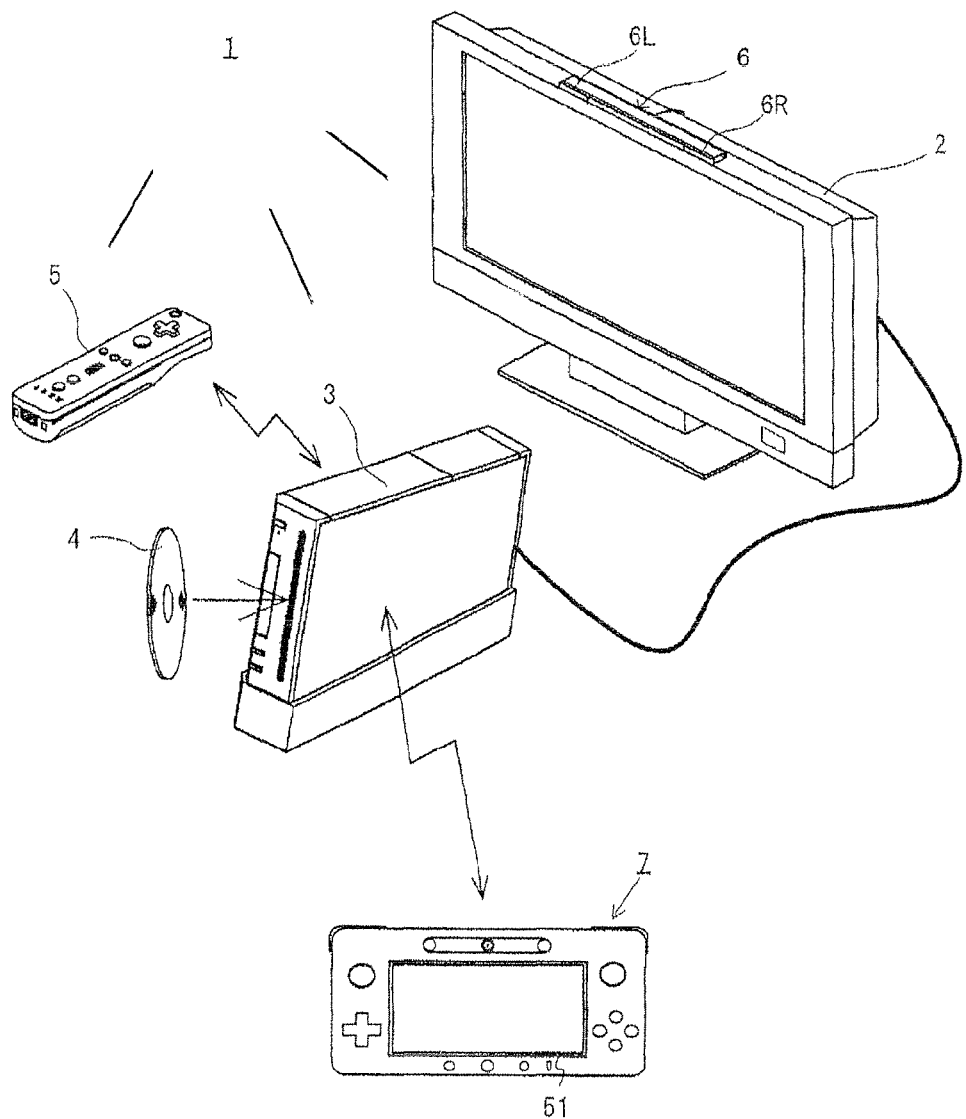
FIG. 1 is an external view of a game system 1.

A game system 1 according to an embodiment of the present invention will now be described with reference to the drawings. FIG. 1 is an external view of the game system 1. In FIG. 1, the game system 1 includes a non-portable display device (hereinafter referred to as a "television") 2 such as a television receiver, a home-console type game device 3, an optical disc 4, a controller 5, a marker device 6, and a terminal device 7. In the game system 1, the game device 3 performs a game process based on a game operation performed by using the controller 5, and a game image obtained through the game process is displayed on the television 2 and/or the terminal device 7.

In the game device 3, the optical disc 4 typifying an information storage medium used for the game device 3 in a replaceable manner is detachably inserted. An information processing program (typically, a game program) to be executed by the game device 3 is stored in the optical disc 4. The game device 3 has, on the front surface thereof, an insertion opening for the optical disc 4. The game device 3 reads and executes the information processing program stored in the optical disc 4 which is inserted through the insertion opening, so as to perform the game process.

The television 2 is connected to the game device 3 through a connecting cord. A game image obtained as a result of the game process performed by the game device 3 is displayed on the television 2. The television 2 includes a speaker 2a (FIG. 2), and the speaker 2a outputs a game sound obtained as a result of the game process. Note that in other embodiments, the game device 3 and the non-portable display device may be an integral unit. The communication between the game device 3 and the television 2 may be wireless communication.

The marker device 6 is provided along the periphery of the screen (on the upper side of the screen in FIG. 1) of the television 2. The user (player) can perform a game operation of moving the controller 5, the details of which will be described later, and the marker device 6 is used by the game device 3 for calculating the movement, the position, the orientation, etc., of the controller 5. The marker device 6 includes two markers 6R and 6L on both ends thereof. Specifically, a marker 6R (as well as the marker 6L) includes one or more infrared LEDs (Light 20. Emitting Diodes), and emits an infrared light forward from the television 2. The marker device 6 is connected to the game device 3, and the game device 3 is able to control the lighting of each infrared LED of the marker device 6. Note that the marker device 6 is portable, and the user can install the marker device 6 at any position. While FIG. 1 shows an embodiment where the marker device 6 is installed on top of the television 2, the position and the direction of installment of the marker device 6 are not limited to this.

The controller 5 provides the game device 3 with operation data representing the content of an operation performed on the controller itself. The controller 5 and the game device 3 can communicate with each other by wireless communication. In the present embodiment, the wireless communication between the controller 5 and the game device 3 uses, for example, Bluetooth (Registered Trademark) technology. In other embodiments, the controller 5 and the game device 3 may be connected by a wired connection. While the number of the controllers 5 included in the game system 1 is one in the present embodiment, the game device 3 can communicate with a plurality of controllers, and a game can be played by multiple players by using a predetermined number of controllers at the same time. The detailed configuration of the controller 5 will be described later.

The terminal device 7 has such a size that it can be held in hand by the user, and the user can hold and move the terminal device 7, or can use the terminal device 7 placed at an arbitrary position. The terminal device 7, whose detailed configuration will be described later, includes an LCD (Liquid Crystal Display) 51 as display means, and input means (a touch panel 52, a gyrosensor 64, etc., to be described later). The terminal device 7 and the game device 3 can communicate with each other by wireless connection (or wired connection). The terminal device 7 receives data of an image (e.g., a game image) generated by the game device 3 from the game device 3, and displays the image on the LCD 51. Note that while an LCD is used as the display device in the present embodiment, the terminal device 7 may include any other display device such as a display device utilizing EL (Electro Luminescence), for example. The terminal device 7 transmits operation data representing the content of an operation performed on the terminal device itself to the game device 3.

[2. Internal Configuration of Game Device 3]

Figure 2:
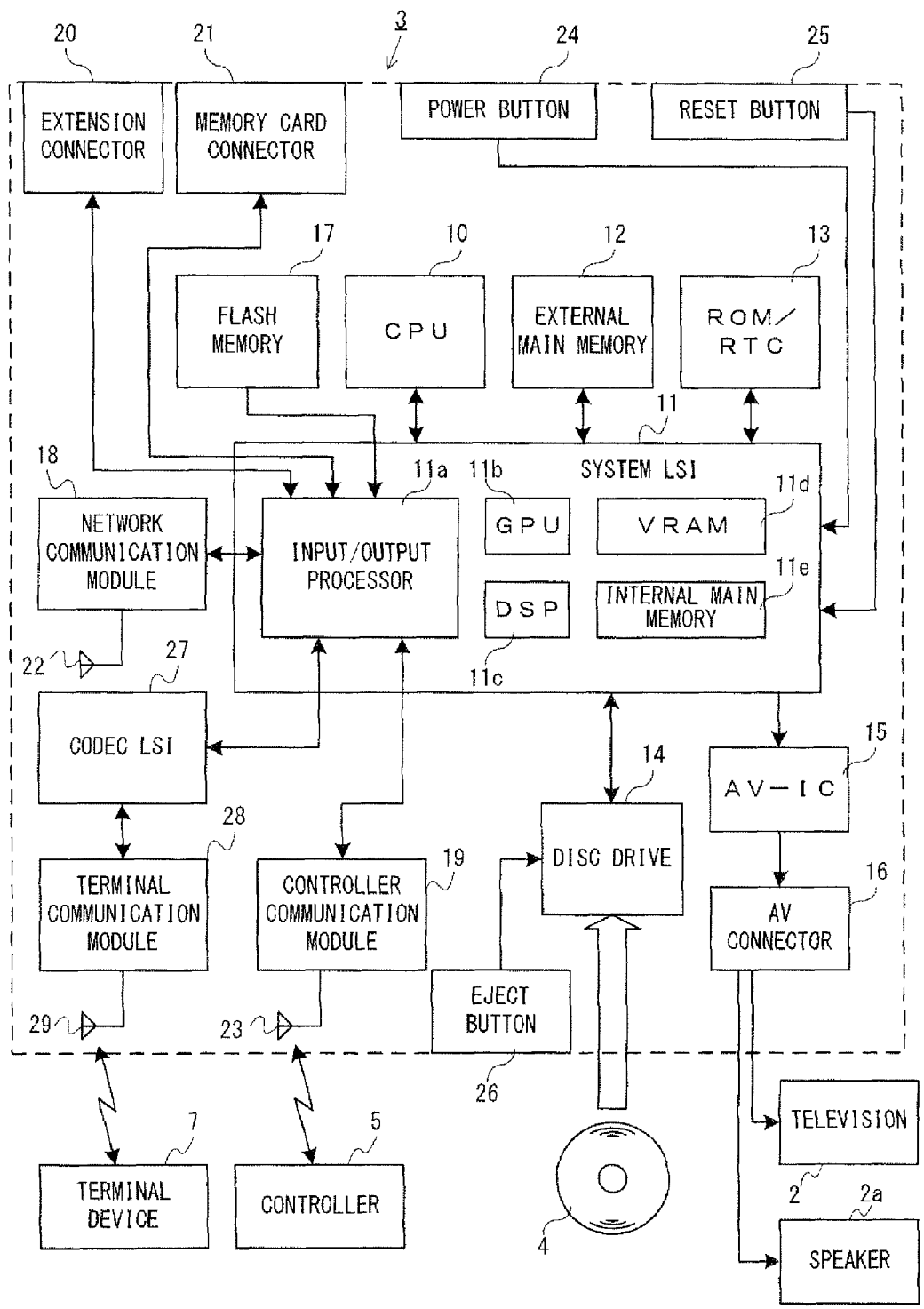
FIG. 2 is a block diagram showing an internal configuration of a game device 3.

Next, an internal configuration of the game device 3 will be described with reference to FIG. 2. FIG. 2 is a block diagram illustrating an internal configuration of the game device 3. The game device 3 includes a CPU (Central Processing Unit) 10, a system LSI 11, an external main memory 12, a ROM/RTC 13, a disc drive 14, an AV-IC 15, and the like.

The CPU 10 performs game processes by executing a game program stored in the optical disc 4, and functions as a game processor. The CPU 10 is connected to the system LSI 11. To the system LSI 11, the external main memory 12, the ROM/RTC 13, the disc drive 14, and the AV-IC 15 as well as the CPU 10 are connected. The system LSI 11 performs processes for controlling data transmission between the respective components connected thereto, generating an image to be displayed, acquiring data from an external device, and the like. The internal configuration of the system LSI 11 will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into an internal main memory 11e to be described below or the external main memory 12.

The system LSI 11 includes an input/output processor (I/O processor) 11a, a GPU (Graphics Processor Unit) 11b, a DSP (Digital Signal Processor) 11c, a VRAM (Video RAM) 11d, and the internal main memory 11e. Although not shown in the figures, these components 11a to 11e are connected with each other through an internal bus.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data using data stored in the VRAM 11d. Note that in the present embodiment, the game device 3 generates both the game image displayed on the television 2 and the game image displayed on the terminal device 7. Hereinafter, the game image displayed on the television 2 may be referred to as the "television game image", and the game image displayed on the terminal device 7 may be referred to as the "terminal game image".

The DSP 11c, functioning as an audio processor, generates sound data using sound data and sound waveform (tone quality) data stored in the internal main memory 11e or the external main memory 12. Note that in the present embodiment, also with the game sound as with the game image, there are generated both a game sound outputted from the speaker of the television 2 and a game sound outputted from the speaker of the terminal device 7. Hereinafter, the game sound outputted from the television 2 may be referred to as a "television game sound", and the game sound outputted from the terminal device 7 may be referred to as a "terminal game sound".

As described above, of the images and sounds generated in the game device 3, data of the image and sound outputted from the television 2 is read out by the AV-IC 15. The AV-IC 15 outputs the read image data to the television 2 via an AV connector 16, and outputs the read sound data to the speaker 2a provided in the television 2. Thus, an image is displayed on the television 2, and a sound is outputted from the speaker 2a.

Of the images and sounds generated in the game device 3, data of the image and sound outputted from the terminal device 7 is transmitted to the terminal device 7 by an input/output processor 11e, etc. The data transmission to the terminal device 7 by the input/output processor 11a, or the like, will be described later.

The input/output processor 11a exchanges data with components connected thereto, and downloads data from an external device. The input/output processor 11a is connected to the flash memory 17, a network communication module 18, a controller communication module 19, an extension connector 20, a memory card connector 21, and a codec LSI 27. An antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 can be connected to a network such as the Internet to communicate with an external information processing device (e.g., other game devices, various servers, etc.). That is, the input/output processor 11a can be connected to a network such as the Internet via the network communication module 18 and the antenna 22 to communicate with an external information processing device connected to the network. The input/output processor 11a regularly accesses the flash memory 17, and detects the presence or absence of any data which needs to be transmitted to the network, and when detected, transmits the data to the network via the network communication module 18 and the antenna 22. Further, the input/output processor 11e receives data transmitted from an external information processing device and data downloaded from a download server via the network, the antenna 22 and the network communication module 18, and stores the received data in the flash memory 17. The CPU 10 executes a game program so as to read data stored in the flash memory 17 and use the data on the game program. The flash memory 17 may store save data (game result data or unfinished game data) of a game played using the game device 3 in addition to data exchanged between the game device 3 and an external information processing device. The flash memory 17 may store a game program.

The game device 3 can receive operation data from the controller 5. That is, the input/output processor 11a receives operation data transmitted from the controller 5 via the antenna 23 and the controller communication module 19, and stores (temporarily stores) it in a buffer area of the internal main memory 11e or the external main memory 12.

The game device 3 can exchange data such as images and sounds with the terminal device 7. When transmitting a game image (terminal game image) to the terminal device 7, the input/output processor 11a outputs data of a game image generated by the GPO 11b to the codec LSI 27. The codec LSI 27 performs a predetermined compression process on the image data from the input/output processor 11a. The terminal communication module 28 wirelessly communicates with the terminal device 7. Therefore, image data compressed by the codec LSI 27 is transmitted by the terminal communication module 28 to the terminal device 7 via the antenna 29. Note that in the present embodiment, the image data transmitted from the game device 3 to the terminal device 7 is image data used in a game, and the playability of a game is adversely influenced if there is a delay in the image displayed in the game. Therefore, it is preferred to eliminate delay as much as possible for the transmission of image data from the game device 3 to the terminal device 7. Therefore, in the present embodiment, the codec LSI 27 compresses image data by using a compression technique with high efficiency such as the H.264 standard, for example. Note that other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE802.11n standard, for example, or may use other communication schemes.

The game device 3 transmits sound data to the terminal device 7, in addition to image data. That is, the input/output processor 11a outputs sound data generated by the DSP 11c to the terminal communication module 28 via the codec LSI 27. The codec LSI 27 performs a compression process on sound data, as with image data. While the compression scheme for sound data may be any scheme, it is preferably a scheme with high compression ratio and little sound deterioration. In other embodiments, the sound data may be transmitted uncompressed. The terminal communication module 28 transmits the compressed image data and sound data to the terminal device 7 via the antenna 29.

Moreover, the game device 3 transmits various control data to the terminal device 7 as necessary, in addition to the image data and the sound data. Control data is data representing control instructions for components of the terminal device 7, and it for example represents an instruction for controlling the lighting of a marker section (a marker section 55 shown in FIG. 10), an instruction for controlling the image-capturing operation of a camera (a camera 56 shown in FIG. 10), etc. The input/output processor 11a transmits control data to the terminal device 7 in response to an instruction of the CPU 10. Note that while the codec LSI 27 does not perform a data compression process in the present embodiment for the control data, it may perform a compression process in other embodiments. Note that the above-described data transmitted from the game device 3 to the terminal device 7 may be encrypted as necessary or may not be encrypted.

The game device 3 can receive various data from the terminal device 7. In the present embodiment, the terminal device 7 transmits operation data, image data and sound data, the details of which will be described later. Data transmitted from the terminal device 7 are received by the terminal communication module 28 via the antenna 29. The image data and the sound data from the terminal device 7 are subjected to a compression process similar to that on the image data and the sound data from the game device 3 to the terminal device 7. Therefore, these image data and sound data are sent from the terminal communication module 28 to the codec LSI 27, and subjected to an expansion process by the codec LSI 27 to be outputted to the input/output processor 11a. On the other hand, the operation data from the terminal device 7 may not be subjected to a compression process since the amount of data is small as compared with images and sounds. It may be encrypted as necessary, or it may not be encrypted. Therefore, after being received by the terminal communication module 28, the operation data is outputted to the input/output processor 11a via the codec LSI 27. The input/output processor 11a stores (temporarily stores) data received from the terminal device 7 in a buffer area of the internal main memory 11e or the external main memory 12.

The game device 3 can be connected to another device or an external storage medium. That is, the input/output processor 11a is connected to the extension connector 20 and the memory card connector 21. The extension connector 20 is a connector for an interface, such as USB or SCSI. The extension connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card. For example, the input/output processor 11a can access an external storage medium via the extension connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is on, power is supplied to the components of the game device 3 from an external power supply through an AC adaptor not shown. When the reset button 25 is pressed, the system LSI 11 reboots a boot program of the game device 3. The eject button 26 is connected to the disc drive 14. When the eject button 26 is pressed, the optical disc 4 is ejected from the disc drive 14.

Note that in other embodiments, some of the components of the game device 3 may be provided as extension devices separate from the game device 3. Then, an extension device may be connected to the game device 3 via the extension connector 20, for example. Specifically, an extension device may include components of the codec LSI 27, the terminal communication module 28 and the antenna 29, for example, and can be attached/detached to/from the extension connector 20. Thus, by connecting the extension device to a game device which does not include the above components, the game device can communicate with the terminal device 7.

[3. Configuration of Controller 5]

Figure 3:
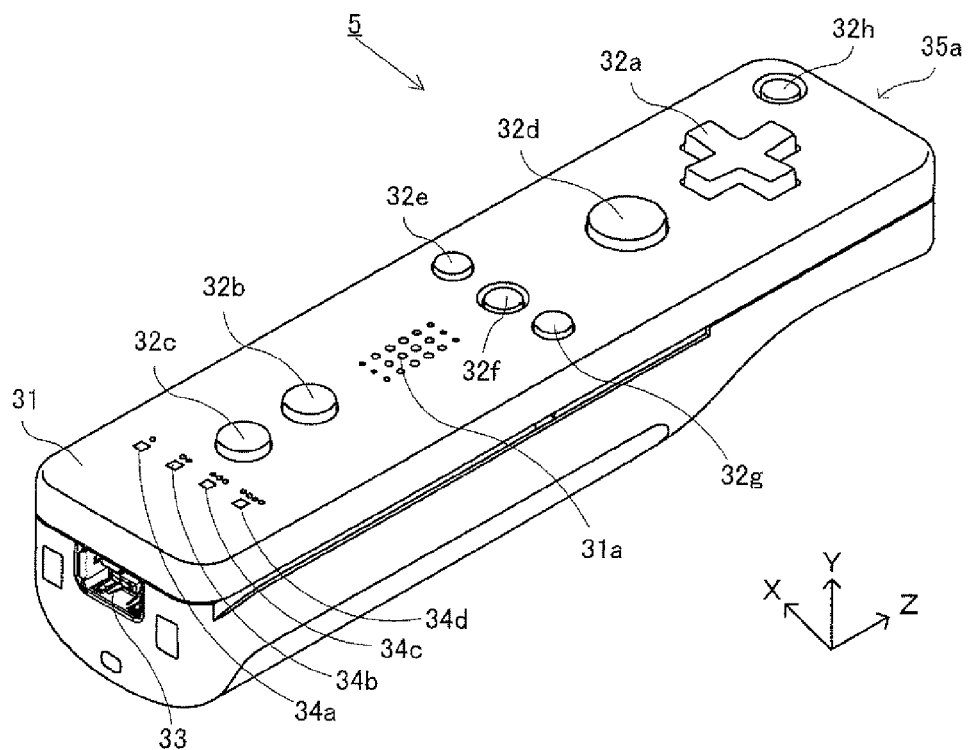
FIG. 3 is a perspective view showing an external configuration of a controller 5.
Figure 4:
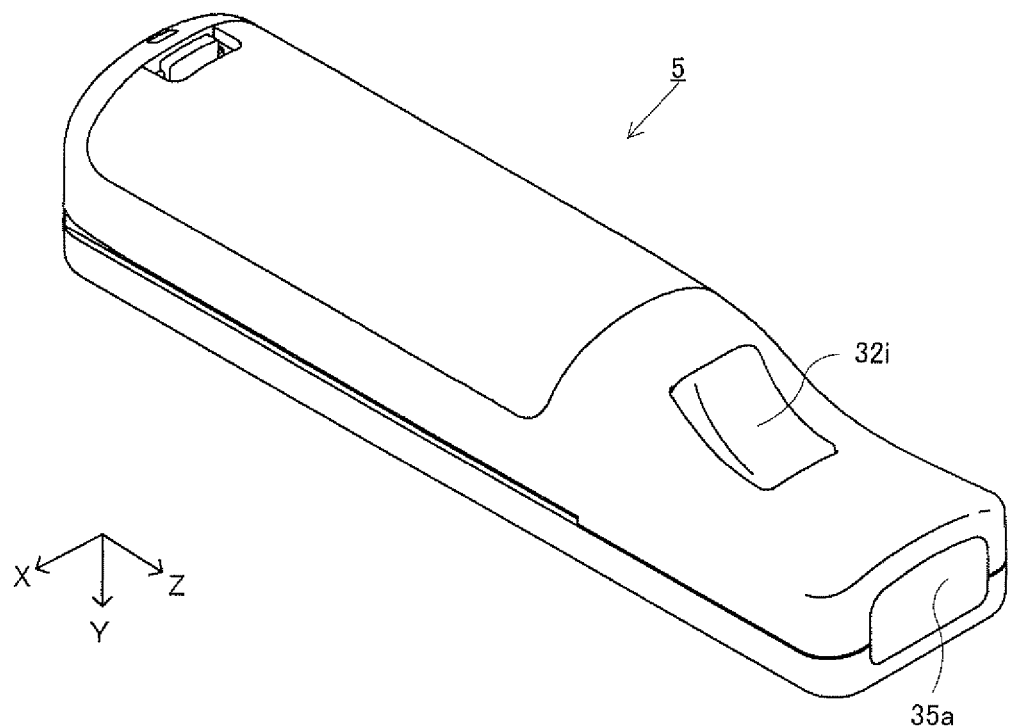
FIG. 4 is a perspective view showing an external configuration of the controller 5.

Next, with reference to FIGS. 3 to 7, the controller 5 will be described. FIG. 3 is a perspective view illustrating an external configuration of the controller 5. FIG. 4 is a perspective view illustrating an external configuration of the controller 5. FIG. 3 is a perspective view showing the controller 5 as viewed from the top rear side thereof, and FIG. 4 is a perspective view showing the controller 5 as viewed from the bottom front side thereof.

As shown in FIGS. 3 and 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or a child. A user can perform game operations by pressing buttons provided on the controller 5, and moving the controller 5 itself to change the position and the orientation (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present specification, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game device 3. Further, the power button 32h is intended to remotely turn ON/OFF the power of the main unit of the game device 3. The home button 32f and the power button 32h each have the top surface thereof recessed below the top surface of the housing 31. Therefore, the home button 32f and the power button 32h are prevented from being inadvertently pressed by the user.

On the rear surface of the housing 31, the connector 33 is provided. The connector 33 is used for connecting another device (e.g., another sensor unit or another controller) to the controller 5. Both sides of the connector 33 on the rear surface of the housing 31 have a fastening hole 33a for preventing easy disengagement of another device as described above.

In the rear-side portion of the top surface of the housing 31, a plurality (four in FIG. 3) of LEDs 34a to 34d are provided. The controller 5 is assigned a controller type (number) so as to be distinguishable from other controllers. The LEDs 34a to 34d are each used for informing the user of the controller type which is currently being set for the controller 5, and for informing the user of the battery level of the controller 5, for example. Specifically, when a game operation is performed using the controller 5, one of the plurality of LEDs 34a to 34d corresponding to the controller type is lit up.

The controller 5 has an image capturing/processing section 35 (FIG. 6), and a light incident surface 35a of the image capturing/processing section 35 is provided on the front surface of the housing 31, as shown in FIG. 4. The light incident surface 35a is made of a material transmitting therethrough at least infrared light from the markers 6R and 6L.

On the top surface of the housing 31, sound holes 31a for externally outputting a sound from a speaker 47 (FIG. 5) provided in the controller 5 are provided between the first button 32b and the home button 32f.

Figure 5:
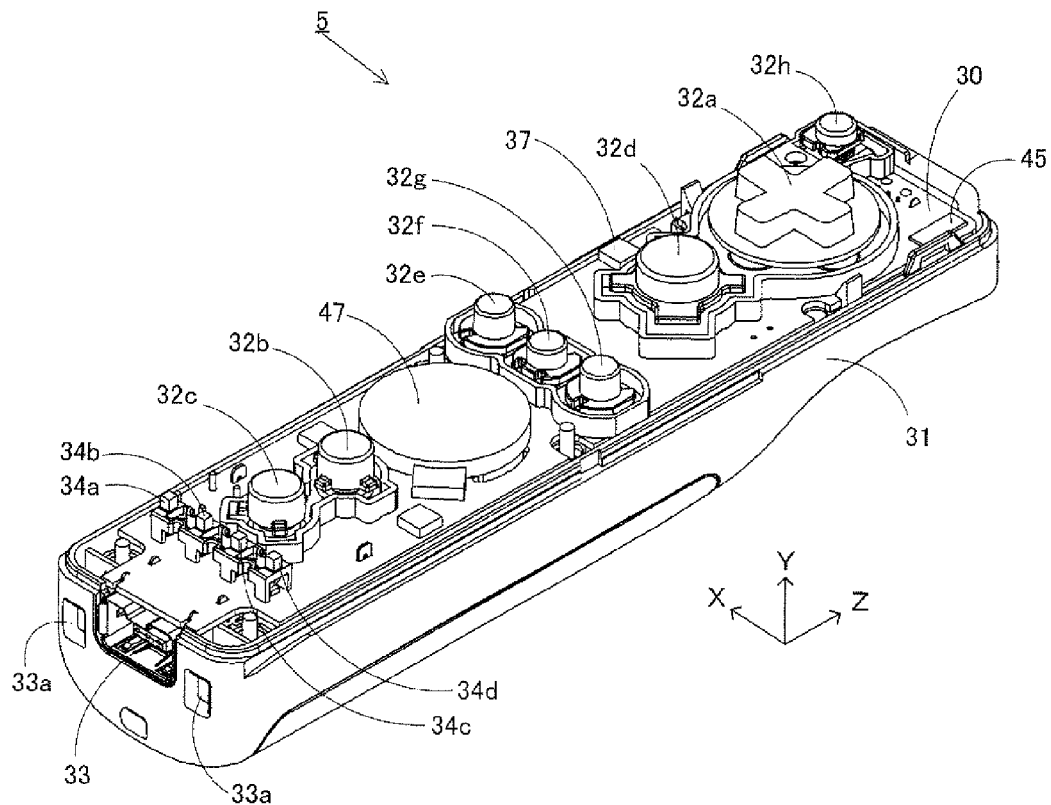
FIG. 5 is a diagram showing an internal configuration of the controller 5.
Figure 6:
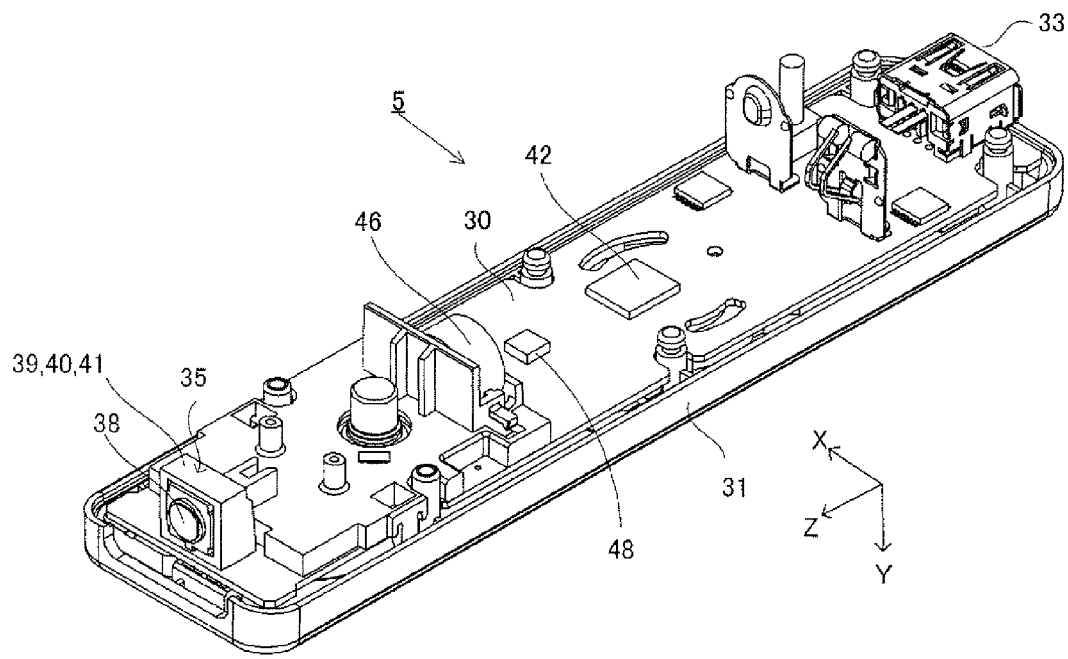
FIG. 6 is a diagram showing an internal configuration of the controller 5.

Next, with reference to FIGS. 5 and 6, an internal structure of the controller 5 will be described. FIGS. 5 and 6 are diagrams illustrating the internal structure of the controller 5. Note that FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a to 34d, an acceleration sensor 37, an antenna 45, the speaker 47, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated about the Z-axis is facilitated. Further, the acceleration sensor 37 is provided anterior to the center of the controller 5 with respect to the longitudinal direction (Z-axis direction). Further, a wireless module 44 (FIG. 6) and the antenna 45 allow the controller 5 to act as a wireless controller.

On the other hand, in FIG. 6, at a front edge of a bottom main surface of the substrate 30, the image capturing/processing section 35 is provided. The image capturing/processing section 35 includes an infrared filter 38, a lens 39, an image capturing element 40 and an image processing circuit 41 located in this order from the front of the controller 5. These components 38 to 41 are attached on the bottom main surface of the substrate 30. On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present embodiment, the vibrator 46 is disposed slightly toward the front of the housing 31. That is, the vibrator 46 is positioned offset from the center toward the end of the controller 5 so that the vibration of the vibrator 46 greatly vibrates the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 47, and the like.

The shape of the controller 5, the shape of each operation button, the number and the positions of acceleration sensors and vibrators, and so on, shown in FIGS. 3 to 6 are merely illustrative, and the present invention can be realized with other shapes, numbers, and positions. Further, although in the present embodiment the image-capturing direction of the image-capturing means is the Z-axis positive direction, the image-capturing direction may be any direction. That is, the position of the image capturing/processing section 35 (the light incident surface 35a of the image capturing/processing section 35) in the controller 5 may not be on the front surface of the housing 31, but may be on any other surface on which light can be received from the outside of the housing 31.

Figure 7:
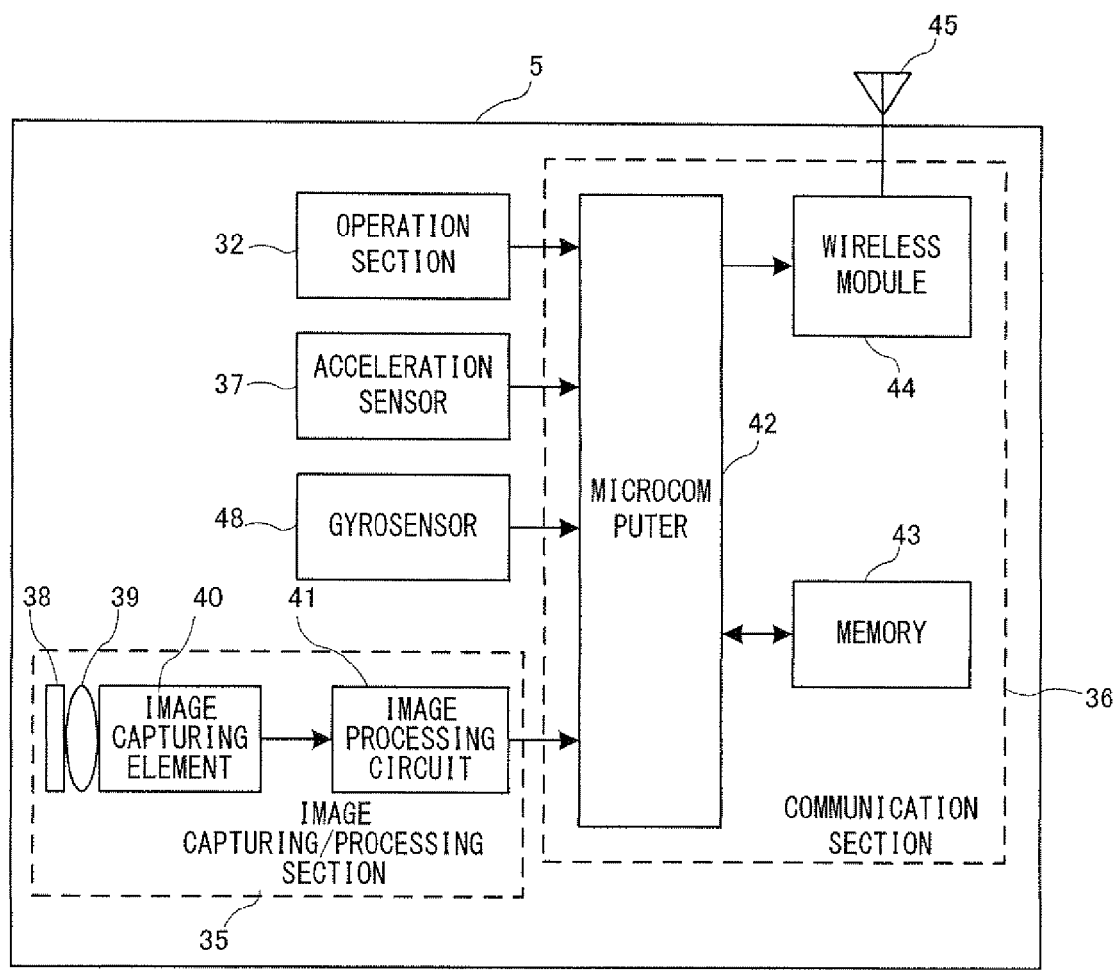
FIG. 7 is a block diagram showing a configuration of the controller 5.

FIG. 7 is a block diagram illustrating a configuration of the controller 5. The controller 5 includes an operation section 32 (the operation buttons 32a to 32i), the image capturing/processing section 35, a communication section 36, the acceleration sensor 37, and a gyrosensor 48. The controller 5 transmits, as operation data, data representing the content of an operation performed on the controller itself, to the game device 3. Note that hereinafter, the operation data transmitted by the controller 5 may be referred to as the "controller operation data", and the operation data transmitted by the terminal device 7 may be referred to as the "terminal operation data".

The operation section 32 includes the operation buttons 32a to 32i described above, and outputs, to the microcomputer 42 of the communication section 36, operation button data indicating the input status of the operation buttons 32a to 32i (whether or not the operation buttons 32a to 32i are pressed).

The image capturing/processing section 35 is a system for analyzing image data captured by the image-capturing means to determine an area having a high brightness therein and calculate the centroid, the size, etc., of the area. The image capturing/processing section 35 has a maximum sampling period of, for example, about 200 frames/sec., and therefore can trace and analyze even a relatively fast motion of the controller 5.

The image capturing/processing section 35 includes the infrared filter 38, the lens 39, the image capturing element 40 and the image processing circuit 41. The infrared filter 38 transmits therethrough only infrared light included in the light incident on the front surface of the controller 5. The lens 39 collects the infrared light transmitted through the infrared filter 38 so that it is incident on the image capturing element 40. The image capturing element 40 is a solid-state image-capturing device such as, for example, a CMOS sensor or a CCD sensor, which receives the infrared light collected by the lens 39, and outputs an image signal. The marker section 55 of the terminal device 7 and the marker device 6 of which images are captured are formed by markers outputting infrared light. Therefore, the provision of the infrared filter 38 enables the image capturing element 40 to receive only the infrared light transmitted through the infrared filter 38 and generate image data, so that an image of the image-capturing object (the marker section 55 and/or the marker device 6) can be captured more accurately. Hereinafter, the image taken by the image capturing element 40 is referred to as a captured image. The image data generated by the image capturing element 40 is processed by the image processing circuit 41. The image processing circuit 41 calculates the positions of the image-capturing objects within the captured image. The image processing circuit 41 outputs coordinates of the calculated positions, to the microcomputer 42 of the communication section 36. The data representing the coordinates is transmitted as operation data to the game device 3 by the microcomputer 42. Hereinafter, the coordinates are referred to as "marker coordinates". The marker coordinates change depending on the orientation (tilt angle) and/or the position of the controller 5 itself, and therefore the game device 3 can calculate the orientation and the position of the controller 5 using the marker coordinates.

Note that in other embodiments, the controller 5 may not include the image processing circuit 41, and the captured image itself may be transmitted from the controller 5 to the game device 3. At this time, the game device 3 may have a circuit or a program, having the same function as the image processing circuit 41, for calculating the marker coordinates.

The acceleration sensor 37 detects accelerations (including gravitational acceleration) of the controller 5, that is, force (including gravity) applied to the controller 5. The acceleration sensor 37 detects a value of acceleration (linear acceleration) in the straight line direction along the sensing axis direction, among all the acceleration applied to the detection section of the acceleration sensor 37. For example, a multi-axis acceleration sensor having two or more axes detects acceleration components along the axes, as the acceleration applied to the detection section of the acceleration sensor. Note that while the acceleration sensor 37 is assumed to be an electrostatic capacitance type MEMS (Micro Electro Mechanical System) acceleration sensor, it may be another type of an acceleration sensor.

In the present embodiment, the acceleration sensor 37 detects linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 therefore represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. Note that the acceleration detected by the acceleration sensor 37 changes depending on the orientation (tilt angle) and the movement of the controller 5 itself, and therefore the game device 3 is allowed to calculate the orientation and the movement of the controller 5 using the obtained acceleration data. In the present embodiment, the game device 3 calculates the attitude, the tilt angle, etc., of the controller 5 based on the obtained acceleration data.

One skilled in the art will readily understand from the description herein that additional information relating to the controller 5 can be estimated or calculated (determined) through a process by a computer, such as a processor (for example, the CPU 10) of the game device 3 or a processor (for example, the microcomputer 42) of the controller 5, based on an acceleration signal outputted from the acceleration sensor 37 (this applies also to an acceleration sensor 63 to be described later). For example, in the case where the computer performs a process on the premise that the controller 5 including the acceleration sensor 37 is in static state (that is, in the case where the process is performed on the premise that the acceleration to be detected by the acceleration sensor includes only the gravitational acceleration), when the controller 5 is actually in static state, it is possible to determine whether or not, or how much the attitude of the controller 5 is tilting relative to the direction of gravity, based on the detected acceleration. Specifically, when the state where the detection axis of the acceleration sensor 37 faces vertically downward is used as a reference, whether or not the controller 3 is tilting relative to the reference can be determined based on whether or not 15 (gravitational acceleration) is present, and the degree of tilt of the controller 5 relative to the reference can be determined based on the magnitude thereof. Further, with the multi-axis acceleration sensor 37, it is possible to more specifically determine the degree of tilt of the controller 5 relative to the direction of gravity by performing a process on the acceleration signals of different axes. In this case, the processor may calculate, based on the output from the acceleration sensor 37, the tilt angle of the controller 5, or the tilt direction of the controller 5 without calculating the tilt angle. Thus, by using the acceleration sensor 37 in combination with the processor, it is possible to determine the tilt angle or the attitude of the controller 5.

On the other hand, when it is premised that the controller is in dynamic state (where the controller 5 is being moved), the acceleration sensor 37 detects the acceleration based on the movement of the controller 5, in addition to the gravitational acceleration, and it is therefore possible to determine the movement direction of the controller 5 by removing the gravitational acceleration component from the detected acceleration through a predetermined process. Even when it is premised that the controller 5 is in dynamic state, it is possible to determine the tilt of the controller 5 relative to the direction of gravity by removing the acceleration component based on the movement of the acceleration sensor from the detected acceleration through a predetermined process. Note that in other embodiments, the acceleration sensor 37 may include an embedded processor or another type of dedicated processor for per forming a predetermined process on an acceleration signal detected by the built-in acceleration detection means before the acceleration signal is outputted to the microcomputer 42. For example, when the acceleration sensor 37 is used to detect static acceleration (for example, gravitational acceleration), the embedded or dedicated processor may convert the acceleration signal to a tilt angle (or another preferable parameter).

The gyrosensor 48 detects angular velocities about three axes (the X, Y and Z axes in the present embodiment). In the present specification, with respect to the image-capturing direction the Z-axis positive direction) of the controller 5, the rotation direction about the X axis is referred to as the pitch direction, the rotation direction about the Y axis as the yaw direction, and the rotation direction about the Z axis as the roll direction. The number and combination of gyrosensors to be used are not limited to any particular number and combination as long as the gyrosensor 48 can detect angular velocities about three axes. For example, the gyrosensor 48 may be a 3-axis gyrosensor, or angular velocities about three axes may be detected by combining together a 2-axis gyrosensor and a 1-axis gyrosensor. Data representing the angular velocity detected by the gyrosensor 48 is outputted to the communication section 36. The gyrosensor 48 may be a gyrosensor that detects an angular velocity or velocities about one axis or two axes.

The communication section 36 includes the microcomputer 42, a memory 43, the wireless module 44 and the antenna 45. The microcomputer 42 controls the wireless module 44 for wirelessly transmitting, to the game device 3, data acquired by the microcomputer 42 while using the memory 43 as a storage area in the process.

Data outputted from the operation section 32, the image capturing/processing section 35, the acceleration sensor 37, and the gyrosensor 48 to the microcomputer 42 are temporarily stored in the memory 43. The data are transmitted as the operation data (controller operation data) to the game device 3. At the time of the transmission to the controller communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game device 3 receives the low power radio wave signal. The game device 3 demodulates or decodes the received low power radio wave signal to obtain the operation data. Based on the operation data obtained from the controller 5, the CPU 10 of the game device 3 performs the game process. Note that while the wireless transmission from the communication section 36 to the controller communication module 19 is sequentially performed with a predetermined cycle, since the game process is generally performed with a cycle of ⅙₀ sec (as one frame period), the transmission is preferably performed with a cycle less than or equal to this period. The communication section 36 of the controller 5 outputs, to the controller communication module 19 of the game device 3, the operation data at a rate of once per ½₀₀ sec, for example.

As described above, as operation data representing an operation performed on the controller itself, the controller 5 can transmit marker coordinate data, acceleration data, angular velocity data, and operation button data. The game device 3 performs the game process using the operation data as a game input. Therefore, by using the controller 5, the user can perform a game operation of moving the controller 5 itself, in addition to the conventional typical game operation of pressing the operation buttons. For example, it enables an operation of tilting the controller 5 to an intended attitude, an operation of specifying an intended position on the screen with the controller 5, an operation of moving the controller 5 itself, etc. while the controller 5 does not include the display means for displaying the game image in the present embodiment, it may include display means for displaying, for example, an image representing the battery level, etc.

[4. Configuration of Terminal Device 7]

Figure 8:
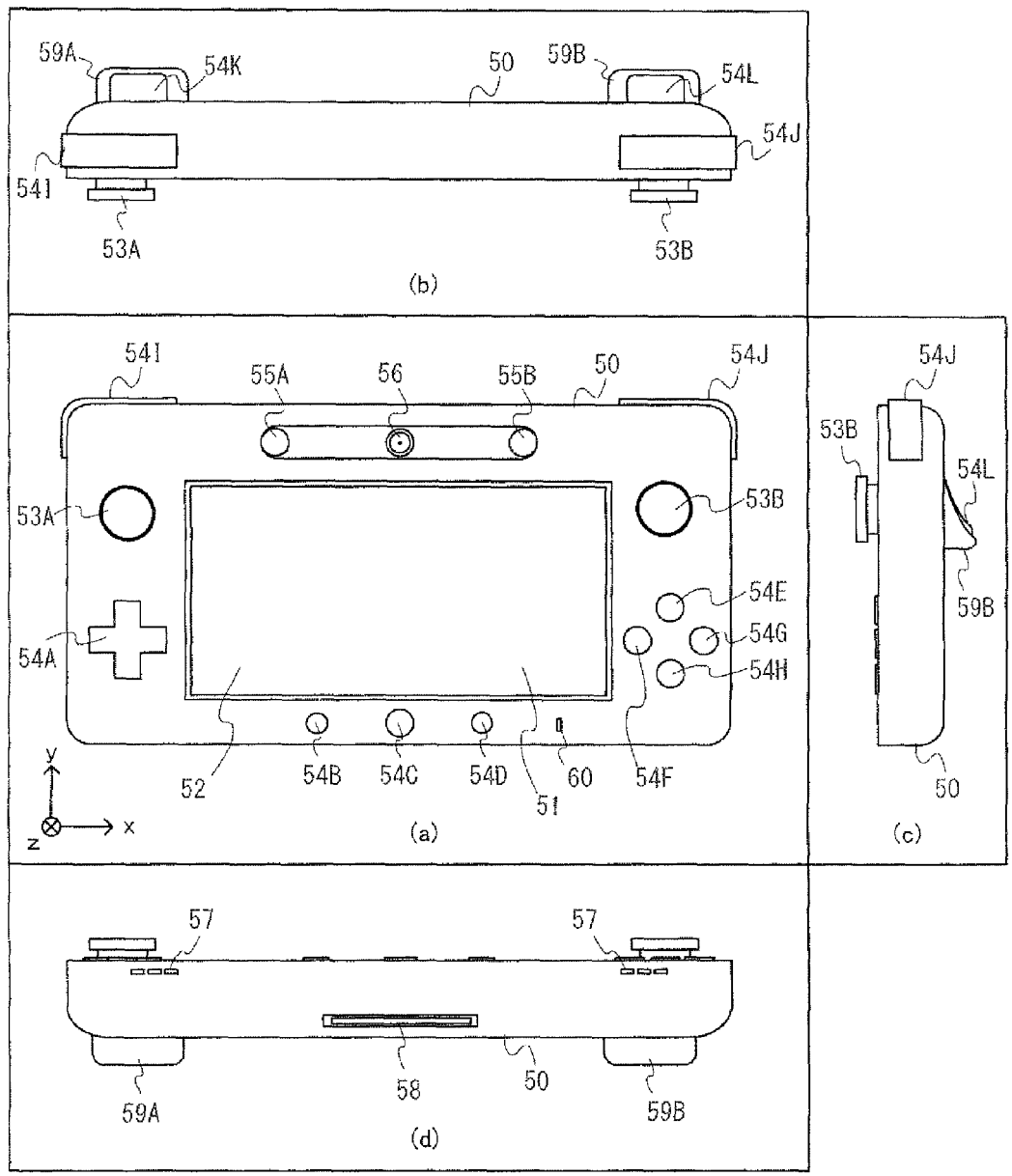
FIG. 8 is a diagram showing an external configuration of a terminal device 7.
Figure 9:
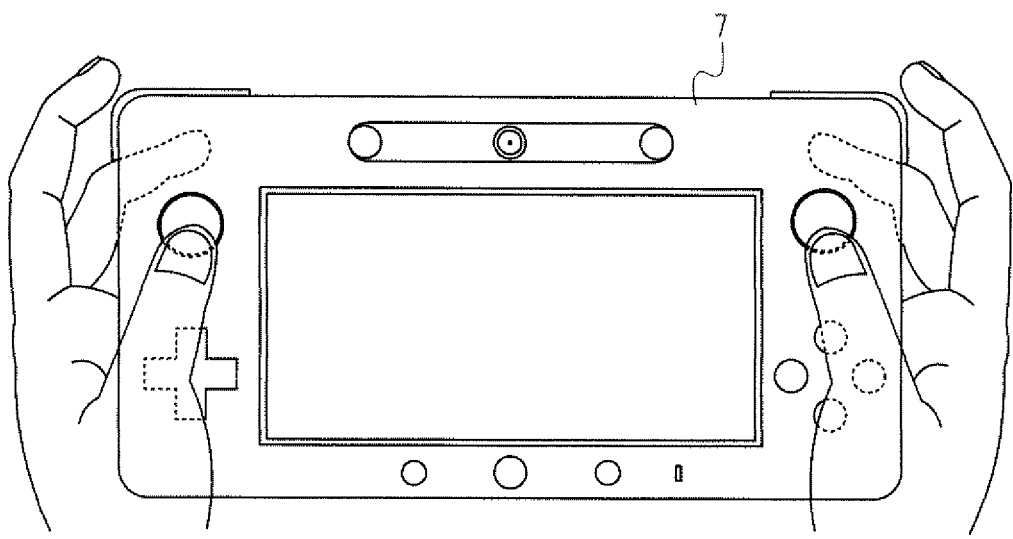
FIG. 9 is a diagram showing the terminal device 7 being held by the user.
Figure 10:
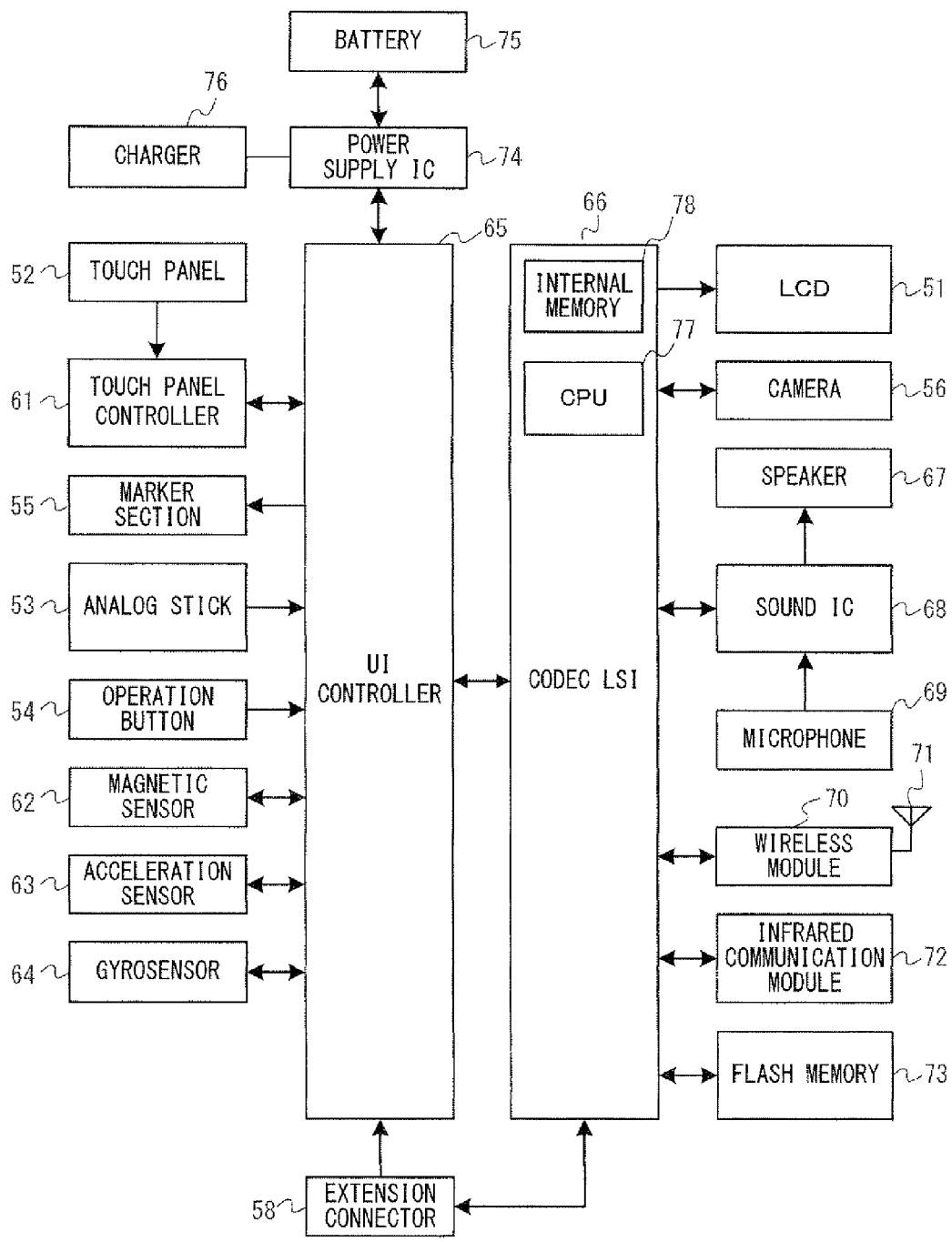
FIG. 10 is a block diagram showing an internal configuration of the terminal device 7.

Next, a configuration of the terminal device 7 will be described with reference to FIGS. 8 to 10. FIG. 8 is a diagram showing an external configuration of the terminal device 7. In FIG. 8, (a) is a front view of the terminal device 7, (b) is a top view thereof, (c) is a right side view thereof, and (d) is a bottom view thereof. FIG. 9 is a diagram showing the terminal device 7 being held by the user.

As shown in FIG. 8, the terminal device 7 includes a housing 50 generally in a horizontally-elongated rectangular plate shape. The housing 50 has such a size that it can be held by the user. Thus, the user can hold and move the terminal device 7, and can change the position where the terminal device 7 is placed. The terminal device 7 includes the LCD 51 on the surface of the housing 50. The LCD 51 is provided near the center of the surface of the housing 50. Therefore, the user can hold and move the terminal device while looking at the screen of the LCD 51 by holding opposing end portions of the housing 50 with respect to the LCD 51, as shown in FIG. 9. Note that while FIG. 9 shows an example where the user holds the terminal device 7 in a horizontal position (in a horizontally-oriented direction) by holding left and right opposing end portions of the housing 50 with respect to the LCD 51, the user can hold the terminal device 7 in a vertical position (in a vertically-oriented direction).

As shown in (a) of FIG. 8, the terminal device 7 includes the touch panel 52 on the screen of the LCD 51 as operation means. In the present embodiment, the touch panel 52 is a resistive-type touch panel. Note however that the touch panel is not limited to those of the resistive type, but may be a touch panel of any type including, for example, a capacitive type, etc. The touch panel 52 may be of a single-touch type or a multi-touch type. In the present embodiment, a touch panel having the same resolution (detection precision) as the resolution of the LCD 51 is used as the touch panel 52. Note however that the resolution of the touch panel 52 does not always need to coincide with the resolution of the LCD 51. While a stylus is usually used for making an input on the touch panel 52, the present invention is not limited to a stylus, and an input may be made on the touch panel 52 with a finger of the user. Note that the housing 50 may be provided with a hole for accommodating a stylus used for performing an operation on the touch panel 52. Thus, since the terminal device 7 includes the touch panel 52, the user can operate the touch panel 52 while moving the terminal device 7. That is, the user can move the screen of the LCD 51 while directly (by means of the touch panel 52) making an input on the screen.

As shown in FIG. 8, the terminal device 7 includes two analog sticks 53A and 53B and a plurality of buttons 54A to 54L, as operation means. The analog sticks 53A and 53B are each a direction-specifying device. The analog sticks 53A and 53B are each configured so that the stick portion operated with a finger of the user can be slid or tilted in any direction (at any angle in the upper, lower, left, right and diagonal directions) with respect to the surface of the housing 50. The left analog stick 53A is provided on the left side of the screen of the LCD 51, and the right analog stick 53B is provided on the right side of the screen of the LCD 51. Therefore, the user can make a direction-specifying input by using an analog stick with either the left or the right hand. As shown in FIG. 9, the analog sticks 53A and 53B are provided at such positions that the user can operate them while holding the left and right portions of the terminal device 7, and therefore the user can easily operate the analog sticks 53A and 53B even when holding and moving the terminal device 7.

The buttons 54A to 54L are each operation means for making a predetermined input. As will be illustrated below, the buttons 54A to 54L are provided at such positions that the user can operate them while holding the left and right portions of the terminal device 7 (see FIG. 9). Therefore, the user can easily operate these operation means even when holding and moving the terminal device 7.

As shown in (a) of FIG. 8, the cross button (direction-input button) 54A and the buttons 54B to 54H, of the operation buttons 54A to 54L, are provided on the front surface of the housing 50. That is, these buttons 54A to 54H are provided at such positions that they can be operated by the thumbs of the user (see FIG. 9).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify upper, lower, left and right directions. The buttons 54B to 54D are provided on the lower side of the LCD 51. These three buttons 54B to 54D are provided at such positions that they can be operated with either the left or the right hand. The four buttons 54E to 54H are provided on the right side of the LCD 51 and under the right analog stick 53B. That is, the four buttons 54E to 54H are provided at such positions that they can be operated with the right hand of the user. Moreover, the four buttons 54E to 54H are provided on the upper, lower, left and right side (of the center position among the four buttons 54E to 54H). Therefore, with the terminal device 7, the four buttons 54E to 54H can also serve as buttons with which the user specifies the upper, lower, left and right directions.

As shown in (a), (b) and (c) of FIG. 8, the first L button 54I and the first R button 54J are provided in upper corner portions of the housing 50 (the upper left portion and the upper right portion). Specifically, the first L button 54I is provided at the left end of the upper side surface of the plate-like housing 50 so that it is exposed on the upper and left side surfaces. The first R button 54J is provided at the right end of the upper side surface of the housing 50 so that it is exposed on the upper and right side surfaces. Thus, the first L button 54I is provided at such a position that it can be operated with the left index finger of the user, and the first R button 54J is provided at such a position that it can be operated with the right index finger of the user (see FIG. 9).

As shown in (b) and (c) of FIG. 8, the second L button 54K and the second R button 54L are provided on leg portions 59A and 59B protruding from the back surface of the plate-like housing 50 (i.e., the surface opposite to the front surface where the LCD 51 is provided). Specifically, the second L button 54K is provided slightly toward the upper side in the left portion (the left portion as viewed from the front surface side) of the back surface of the housing 50, and the second R button 54I is provided slightly toward the upper side in the right portion (the right portion as viewed from the front surface side) of the back surface of the housing 50. In other words, the second L button 54K is provided generally on the reverse side of the left analog stick 53A provided on the front surface, and the second R button 54L is provided generally on the reverse side of the right analog stick 53B provided on the front surface. Thus, the second L button 54K is provided at such a position that it can be operated with the left middle finger of the user, and the second R button 54L is provided at such a position that it can be operated with the right middle finger of the user (see FIG. 9). The second L button 54K and the second R button 54L are provided on the diagonally-upwardly-facing surfaces of the leg portions 59A and 59B, and have diagonally-upwardly-facing button surfaces, as shown in (c) of FIG. 8. It is believed that the middle fingers move in the up/down direction when the user holds the terminal device 7, and it will be easier for the user to press the second L button 54K and the second R button 54L if the button surfaces are facing upward. The provision of the leg portions on the back surface of the housing 50 makes it easier for the user to hold the housing 50, and the provision of the buttons on the leg portions makes it easier for the user to make an operation while holding the housing 50.

Note that with the terminal device 7 shown in FIG. 8, since the second 1, button 54K and the second R button 54L are provided on the back surface, when the terminal device 7 is put down with the screen of the LCD 51 (the front surface of the housing 50) facing up, the screen may not lie completely horizontal. Therefore, in other embodiments, three or more leg portions may be provided on the back surface of the housing 50. Then, it can be put down on the floor surface with the leg portions in contact with the floor surface with the screen of the LCD 51 facing up, and it is therefore possible to put down the terminal device 7 so that the screen lies horizontal. A detatchable leg portion may be added so that the terminal device 7 can be put down horizontally.

The buttons 54A to 54L are each assigned a function in accordance with the game program. For example, the cross button 54A and the buttons 54E to 54H may be used for a direction-specifying operation, a selection operation, etc., whereas the buttons 54B to 54E may be used for the OK operation, the cancel operation, etc.

Note that although not shown in the figures, the terminal device 7 may include a power button for turning ON/OFF the power of the terminal device 7. The terminal device 7 may include a button for turning ON/OFF the display of the screen of the LCD 51, a button for performing a connection setting (pairing) with the game device 3, and a button for adjusting the volume of the speaker (a speaker 67 shown in FIG. 10).

As shown in (a) of FIG. 8, the terminal device 7 includes a marker section including a marker 55A and a marker 55B (the marker section 55 shown in FIG. 10) on the front surface of the housing 50. The marker section 55 is provided on the upper side of the LCD 51. The marker 55A and the marker 55B are each formed by one or more infrared LED, as are the markers 6R and 6L of the marker device 6. The marker section 55 is used for the game device 3 to calculate the movement, etc., of the controller 5, as is the marker device 6 described above. The game device 3 can control the lighting of the infrared LEDs of the marker section 55.

The terminal device 7 includes the camera 56 as image-capturing means. The camera 56 includes an image-capturing element (e.g., a CCD image sensor, a CMOS image sensor, or the like) having a predetermined resolution, and a lens. As shown in FIG. 8, the camera 56 is provided on the front surface of the housing 50 in the present embodiment. Therefore, the camera 56 can capture an image of the face of the user holding the terminal device 7, and can capture an image of the user playing a game while looking at the LCD 51, for example.

Note that the terminal device 7 includes a microphone (a microphone 69 shown in FIG. 10) as sound input means. A microphone hole 60 is provided on the front surface of the housing 50. The microphone 69 is provided inside the housing 50 behind the microphone hole 60. The microphone detects the sound around the terminal device 7 such as the voice of the user.

The terminal device 7 includes a speaker (the speaker 67 shown in FIG. 10) as sound outputting means. As shown in (d) of FIG. 8, a speaker hole 57 is provided on the lower side surface of the housing 50. The output sound from the speaker 67 is outputted from the speaker hole 57. In the present embodiment, the terminal device 7 includes two speakers, and the speaker hole 57 is provided at the position of each of the left speaker and the right speaker.

The terminal device 7 includes an extension connector 58 via which another device can be connected to the terminal device 7. In the present embodiment, the extension connector 58 is provided on the lower side surface of the housing 50 as shown in of FIG. 8. Note that the other device connected to the extension connector 58 may be any device, and may be for example a game-specific controller (gun-shaped controller, etc.) or an input device such as a keyboard. The extension connector 58 may be absent if there is no need to connect another device.

Note that with the terminal device 7 shown in FIG. 8, the shape of each operation button, the shape of the housing 50, the number and the positions of the components, etc., are merely illustrative, and the present invention can be realized with other shapes, numbers, and positions.

Next, an internal configuration of the terminal device 7 will be described with reference to FIG. 10. FIG. 10 is a block diagram showing an internal configuration of the terminal device 7. As shown in FIG. 10, in addition to the configuration shown in FIG. 8, the terminal device 7 includes a touch panel controller 61, a magnetic sensor 62, the acceleration sensor 63, the gyrosensor 64, a user interface controller (UI controller) 65, a codec LSI 66, the speaker 67, a sound IC 68, the microphone 69, a wireless module 70, an antenna 71, an infrared communication module 72, a flash memory 73, a power supply IC 74, and a battery 75. These electronic components are mounted on an electronic circuit board and accommodated in the housing 50.

The UI controller 65 is a circuit for controlling the input/output of data to/from various types of input/output sections. The UI controller 65 is connected to the touch panel controller 61, an analog stick 53 (the analog sticks 53A and 53B), an operation button 54 (the operation buttons 54A to 54L), the marker section 55, the magnetic sensor 62, the acceleration sensor 63, and the gyrosensor 64. The UI controller 65 is connected to the codec LSI 66 and the extension connector 58. The power supply IC 74 is connected to the UT controller 65, and power is supplied to various sections via the UI controller 65. The built-in battery 75 is connected to the power supply IC 74 to supply power. A charger 76 or a cable with which power can be obtained from an external power source can be connected to the power supply IC 74 via a connector, or the like, and the terminal device 7 can receive power supply from or be charged by an external power source using the charger 76 or the cable. Note that the terminal device 7 may be charged by attaching the terminal device 7 to a cradle (not shown) having a charging function.

The touch panel controller 61 is a circuit connected to the touch panel 52 for controlling the touch panel 52. The touch panel controller 61 generates touch position data of a predetermined format based on a signal from the touch panel 52, and outputs it to the UI controller 65. The touch position data represents the coordinates of a position on the input surface of the touch panel 52 at which an input is made. Note that the touch panel controller 61 reads a signal from the touch panel 52 and generates touch position data at a rate of once per a predetermined amount of time. Various control instructions for the touch panel 52 are outputted from the UI controller 65 to the touch panel controller 61.

The analog stick 53 outputs, to the UI controller 65, stick data representing the direction and the amount of side (or tilt) of the stick portion operated with a finger of the user. The operation button 54 outputs, to the UI controller 65, operation button data representing the input status of each of the operation buttons 54A to 54L (whether it is pressed).

The magnetic sensor 62 detects the azimuthal direction by sensing the size and direction of the magnetic field. Azimuthal direction data representing the detected azimuthal direction is outputted to the UI controller 65. Control instructions for the magnetic sensor 62 are outputted from the UI controller 65 to the magnetic sensor 62. While there are sensors using an MI (magnetic impedance) element, a fluxgate sensor, a Hail element, a GMR (giant magneto-resistive) element, a TMR (tunnel magneto-resistance) element, an AMR (anisotropic magneto-resistive) element, etc., the magnetic sensor 62 may be any sensor as long as it is possible to detect the azimuthal direction. Note that strictly speaking, in a place where there is a magnetic field other than the geomagnetic field, the obtained azimuthal direction data does not represent the azimuthal direction. Nevertheless, if the terminal device 7 moves, the azimuthal direction data changes, and it is therefore possible to calculate the change in the attitude of the terminal device 7.

The acceleration sensor 63 is provided inside the housing 50 for detecting the magnitude of the linear acceleration along each of the directions of the three axes (the x, y and z axes shown in (a) of FIG. 8). Specifically, the acceleration sensor 63 detects the magnitude of the linear acceleration along each of the axes, where the x axis lies in the longitudinal direction of the housing 50, the y axis lies in the width direction of the housing 50, and the z axis lies in the direction vertical to the surface of the housing 50. Acceleration data representing the detected acceleration is outputted to the UI controller 65. Control instructions for the acceleration sensor 63 are outputted from the UI controller 65 to the acceleration sensor 63. While the acceleration sensor 63 is assumed to be a capacitive-type MEMS-type acceleration sensor, for example, in the present embodiment, other types of acceleration sensors may be employed in other embodiments. The acceleration sensor 63 may be an acceleration sensor for 1-axis or 2-axis detection.

The gyrosensor 64 is provided inside the housing 50 for detecting angular velocities about the three axes, i.e., the x axis, the y axis and the z axis. Angular velocity data representing the detected angular velocities is outputted to the UI controller 65. Control instructions for the gyrosensor 64 are outputted from the UI controller 65 to the gyrosensor 64. Note that the number and combination of gyrosensors used for detecting angular velocities about three axes may be any number and combination, and the gyrosensor 64 may be formed by a 2-axis gyrosensor and a 1-axis gyrosensor, as is the gyrosensor 48. The gyrosensor 64 may be a gyrosensor for 1-axis or 2-axis detection.

The UI controller 65 outputs, to the codec LSI 66, operation data including touch position data, stick data, operation button data, azimuthal direction data, acceleration data, and angular velocity data received from various components described above. Note that if another device is connected to the terminal device 7 via the extension connector 58, data representing an operation performed on the other device may be further included in the operation data.

The codec LSI 66 is a circuit for performing a compression process on data to be transmitted to the game device 3, and an expansion process on data transmitted from the game device 3. The LCD 51, the camera 56, the sound IC 68, the wireless module 70, the flash memory 73, and the infrared communication module 72 are connected to the codec LSI 66. The codec LSI 66 includes a CPU 77 and an internal memory 78. While the terminal device 7 does not perform the game process itself, the terminal device 7 needs to execute a minimal program for the management thereof and for the communication. The terminal device 7 is started up, when a program stored in the flash memory 73 is read out to the internal memory 78 and executed by the CPU 77 upon power-up. Some area of the internal memory 78 is used as the VRAM for the LCD 51.

The camera 56 captures an image in response to an instruction from the game device 3, and outputs the captured image data to the codec LSI 66. Control instructions for the camera 56, such as an image-capturing instruction, are outputted from the codec LSI 66 to the camera 56. Note that the camera 56 can also record a video. That is, the camera 56 can repeatedly capture images and repeatedly output the image data to the codec LSI 66.

The sound IC 68 is a circuit connected to the speaker 67 and the microphone 69 for controlling input/output of sound data to/from the speaker 67 and the microphone 69. That is, when sound data is received from the codec LSI 66, the sound IC 68 outputs a sound signal obtained by performing D/A conversion on the sound data to the speaker 67 so that a sound is outputted from the speaker 67. The microphone 69 detects the sound propagated to the terminal device 7 (the sound of the user, etc.), and outputs a sound signal representing such a sound to the sound IC 68. The sound IC 68 performs A/D conversion on the sound signal from the microphone 69 to output sound data of a predetermined format to the codec LSI 66.

The codec LSI 66 transmits, as terminal operation data, image data from the camera 56, sound data from the microphone 69 and operation data from the UI controller 65 to the game device 3 via the wireless module 70. In the present embodiment, the codec LSI 66 performs a compression process similar to that of the codec LSI 27 on the image data and the sound data. The terminal operation data and the compressed image data and sound data are outputted, as transmit data, to the wireless module 70. The antenna 71 is connected to the wireless module 70, and the wireless module 70 transmits the transmit data to the game device 3 via the antenna 71. The wireless module 70 has a similar function to that of the terminal communication module 28 of the game device 3. That is, the wireless module 70 has a function of connecting to a wireless LAN by a scheme in conformity with the IEEE802.11n standard, for example. The transmitted data may be encrypted as necessary or may not be encrypted.

As described above, the transmit data transmitted from the terminal device 7 to the game device 3 includes the operation data (the terminal operation data), the image data, and the sound data. Note that in a case where another device is connected to the terminal device 7 via the extension connector 58, data received from the other device may be further included in the transmit data. The infrared communication module 72 establishes infrared communication in conformity with the IRDA standard, for example, with the other device. The codec LSI 66 may transmit, to the game device 3, data received via the infrared communication while it is included in the transmit data as necessary.

As described above, the compressed image data and sound data are transmitted from the game device 3 to the terminal device 7. These data are received by the codec LSI 66 via the antenna 71 and the wireless module 70. The codec LSI 66 expands the received image data and sound data. The expanded image data is outputted to the LCD 51, and an image is displayed on the LCD 51. The expanded sound data is outputted to the sound IC 68, and the sound IC 68 outputs the sound from the speaker 67.

In a case where control data is included in data received from the game device 3, the codec LSI 66 and the UI controller 65 give control instructions to various sections in accordance with the control data. As described above, the control data is data representing control instructions for the components of the terminal device 7 (the camera 56, the touch panel controller 61, the marker section 55, sensors 62 to 64, and the infrared communication module 72 in the present embodiment). In the present embodiment, control instructions represented by control data may be instructions to activate the operation of the components or inactivate (stop) the operation thereof. That is, components that are not used in the game may be inactivated in order to reduce the power consumption, in which case it is ensured that data from the inactivated components are not included in the transmit data transmitted from the terminal device 7 to the game device 3. Note that for the marker section 55, which is an infrared LED, the control can be done simply by turning ON/OFF the power supply thereto.

While the terminal device 7 includes operation means such as the touch panel 52, the analog stick 53 and the operation button 54, as described above, other operation means may be included instead of, or in addition to, these operation means in other embodiments.

While the terminal device 7 includes the magnetic sensor 62, the acceleration sensor 63 and the gyrosensor 64 as sensors for calculating the movement of the terminal device 7 (including the position and the attitude thereof, or changes in the position and the attitude thereof), it may only include one or two of these sensors in other embodiments. In other embodiments, other sensors may be included instead of, or in addition to, these sensors.

While the terminal device 7 includes the camera 56 and the microphone 69, it may not include the camera 56 and the microphone 69 or it may include only one of them in other embodiments.

While the terminal device 7 includes the marker section 55 as a configuration for calculating the positional relationship between the terminal device 7 and the controller 5 (the position and/or attitude, etc., of the terminal device 7 as seen from the controller 5), it may not include the marker section 55 in other embodiments. In other embodiments, the terminal device 7 may include other means as a configuration for calculating the positional relationship. For example, in other embodiments, the controller 5 may include a marker section, and the terminal device 7 may include an image-capturing element. Moreover, in such a case, the marker device 6 may include an image-capturing element, instead of an infrared LED.

[5. Game Process]

Figure 11:
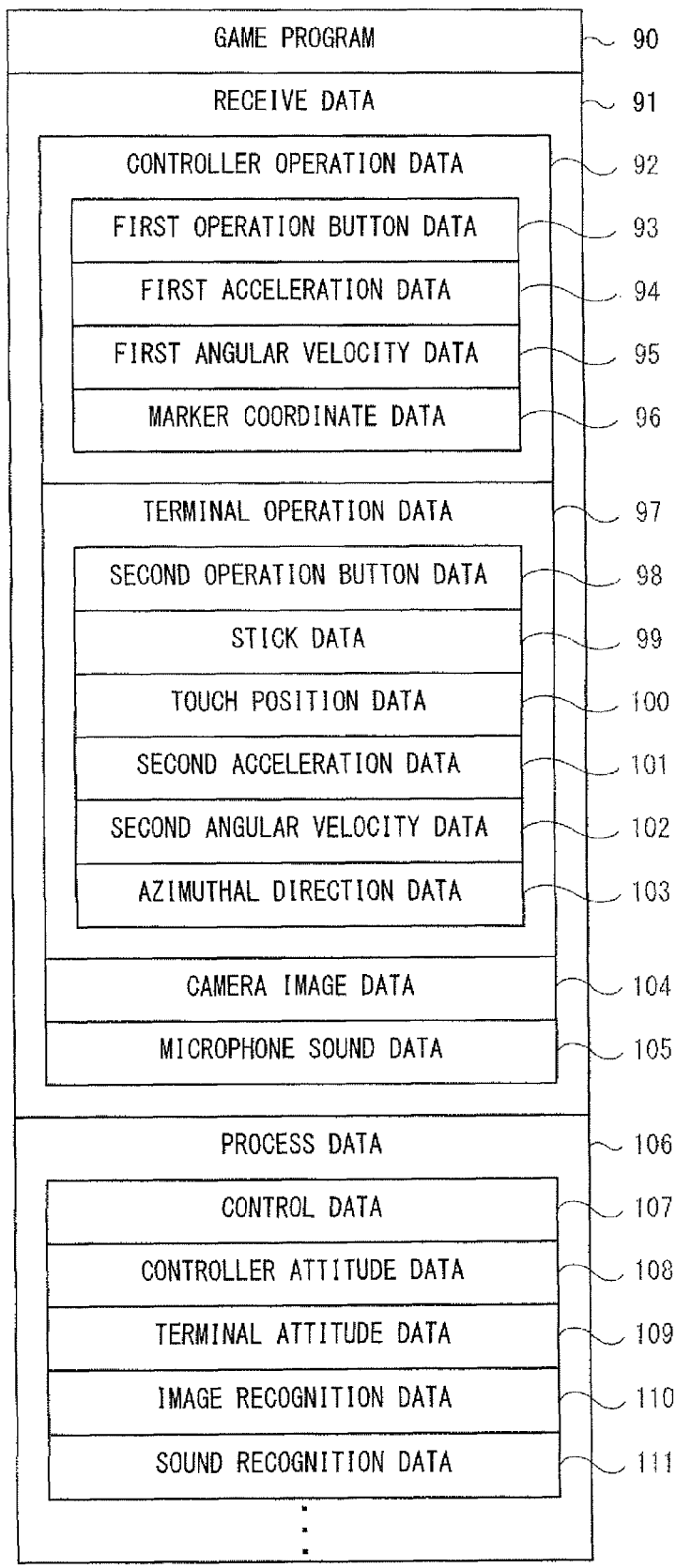
FIG. 11 is a table showing various data used in the game process.

Next, the details of the game process performed in the present game system will be described. First, various data used in the game process will be described. FIG. 11 is a table showing various data used in the game process. FIG. 11 is a table showing primary data to be stored in the main memory (the external main memory 12 or the internal main memory 11e) of the game device 3. As shown in FIG. 11, the main memory of the game device 3 stores a game program 90, receive data 91, and process data 106. Note that in addition to those shown in FIG. 11, the main memory also stores data necessary for the game, such as image data of various objects appearing in the game, and sound data used in the game, etc.

At an appropriate point in time after the power of the game device 3 is turned ON, a part or whole of the game program 90 is loaded from the optical disc 4 and stored in the main memory. Note that the game program 90 may be obtained from the flash memory 17 or an external device of the game device 3 (e.g., via the Internet), instead of from the optical disc 4. A part of the game program 90 (e.g., a program for calculating the attitude of the controller 5 and/or the terminal device 7) may be pre-stored in the game device 3.

The receive data 91 are various data received from the controller 5 and the terminal device 7. The receive data 91 includes controller operation data 92, terminal operation data 97, camera image data 104, and microphone sound data 105. If a plurality of controllers 5 are connected, there are a plurality of controller operation data 92. If a plurality of terminal devices 7 are connected, there are a plurality of terminal operation data 97, a plurality of camera image data 104, and a plurality of microphone sound data 105.

The controller operation data 92 is data representing an operation performed by the user (player) on the controller 5. The controller operation data 92 is transmitted from the controller 5 to be obtained by the game device 3 and stored in the main memory. The controller operation data 92 includes first operation button data 93, first acceleration data 94, first angular velocity data 95, and marker coordinate data 96. Note that the main memory may store a predetermined number of latest (lastly obtained) sets of controller operation data.

The first operation button data 93 is data representing the input status of the operation buttons 32a to 32i provided on the controller 5. Specifically, the first operation button data 93 represents whether each of the operation buttons 32a to 32i is pressed.

The first acceleration data 94 is data representing the acceleration (acceleration vector) detected by the acceleration sensor 37 of the controller 5. While the first acceleration data 94 herein represents three-dimensional acceleration of which each component is the acceleration for one of the three axis directions of X, Y and Z shown in FIG. 3, it may represent acceleration for any one or more direction in other embodiments.

The first angular velocity data 95 is data representing the angular velocity detected by the gyrosensor 48 in the controller 5. While the first angular velocity data 95 herein represents angular velocity about each of the three axes of X, Y and Z shown in FIG. 3, it may represent angular velocity about any one or more axis in other embodiments.

The marker coordinate data 96 is data representing coordinates calculated by the image processing circuit 41 of the image capturing/processing section 35, i.e., the marker coordinates described above. The marker coordinates are expressed in a two-dimensional coordinate system for representing a position on a plane corresponding to the captured image, and the marker coordinate data 96 represents coordinate values in the two-dimensional coordinate system.

Note that the controller operation data 92 may be data representing an operation by the user operating the controller 5, and may be data including only some of the data 93 to 96. In a case where the controller 5 includes other input means (e.g., a touch panel or an analog stick, etc.), the controller operation data 92 may include data representing an operation performed on the other input means. Note that in a case where the movement of the controller 5 itself is used as a game operation as in the present embodiment, the controller operation data 92 includes data whose value changes in accordance with the movement of the controller 5 itself, as is the first acceleration data 94, the first angular velocity data 95 or the marker coordinate data 96.

The terminal operation data 97 is data representing an operation performed by the user on the terminal device 7. The terminal operation data 97 is transmitted from the terminal device 7 and obtained by the game device 3 to be stored in the main memory. The terminal operation data 97 includes second operation button data 98, stick data 99, touch position data 100, second acceleration data 101, second angular velocity data 102, and azimuthal direction data. Note that the main memory may store a predetermined number of latest (lastly obtained) sets of terminal operation data.

The second operation button data 98 is data representing the input status of the operation buttons 54A to 54L provided on the terminal device 7. Specifically, the second operation button data 98 represents whether each of the operation buttons 54A to 54L is pressed.

The stick data 99 is data representing the direction and the amount of slide (or tilt) of the stick portion of the analog stick 53 (the analog sticks 53A and 53B). The direction and the amount may be represented as two-dimensional coordinates or a two-dimensional vector, for example.

The touch position data 100 is data representing the position (touch position) on the input surface of the touch panel 52 at which an input is made. In the present embodiment, the touch position data 100 represents coordinate values in a two-dimensional coordinate system for representing a position on the input surface. Note that in a case where the touch panel 52 is of a multi-touch type, the touch position data 100 may represent a plurality of touch positions.

The second acceleration data 101 is data representing the acceleration (acceleration vector) detected by the acceleration sensor 63. While the second acceleration data 101 represents three-dimensional acceleration of which each component is the acceleration for one of the three axes of x, y and z shown in FIG. 8 in the present embodiment, it may represent acceleration for any one or more direction in other embodiments.

The second angular velocity data 102 is data representing the angular velocity detected by the gyrosensor 64. While the second angular velocity data 102 represents angular velocity about each of the three axis directions of x, y and z shown in FIG. 8 in the present embodiment, it may represent angular velocity about any one or more axis in other embodiments.

Azimuthal direction data 103 is data representing the azimuthal direction detected by the magnetic sensor 62. In the present embodiment, the azimuthal direction data 103 represents the direction of a predetermined azimuthal direction (e.g., north) with respect to the terminal device 7. Note however that in a place where there is a magnetic field other than the geomagnetic field, the azimuthal direction data 103 does not strictly represent the absolute azimuthal direction (e.g., north). Nevertheless, it represents a relative direction of the terminal device 7 with respect to the direction of the magnetic field in that place, and it is therefore possible to calculate the change in the attitude of the terminal device 7 even in such cases.

Note that the terminal operation data 97 may be data representing an operation performed by the user on the terminal device 7, and may be data including only one of the data 98 to 103 described above. In a case where the terminal device 7 includes other input means (e.g., a touch pad, image-capturing means of the controller 5, etc.), the terminal operation data 97 may include data representing an operation performed on the other input means. Note that in a case where the movement of the terminal device 7 itself is used as a game operation as in the present embodiment, the terminal operation data 97 includes data whose value changes in accordance with the movement of the terminal device 7 itself, as is the second acceleration data 101, the second angular velocity data 102 or the azimuthal direction data 103.

The camera image data 104 is data representing the image (camera image) captured by the camera 56 of the terminal device 7. The camera image data 104 is image data obtained by the codec LSI 27 expanding the compressed image data from the terminal device 7, and the data is stored in the main memory by the input/output processor 11a. Note that the main memory may store a predetermined number of latest (lastly obtained) sets of camera image data.

The microphone sound data 105 is data representing the sound (microphone sound) detected by the microphone 69 of the terminal device 7. The microphone sound data 105 is sound data obtained by the codec LSI 27 expanding the compressed sound data transmitted from the terminal device 7, and the data is stored in the main memory by the input/output processor 11a.

The process data 106 is data used in the game process (FIG. 12) to be described later. The process data 106 includes control data 107, controller attitude data 108, terminal attitude data 109, image recognition data 110, and sound recognition data 111. Note that in addition to those shown in FIG. 11, the process data 106 also includes various data used in the game process, such as data representing various parameters set for various objects appearing in the game.

The control data 107 is data representing control instructions for the components of the terminal device 7. For example, the control data 107 represents an instruction for controlling the lighting of the marker section 55, an instruction for controlling the image-capturing operation of the camera 56, etc. The control data 107 is transmitted to the terminal device 7 at an appropriate point in time.

The controller attitude data 108 is data representing the attitude of the controller 5. In the present embodiment, the controller attitude data 108 is calculated based on the first acceleration data 94, the first angular velocity data 95 and the marker coordinate data 96 included in the controller operation data 92. The method for calculating the controller attitude data 108 will be described later in step S23.

The terminal attitude data 109 is data representing the attitude of the terminal device 7. In the present embodiment, the terminal attitude data 109 is calculated based on the second acceleration data 101, the second angular velocity data 102 and the azimuthal direction data 103 included in the terminal operation data 97. The method for calculating the terminal attitude data 109 will be described later in step S24.

The image recognition data 110 is data representing the results of a predetermined image recognition process for the camera image. The image recognition process may be any process as long as it detects any feature of the camera image to output the results of the detection, and may be, for example, a process of extracting a predetermined object (e.g., the face of the user, a marker, etc.) from the camera image and calculating information regarding the extracted object.

The sound recognition data 111 is data representing the results of a predetermined sound recognition process for the microphone sound. The sound recognition process may be any process as long as it detects any feature from the microphone sound to output the results of the detection, and may be, for example, a process of detecting words of the user or a process of simply outputting the sound volume.

Figure 12:
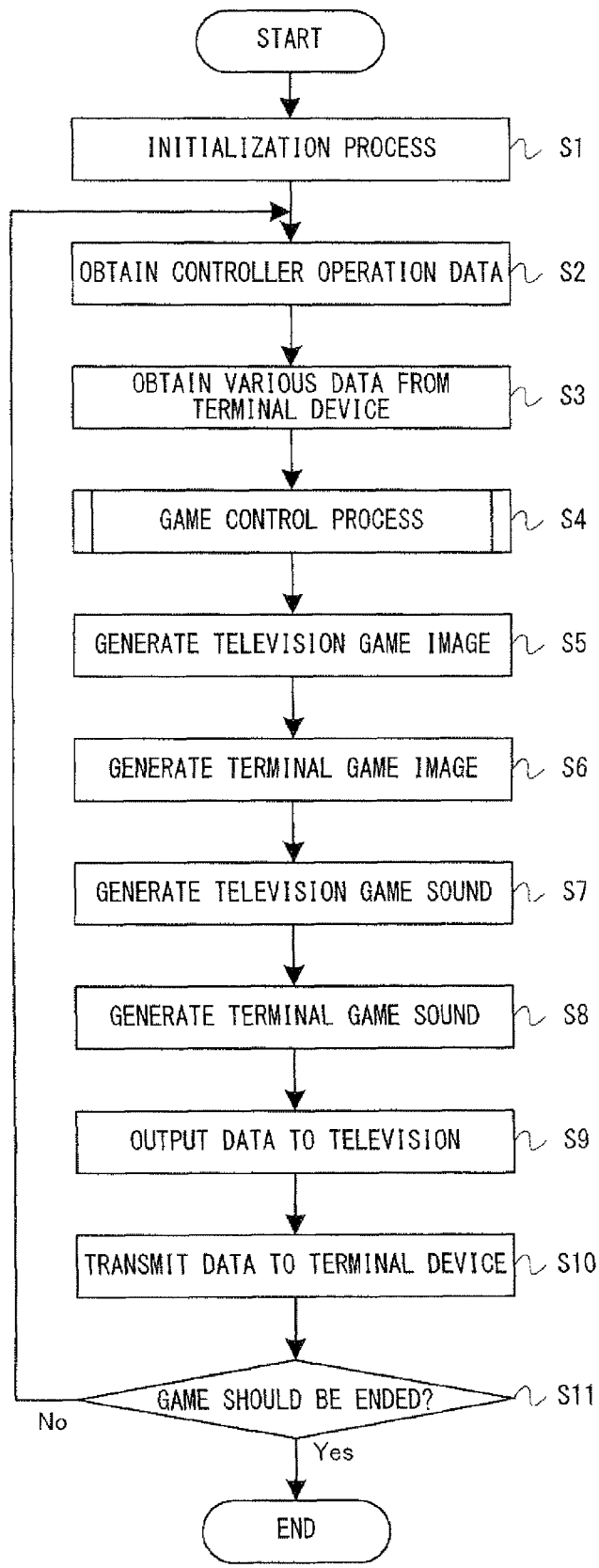
FIG. 12 is a main flow chart showing the flow of the game process performed by the game device 3.

Next, with reference to FIG. 12, the details of the game process performed by the game device 3 will be described. FIG. 12 is a main flow chart showing the flow of the game process performed by the game device 3. When the power of the game device 3 is turned ON, the CPU 10 of the game device 3 executes a boot program stored in a boot ROM not shown, so as to initialize each unit, including the main memory. Then, the game program stored in the optical disc 4 is loaded to the main memory, and the CPU 10 starts executing the game program. Note that the game device 3 may be configured so as to execute the game program stored in the optical disc 4 immediately after power-up, or it may be configured so that a built-in program is executed after power-up for displaying a predetermined menu screen first, and then the game program stored in the optical disc 4 is executed when the start of the game is instructed by the user. The flowchart of FIG. 12 is a flowchart showing the process to be performed after processes described above are completed.

Note that the process of the steps of the flowchart shown in FIG. 12 is merely illustrative, and the order of steps to be performed may be switched around as long as similar results are obtained. The values of the variables, and the threshold values used in determination steps are also merely illustrative, and other values may be used as necessary. While the present embodiment is described while assuming that the processes of the steps of the flow chart are performed by the CPU 10, processes of some of the steps may be performed by a processor or a dedicated circuit other than the CPU 10.

First, in step S1, the CPU 10 performs an initialization process. The initialization process is, for example, a process of constructing a virtual game space, placing objects appearing in the game space at their initial positions, and setting initial values of various parameters used in the game process.

In the present embodiment, in the initialization process, the CPU 10 controls the lighting of the marker device 6 and the marker section 55 based on the type of the game program. Here, the game system 1 has two image-capturing objects for the image-capturing means of the controller 5 (the image capturing/processing section 35), i.e., the marker device 6 and the marker section 55 of the terminal device 7. Either or both of the marker device 6 and the marker section 55 may be used, depending on the content of the game (the type of the game program). Note that the game program 90 includes data representing whether each of the marker device 6 and the marker section 55 should be lit. The CPU 10 reads out this data to determine whether or not to light them. When lighting the marker device 6 and/or the marker section 55, the following process is performed.

That is, when lighting the marker device 6, the CPU 10 transmits, to the marker device 6, a control signal instructing to light the infrared LEDs of the marker device 6. The transmission of the control signal may be simply supplying the power. In response to this, the infrared LEDs of the marker device 6 are lit. On the other hand, when lighting the marker section 55, the CPU 10 generates control data representing an instruction for lighting the marker section 55 and stores the data in the main memory. The generated control data is transmitted to the terminal device 7 in step S10 to be described later. The control data received by the wireless module 70 of the terminal device 7 is sent to the UI controller 65 via the codec LSI 66, and the UI controller 65 gives a lighting instruction to the marker section 55. This lights the infrared LEDs of the marker section 55. Note that while a case where the marker device 6 and the marker section 55 are lit has been described above, the marker device 6 and the marker section 55 can be turned off through a similar process to the process of lighting them.

The process of step S2 is performed, following step S1 described above. Thereafter, the process loop including a series of processes of steps S2 to S11 is repeatedly performed at a rate of once per a predetermined amount of time one frame period).

In step S2, the CPU 10 obtains controller operation data transmitted from the controller 5. Since the controller 5 repeatedly transmits the controller operation data to the game device 3, the controller operation data is successively received by the controller communication module 19 in the game device 3, and the received controller operation data is successively stored in the main memory by the input/output processor 11a. The transmission/reception interval is preferably shorter than the game process time, and is, for example, 1/200 sec. In step S2, the CPU 10 reads out the latest controller operation data 92 from the main memory. The process of step S3 is performed, following step S2.

In step S3, the CPU 10 obtains various data transmitted from the terminal device 7. Since the terminal device 7 repeatedly transmits the terminal operation data, the camera image data and the microphone sound data to the game device 3, the game device 3 successively receives these data. In the game device 3, the terminal communication module 28 successively receives these data, and the camera image data and the microphone sound data are successively expanded by the codec LSI 27. Then, the input/output processor 11a successively stores the terminal operation data, the camera image data and the microphone sound data in the main memory. In step S3, the CPU 10 reads out the latest terminal operation data 97 from the main memory. The process of step S4 is performed, following step S3.

In step S4, the CPU 10 performs the game control process. The game control process is a process for allowing the game to progress by, for example, performing processes such as controlling the action of an object in the game space in accordance with the game operation by the user. In the present embodiment, the user can play various games by using the controller 5 and/or the terminal device 7. Now, with reference to FIG. 13, the game control process will be described.

Figure 13:
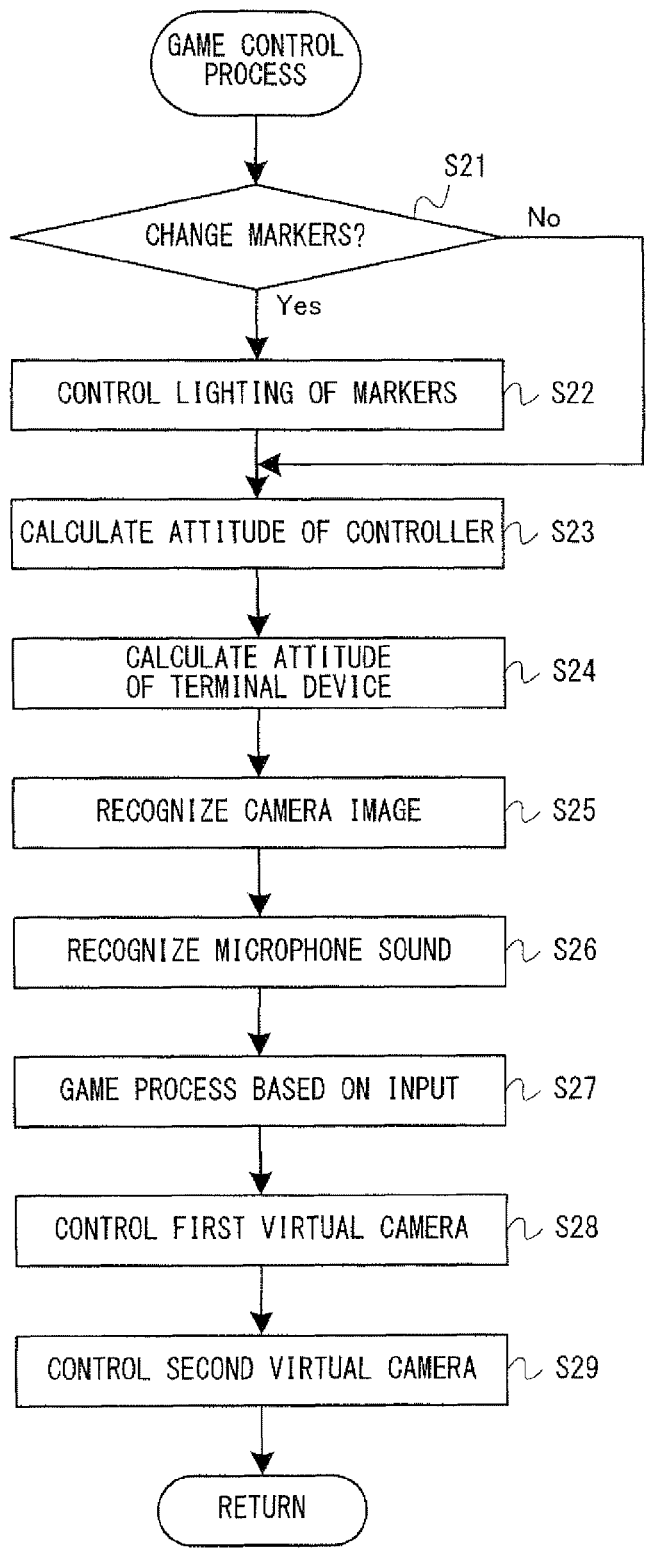
FIG. 13 is a flow chart showing the detailed, flow of the game control process.

FIG. 13 is a flow chart showing the detailed flow of the game control process. Note that while the series of processes shown in FIG. 13 are various processes that can be performed in a case where the controller 5 and the terminal device 7 are used as controller devices, it is not necessary to perform all of the processes, and only some of the processes may be performed depending on the type and content of the game.

In the game control process, first, in step S21, the CPU 10 determines whether or not to change the marker to be used. In the present embodiment, the process of controlling the lighting of the marker device 6 and the marker section 55 is performed at the start of the game process (step S1), as described above. Here, depending on the game, a marker or markers to be used (lit) among the marker device 6 and the marker section 55 may be changed in the middle of the game. It may be possible to use both the marker device 6 and the marker section 55 depending on the game, but if they are both lit, one of the markers may be erroneously detected for the other marker. Therefore, there are cases where it is preferred to switch the lighting during the game so that only one of them is lit. In view of such cases, the process of step S21 is a process of determining whether the object to be lit is changed in the middle of the game.

The determination of step S21 can be made by the following method, for example. That is, the CPU 10 can make the determination based on whether the game status (the stage of the game, the object to be controlled, etc.) has changed. When the game status changes, the control method may be switched between a control method in which the controller 5 is controlled facing the marker device 6, and a control method in which the controller 5 is controlled facing the marker section 55. The CPU 10 can make the determination based on the attitude of the controller 5. That is, the determination can be made based on whether the controller 5 is facing the marker device 6 or facing the marker section 55. Note that the attitude of the controller 5 can be calculated based on the detection results of the acceleration sensor 37 and the gyrosensor 48, for example (see step S23 to be described later). The CPU 10 can make the determination based on whether there has been an instruction of change from the user.

If the determination result of step S21 is affirmative, the process of step S22 is performed. On the other hand, if the determination result of step S21 is negative, the process of step S22 is skipped and the process of step S23 is performed.

In step S22, the CPU 10 controls the lighting of the marker device 6 and the marker section 55. That is, it changes the lighting status of the marker device 6 and/or the marker section 55. Note that the specific process of lighting or turning off the marker device 6 and/or the marker section 55 can be performed in a similar manner to that of step S1. The process of step S23 is performed, following step S22.

As described above, according to the present embodiment, the light emission (lighting) of the marker device 6 and the marker section 55 can be controlled depending on the type of the game program through the process of step S1, and the light emission (lighting) of the marker device 6 and the marker section 55 can be controlled in accordance with the game status through the process of steps S21 and S22.

In step S23, the CPU 10 calculates the attitude of the controller 5. In the present embodiment, the attitude of the controller 5 is calculated based on the first acceleration data 94, the first angular velocity data 95 and the marker coordinate data 96. The method for calculating the attitude of the controller 5 will now be described.

First, the CPU 10 calculates the attitude of the controller 5 based on the first angular velocity data 95 stored in the main memory. While the method for calculating the attitude of the controller 5 from the angular velocity may be any method, the attitude is calculated using the previous attitude (the attitude calculated in the previous iteration) and the current angular velocity (the angular velocity obtained in step S2 in the current iteration of the process loop). Specifically, the CPU 10 calculates the attitude by rotating the previous attitude by a unit time's worth of the current angular velocity. Note that the previous attitude is represented by the controller attitude data 108 stored in the main memory, and the current angular velocity is represented by the first angular velocity data 95 stored in the main memory. Therefore, the CPU 10 reads out the controller attitude data 108 and the first angular velocity data 95 from the main memory to calculate the attitude of the controller 5. The data representing "the attitude based on the angular velocity" calculated as described above is stored in the main memory.

Note that where the attitude is calculated from the angular velocity, it is preferred that an initial attitude is set. That is, where the attitude of the controller 5 is calculated from the angular velocity, the CPU 10 initially calculates the initial attitude of the controller 5. The initial attitude of the controller 5 may be calculated based on the acceleration data, or the player may be prompted to perform a predetermined operation with the controller 5 in a particular attitude so that the particular attitude at the point in time when the predetermined operation is performed is used as the initial attitude. Note that while it is preferred to calculate the initial attitude in a case where the attitude of the controller 5 is calculated as an absolute attitude with respect to a predetermined direction in the space, the initial attitude may not be calculated in a case where the attitude of the controller 5 is calculated as a relative attitude with respect to the attitude of the controller 5 at the start of the game, for example.

Next, the CPU 10 corrects the attitude of the controller 5 calculated based on the angular velocity by using the first acceleration data 94. Specifically, the CPU 10 first reads out the first acceleration data 94 from the main memory and calculates the attitude of the controller 5 based on the first acceleration data 94. Here, in a state where the controller 5 is substantially stationary, the acceleration acting upon the controller 5 means the gravitational acceleration. Therefore, in this state, the direction of the gravitational acceleration (the direction of gravity) can be calculated by using the first acceleration data 94 outputted from the acceleration sensor 37, and it is therefore possible to calculate the direction (attitude) of the controller 5 with respect to the direction of gravity based on the first acceleration data 94. The data representing "the attitude based on the acceleration" calculated as described above is stored in the main memory.

After calculating the attitude based on the acceleration, the CPU 10 then corrects the attitude based on the angular velocity by using the attitude based on the acceleration. Specifically, the CPU 10 reads out data representing the attitude based on the angular velocity and data representing the attitude based on the acceleration from the main memory, and makes a correction such that the attitude based on the angular velocity data is brought closer to the attitude based on the acceleration data at a predetermined rate. The predetermined rate may be a predetermined fixed value, and may be set in accordance with the acceleration represented by the first acceleration data 94, etc. With the attitude based on the acceleration, the attitude cannot be calculated for the rotation direction about the direction of gravity, and therefore the CPU 10 may not make a correction for the rotation direction. In the present embodiment, data representing the corrected attitude obtained as described above is stored in the main memory.

After the attitude based on the angular velocity is corrected as described above, the CPU 10 further corrects the corrected attitude using the marker coordinate data 96. First, the CPU 10 calculates the attitude of the controller 5 based on the marker coordinate data 96 (the attitude based on marker coordinates). Since the marker coordinate data 96 represents positions of the markers 6R and 6L within the captured image, the attitude of the controller 5 can be calculated for the roll direction (the rotation direction about the Z axis) can be calculated from these positions. That is, the attitude of the controller 5 for the roll direction can be calculated from the gradient of the straight line connecting between the position of the marker 6R and the position of the marker 6L within the captured image. In a case where the position of the controller 5 with respect to the marker device 6 can be identified (e.g., a case where it can be assumed that the controller 5 is located in front of the marker device 6), the attitude of the controller 5 for the pitch direction and that for the yaw direction can be calculated from the position of the marker device 6 within the captured image. For example, when the positions of the markers 6R and 6L move to the left within the captured image, it can be determined that the controller 5 has changed its orientation (attitude) to the right. Thus, the attitude of the controller 5 for the pitch direction and that for the yaw direction can be calculated from the positions of the marker 6R and the marker 6l. As described above, it is possible to calculate the attitude of the controller 5 based on the marker coordinate data 96.

After the attitude based on marker coordinates is calculated, the CPU 10 next corrects the corrected attitude (the attitude which has been corrected by the attitude based on the acceleration) by the attitude based on marker coordinates. That is, the CPU 10 makes a correction such that the corrected attitude is brought closer to the attitude based on marker coordinates at a predetermined rate. The predetermined rate may be a predetermined fixed value. The correction by the attitude based on marker coordinates may be made only for any one or two of the roll direction, the pitch direction and the yaw direction. For example, where the marker coordinate data 96 is used, since it is possible to calculate the attitude with high precision for the roll direction, the CPU 10 may make the correction using the attitude based on the marker coordinate data 96 only for the roll direction. If the image-capturing element 40 of the controller 5 does not capture the image of the marker device 6 or the marker section 55, it is not possible to calculate the attitude based on the marker coordinate data 96, and therefore the correction process using the marker coordinate data 96 may not be performed in such a case.

In the above description, the CPU 10 corrects the first attitude of the controller 5 calculated based on the first angular velocity data 95 using the first acceleration data 94 and the marker coordinate data 96. Here, with the method using the angular velocity, among the methods for calculating the attitude of the controller 5, it is possible to calculate the attitude no matter how the controller 5 is moving. On the other hand, with the method using the angular velocity, since the attitude is calculated by cumulatively adding the successively-detected angular velocities, accumulation of errors, or the like, may lead to poor precision, and a so-called "temperature drift" problem may deteriorate the precision of the gyrosensor. With the method using the acceleration, errors do not accumulate, but it is not possible to calculate the attitude with high precision in a state where the controller 5 is being moved violently (since the direction of gravity cannot be detected accurately). With the method using marker coordinates, the attitude can be calculated with high precision (particularly for the roll direction), but it is not possible to calculate the attitude in a state where it is not possible to capture an image of the marker section 55. As opposed to this, the attitude of the controller 5 can be calculated more accurately in the present embodiment since three different methods with different characteristics are used as described above. Note that in other embodiments, the attitude may be calculated by using any one or two of the three methods described above. Where the lighting of the markers is controlled in the process of step S1 or S22, it is preferred that the CPU 10 calculates the attitude of the controller 5 using at least marker coordinate.

The process of step S24 is performed, following step S23. In step S24, the CPU 10 calculates the attitude of the terminal device 7. That is, since the terminal operation data 97 obtained from the terminal device 7 includes the second acceleration data 101, the second angular velocity data 102, and the azimuthal direction data 103, the CPU 10 calculates the attitude of the terminal device 7 based on these data. Here, the CPU 10 can know the amount of rotation per unit time (the amount of change of the attitude) of the terminal device 7 from the second angular velocity data 102. In a state where the terminal device 7 is substantially stationary, the acceleration acting upon the terminal device 7 means the gravitational acceleration, and it is therefore possible to know, from the second acceleration data 101, the direction of gravity acting upon the terminal device 7, the attitude of the terminal device 7 with respect to the direction of gravity). It is possible to know, from the azimuthal direction data 103, a predetermined azimuthal direction with respect to the terminal device 7 (i.e., the attitude of the terminal device 7 with respect to a predetermined azimuthal direction). Note that even in a case where there is a magnetic field other than the geomagnetic field, it is possible to know the amount of rotation of the terminal device 7. Therefore, the CPU 10 can calculate the attitude of the terminal device 7 based on the second acceleration data 101, the second angular velocity data 102 and the azimuthal direction data 103. Note that while the attitude of the terminal device 7 is calculated based on the three data in the present embodiment, the attitude may be calculated based on one or two of the three data in other embodiments.

Note that while the specific method for calculating the attitude of the terminal device 7 may be any method, it is for example a method in which the attitude calculated based on the angular velocity represented by the second angular velocity data 102 is corrected using the second acceleration data 101 and the azimuthal direction data 103. Specifically, the CPU 10 first calculates the attitude of the terminal device 7 based on the second angular velocity data 102. Note that the method for calculating the attitude based on angular velocity may be similar to the method of step S23. Next, the CPU 10 corrects the attitude calculated based on the angular velocity by the attitude calculated based on the second acceleration data 101 and/or the attitude calculated based on the azimuthal direction data 103 at an appropriate point in time (e.g., when the terminal device 7 is close to being stationary). Note that the method for correcting the attitude based on the angular velocity by the attitude based on the acceleration may be similar to the method for calculating the attitude of the controller 5 described above. In a case where the attitude based on the angular velocity is corrected by the attitude based on the azimuthal direction data, the CPU 10 may bring the attitude based on the angular velocity closer to the attitude based on the azimuthal direction data at a predetermined rate. As described above, the CPU 10 can accurately calculate the attitude of the terminal device 7.

Note that since the controller 5 includes the image capturing/processing section 35 which is infrared detection means, the game device 3 can obtain the marker coordinate data 96. Therefore, for the controller 5, the game device 3 can know, from the marker coordinate data 96, the absolute attitude in the real space (the attitude of the controller 5 in the coordinate system set in the real space). On the other hand, the terminal device 7 does not include infrared detection means such as the image capturing/processing section 35. Therefore, the game device 3 cannot know, only from the second acceleration data 101 and the second angular velocity data 102, the absolute attitude in the real space for the rotation direction about the direction of gravity. In view of this, the present embodiment employs a configuration where the terminal device 7 includes the magnetic sensor 62, and the game device 3 obtains the azimuthal direction data 103. Then, for the rotation direction about the direction of gravity, the game device 3 can calculate the absolute attitude in the real space from the azimuthal direction data 103, and it is possible to more accurately calculate the attitude of the terminal device 7.

As a specific process of step S24, the CPU 10 reads out the second acceleration data 101, the second angular velocity data 102, and the azimuthal direction data 103 from the main memory, and calculates the attitude of the terminal device 7 based on these data. Then, the calculated data representing the attitude of the terminal device 7 is stored in the main memory as the terminal attitude data 109. The process of step S25 is performed, following step S24.

In step S25, the CPU 10 performs a recognition process for a camera image. That is, the CPU 10 performs a predetermined recognition process on the camera image data 104. The recognition process may be any process as long as it detects any feature from the camera image to output the results of the detection. For example, where the face of the player is included in the camera image, it may be a process of recognizing the face. Specifically, it may be a process of detecting parts of the face (eyes, nose, mouth, etc.) or a process of detecting the expression of the face. The data representing the results of the recognition process is stored in the main memory as the image recognition data 110. The process of step S26 is performed, following step S25.

In step S26, the CPU 10 performs a recognition process for the microphone sound. That is, the CPU 10 performs a predetermined recognition process on the microphone sound data 105. The recognition process may be any process as long as it detects any feature from the microphone sound to output the results of the detection. For example, it may be a process of detecting an instruction of the player from the microphone sound or a process of simply detecting the sound volume of the microphone sound. The data representing the results of the recognition process is stored in the main memory as the sound recognition data 111. The process of step S27 is performed, following step S26.

In step S27, the CPU 10 performs the game process in accordance with a game input. Herein, the game input may be any data as long as it is data transmitted from the controller 5 or the terminal device 7, or data obtained from such data. Specifically, the game input may be any of various data included in the controller operation data 92 and the terminal operation data 97, as well as data obtained from such data (the controller attitude data 108, the terminal attitude data 109, the image recognition data 110, and the sound recognition data 111). The content of the game process in step S27 may be any content, and it may be, for example, a process of controlling the action of an object (character) appearing in the game, a process of controlling a virtual camera, or a process of moving a cursor displayed on the screen. It may also be a process of using the camera image (or a portion thereof) as a game image, a process of using the microphone sound as a game sound, etc. Note that examples of the game process will be described later. In step S27, data representing the results of the game control process are stored in the main memory, such as, for example, data of various parameters set for the character (object) appearing in the game, data of parameters regarding the virtual camera provided in the game space, and score data. After step S27, the CPU 10 ends the game control process of step S4.

Referring back to FIG. 12, in step S5, a television game image to be displayed on the television 2 is generated by the CPU 10 and the GPU 11b. That is, the CPU 10 and the CPU 11b read out data representing the results of the game control process of step S4 from the main memory and readout data necessary for generating a game image from the VRAM 11d to generate a game image. The game image may be any image as long as it represents the results of the game control process of step S4, and it may be generated by any method. For example, the game image generation method may be a method in which a virtual camera is provided in the virtual game space, and a three-dimensional CG image is generated by calculating the game space as seen from the virtual camera, or a method in which a two-dimensional image is generated (without using a virtual camera). The generated television game image is stored in the VRAM 11d. The process of step S6 is performed, following step S5.

In step S6, a terminal game image to be displayed on the terminal device 7 is generated by the CPU 10 and the GPU 11b. As with the television game image, the terminal game image may be any image as long as it represents the results of the game control process of step S4, and it may be generated by any method. The terminal game image may be generated by a method similar to that for the television game image or may be generated by a different method. The generated terminal game image is stored in the VRAM 11d. Note that depending on the content of the game, the television game image and the terminal game image may be the same, in which case it is not necessary to perform the process of generating a game image in step S6. The process of step S7 is performed, following step S6.

In step S7, a television game sound to be outputted to the speaker 2a of the television 2 is generated. That is, the CPU 10 has the DSP 11c generate a game sound in accordance with the results of the game control process of step S4. Note that the generated game sound may be, for example, a sound effect of the game, the voice of a character appearing in the game, BCM, etc. The process of step S8 is performed, following step S7.

In step S8, a terminal game sound to be outputted to the speaker 67 of the terminal device 7 is generated. That is, the CPU 10 has the DSP 11c generate a game sound in accordance with the results of the game control process of step S4. Note that the terminal game sound may be the same as, or different from, the television game sound. They may be partially different from each other, e.g., differing from each other with the sound effect but being the same with the BCM. Note that in a case where the television game sound and the terminal game sound are the same, the game sound generating process may not be performed in step S8. The process of step S9 is performed, following step S8.

In step S9, the CPU 10 outputs a game image and a game sound to the television 2. Specifically, the CPU 10 sends the data of the television game image stored in the VRAM 11d and the data of the television game sound generated by the DSP 11c in step S7 to the AV-IC 15. In response to this, the AV-IC 15 outputs the image and sound data to the television 2 via the AV connector 16. Thus, the television game image is displayed on the television 2, and the television game sound is outputted from the speaker 2a. The process of step S10 is performed, following step S9.

In step S10, the CPU 10 transmits a game image and a game sound to the terminal device 7. Specifically, the image data which is a terminal game image stored in the VRAM 11d and the sound data generated by the DSP 11c in step S8 are sent by the CPU 10 to the codec LSI 27, and are subjected to a predetermined compression process by the codec LSI 27. Moreover, the image and sound data which have been subjected to the compression process are transmitted by the terminal communication module 28 to the terminal device 7 via the antenna 29. The terminal device 7 receives the image and sound data transmitted from the game device 3 by the wireless module 70, and the data are subjected to a predetermined expansion process by the codec LSI 66. The image data which has been subjected to the expansion process is outputted to the LCD 51, and the sound data which has been subjected to the expansion process is outputted to the sound IC 68. Thus, the terminal game image is displayed on the LCD 51, and the terminal game sound is outputted from the speaker 67. The process of step S11 is performed, following step S10.

In step S11, the CPU 10 determines whether the game should be ended. The determination of step S11 is made based on, for example, whether the game has been over, the user has given an instruction to quit the game, etc. If the determination result of step S11 is negative, the process of step S2 is performed again. On the other hand, if the determination result of step S11 is affirmative, the CPU 10 ends the game process shown in FIG. 12. The series of processes through steps S2 to S11 is repeatedly performed until it is determined in step S11 that the game should be ended.

As described above, in the present embodiment, the terminal device 7 includes the touch panel 52, and an inertia sensor such as the acceleration sensor 63 or the gyrosensor 64, and the outputs of the touch panel 52 and the inertia sensor are transmitted as operation data to the game device 3, and used as a game input (steps S3 and S4). Moreover, the terminal device 7 includes a display device (the LCD 51), and a game image obtained by the game process is displayed on the LCD 51 (steps S6 and S10). Therefore, the user can perform an operation of directly touching on the game image using the touch panel 52, and an operation of moving the LCD 51 itself on which the game image is displayed (since the movement of the terminal device 7 is detected by the inertia sensor). With these operations, the user can play a game with such game play as if the user were directly operating the game image, and it is therefore possible to provide a game with novel game play such as the first and second game examples to be described later, for example.

Moreover, in the present embodiment, the terminal device 7 includes the analog stick 53 and the operation button 54 which can be operated while holding the terminal device 7, and the game device 3 can use, as a game input, the operation performed on the analog stick 53 and the operation button 54 (steps S3 and S4). Therefore, even where the game image is directly operated as described above, the user can perform a more detailed game operation through the button operation and the stick operation.

Moreover, in the present embodiment, the terminal device 7 includes the camera 56 and the microphone 69, and data of the camera image captured by the camera 56 and data of the microphone sound detected by the microphone 69 are transmitted to the game device 3 (step S3). Therefore, with the game device 3, since the camera image and/or microphone sound can be used as a game input, the user can perform a game operation through an operation of capturing an image with the camera 56 or an operation of inputting sound to the microphone 69. Note that since these operations can be performed while holding the terminal device 7, the user can perform a greater variety of game operations by performing such operations when directly operating the game image as described above.

In the present embodiment, since a game image is displayed on the LCD 51 which is the terminal device 7 of a portable type (steps S6 and S10), the user can arbitrarily place the terminal device 7. Therefore, where the controller 5 is operated while being pointed toward the marker, the user can play a game while pointing the controller 5 toward an arbitrary direction by placing the terminal device 7 at an arbitrary position, thus improving the degree of freedom in the operation of the controller 5. Since the terminal device 7 can be placed at an arbitrary position, it is possible to provide a more realistic game by placing the terminal device 7 at a position suitable for the content of the game, as in the fifth game example to be described later, for example.

According to the present embodiment, since the game device 3 obtains operation data, etc., from the controller 5 and the terminal device 7 (steps S2 and S3), the user can use two devices of the controller 5 and the terminal device 7 as operation means. Therefore, in the game system 1, a game can be played with multiple users where the devices are used by a plurality of users, or a game can be played with a single user using the two devices.

According to the present embodiment, the game device 3 generates two types of game images (steps S5 and S6), and the game images are displayed on the television 2 and the terminal device 7 (steps S9 and S10). Thus, as the two types of game images are displayed on different devices, it is possible to provide game images that are easier for the user to view, and it is possible to improve the playability of the game. For example, where a game is played by two players, a game image from a viewpoint that is easier for one user to view may be displayed on the television 2 while a game image from a viewpoint that is easier for the other user to view is displayed on the terminal device 7, as in the third or fourth game example to be described later, in which case each player can play the game with a viewpoint that is easier for the player to view. Even if the game is played by one player, for example, if two types of game images are displayed from two different viewpoints, as in the first, second and fifth game examples to be described later, the player can more easily grasp the state of the game space, and it is therefore possible to improve the playability of the game.

[6. Game Examples]

Next, specific examples of games to be played on the game system 1 will be described. Note that game examples to be described below may not use some of the components of the device in the game system 1 and may not perform some of the series of processes shown in FIGS. 12 and 13. That is, the game system 1 does not need to include all the components described above, and the game device 3 may not perform some of the series of processes shown in FIGS. 12 and 13.

(First Game Example)

The first game example is a game in which an object (a shuriken, or a throwing star) is thrown in the game space by operating the terminal device 7. The player can specify the direction in which a shuriken is thrown through an operation of changing the attitude of the terminal device 7 and an operation of drawing a line on the touch panel 52.

Figure 14:
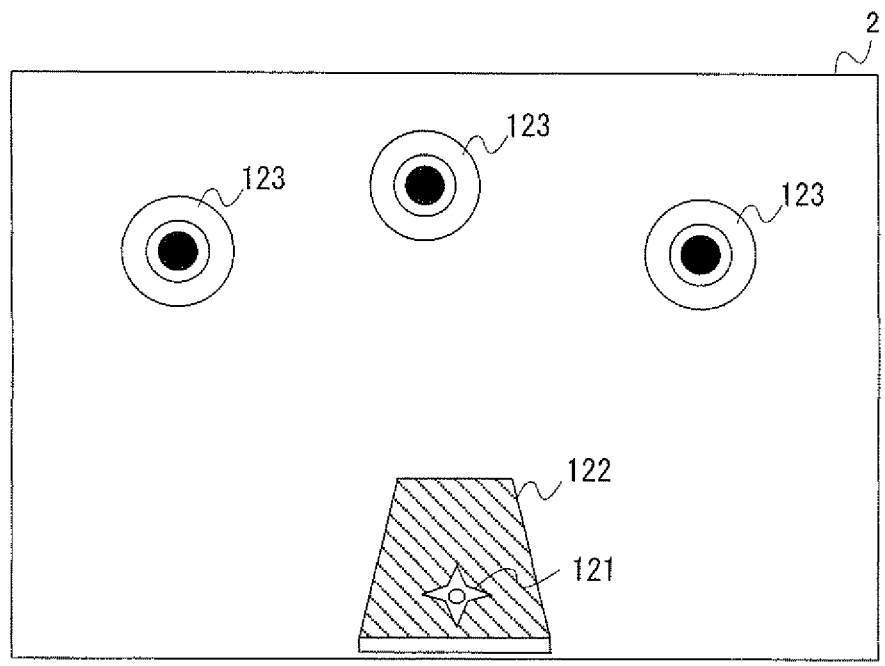
FIG. 14 is a diagram showing the screen of a television 2 and the terminal device 7 in the first game example.
Figure 14:
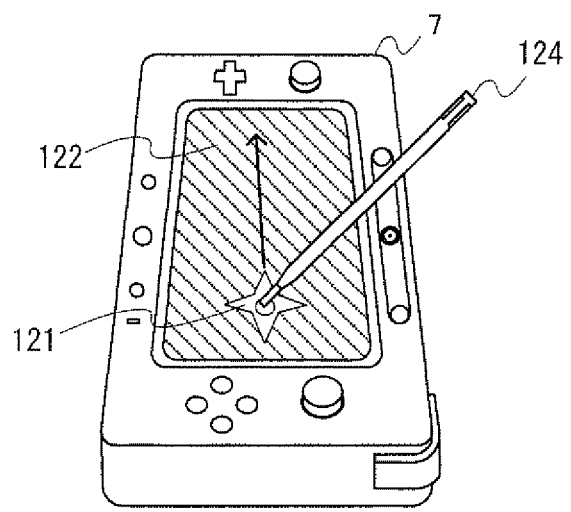

FIG. 14 is a diagram showing the screen of the television 2 and the terminal device 7 in the first game example. In FIG. 14, a game image representing the game space is displayed on the television 2 and the LCD 51 of the terminal device 7. A shuriken 121, a control surface 122 and a target 123 are displayed on the television 2. The control surface 122 (and the shuriken 121) are displayed on the LCD 51. In the first game example, the player plays the game by throwing the shuriken 121 at the target 123 through an operation using the terminal device 7.

When throwing the shuriken 121, the player first changes the attitude of the control surface 122 provided in the virtual game space to an intended attitude by operating the attitude of the terminal device 7. That is, the CPU 10 calculates the attitude of the terminal device 7 based on the outputs of the inertia sensor (the acceleration sensor 63 and the gyrosensor 64) and the magnetic sensor 62 (step S24), and changes the attitude of the control surface 122 based on the calculated attitude (step S27). In the first game example, the attitude of the control surface 122 is controlled so as to be an attitude in accordance with the attitude of the terminal device 7 in the real space. That is, the player can change the attitude of the control surface 122 in the game space by changing the attitude of the terminal device 7 (the control surface 122 displayed on the terminal device 7). Note that in the first game example, the position of the control surface 122 is fixed at a predetermined position in the game space.

Next, the player performs an operation of drawing a line on the touch panel 52 using a stylus 124, or the like (see an arrow shown in FIG. 14). Here, in the first game example, the control surface 122 is displayed on the LCD 51 of the terminal device 7 so that the input surface of the touch panel 52 and the control surface 122 correspond to each other. Therefore, based on the line drawn on the touch panel 52, it is possible to calculate the direction on the control surface 122 (the direction represented by the line). The shuriken 121 is thrown in a direction thus determined. As described above, the CPU 10 performs a process of calculating the direction on the control surface 122 from the touch position data 100 of the touch panel 52, and moving the shuriken 121 in the calculated direction (step S27). Note that the CPU 10 may control the speed of the shuriken 121 in accordance with the length of the line or the speed at which the line is drawn, for example.

As described above, in the first game example, the game device 3 can move the control surface 122 in accordance with the movement (attitude) of the terminal device 7 by using the output of the inertia sensor as a game input, and identify the direction on the control surface 122 by using the output of the touch panel 52 as a game input. Thus, the player can move the game image displayed on the terminal device 7 (the image of the control surface 122) and perform a touch operation on the game image, and can therefore play a game with such novel game play as if the player were directly operating the game image.

In the first game example, it is possible to easily specify a direction in a three-dimensional space by using sensor outputs of the inertia sensor and the touch panel 52 as a game input. That is, the player can easily specify a direction with such an intuitive operation as if the player were actually inputting a direction in the space, by actually adjusting the attitude of the terminal device 7 with one hand while inputting a direction with a line on the touch panel 52 with the other hand. Moreover, since the player can perform the operation on the attitude of the terminal device 7 and the input operation on the touch panel 52 simultaneously in parallel to each other, it is possible to quickly perform the operation of specifying a direction in a three-dimensional space.

In the first game example, the control surface 122 is displayed across the entire screen of the terminal device 7 so as to facilitate the touch input operation on the control surface 122. On the other hand, the television 2 displays an image of the game space including the entire control surface 122 and the target 123 (see FIG. 14) so that it is easy to grasp the attitude of the control surface 122 and aim at the target 123. That is, in step S27, the first virtual camera for generating the television game image is set so that the entire control surface 122 and the target 123 are included in the range of viewing field, whereas the second virtual camera for generating the terminal game image is set so that the screen of the LCD 51 (the input surface of the touch panel 52) and the control surface 122 coincide with each other on the screen. Therefore, in the first game example, images of the game space as seen from different viewpoints are displayed on the television 2 and on the terminal device 7, thereby facilitating the game operation.

(Second Game Example)

Note that the game using sensor outputs of the inertia sensor and the touch panel 52 as a game input is not limited to the first game example described above, and may be any of various game examples. As is the first game example, the second game example is a game in which an object (cannonball) is thrown in the game space by operating the terminal device 7. The player can specify the direction in which the cannonball is thrown through an operation of changing the attitude of the terminal device 7 and an operation of specifying a position on the touch panel 52.

Figure 15:
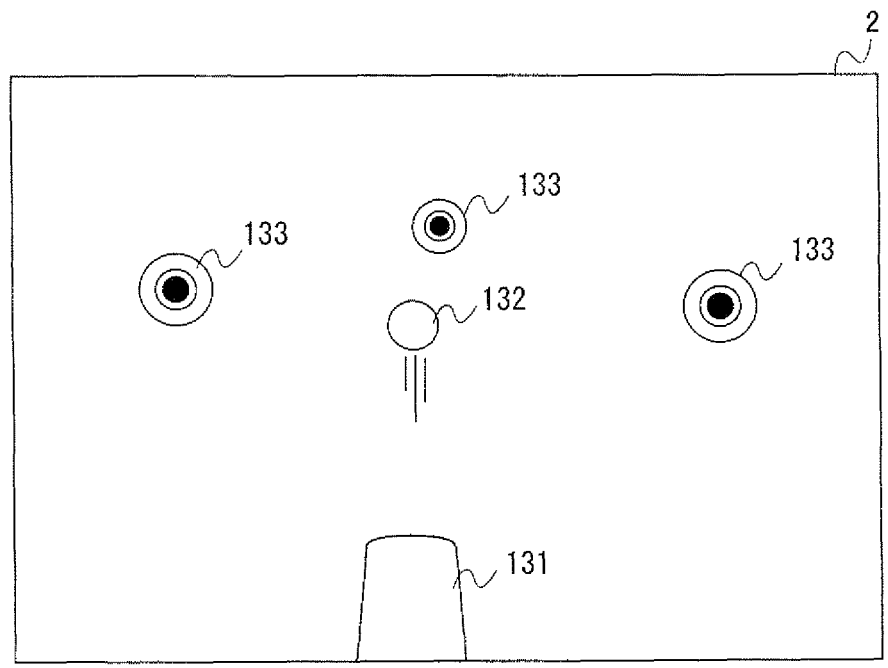
FIG. 15 is a diagram showing the screen of the television 2 and the terminal device 7 in the second game example.
Figure 15:
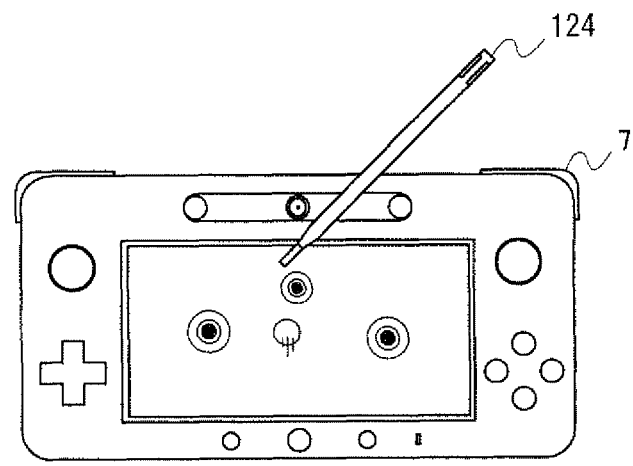

FIG. 15 is a diagram showing the screen of the television 2 and the terminal device 7 in the second game example. In FIG. 15, a cannon 131, a cannonball 132 and a target 133 are displayed on the television 2. The cannonball 132 and the target 133 are displayed on the terminal device 7. The terminal game image displayed on the terminal device 7 is an image of the game space as seen from the position of the cannon 131.

In the second game example, the player can change the range of display to be displayed on the terminal device 7 as the terminal game image by operating the attitude of the terminal device 7. That is, the CPU 10 calculates the attitude of the terminal device 7 based on the outputs of the inertia sensors (the acceleration sensor 63 and the gyrosensor 64) and the magnetic sensor 62 (step S24), and controls the position and the attitude of the second virtual camera for generating the terminal game image based on the calculated attitude (step S27). Specifically, the second virtual camera is placed at the position of the cannon 131 and the orientation (attitude) thereof is controlled in accordance with the attitude of the terminal device 7. Thus, the player can change the range of the game space to be displayed on the terminal device 7 by changing the attitude of the terminal device 7.

In the second game example, the player specifies the direction in which the cannonball 132 is to be thrown by an operation of inputting a point on the touch panel 52 (a touch operation). Specifically, as the process of step S27, the CPU 10 calculates the position (control position) in the game space corresponding to the touch position, and calculates, as the throwing direction, the direction from a predetermined position in the game space (e.g., the position of the cannon 131) to the control position. Then, the CPU 10 performs a process of moving the cannonball 132 in the throwing direction. Thus, while the player performs an operation of drawing a line on the touch panel 52 in the first game example, the player performs an operation of specifying a point on the touch panel 52 in the second game example. Note that the control position can be calculated by setting a control surface similar to that of the first game example (note however that the control surface is not displayed in the second game example). That is, the position on the control surface corresponding to the touch position can be calculated as the control position by placing the control surface in accordance with the attitude of the second virtual camera so as to correspond to the display range of the terminal device 7 (specifically, the control surface rotates about the position of the cannon 131 in accordance with the change in the attitude of the terminal device 7).

In the second game example, the game device 3 can change the display range of the terminal game image in accordance with the movement (attitude) of the terminal device 7 by using the output of the inertia sensor as a game input, and can specify a direction in the game space (the direction in which the cannonball 132 is thrown) by using the touch input specifying a position within the display range as a game input. Thus, also in the second game example, as in the first game example, the player can move the game image displayed on the terminal device 7 or perform a touch operation on the game image, and can therefore play a game with such novel game play as if the player were directly operating the game image.

Also in the second game example, as in the first game example, the player can easily specify a direction with such an intuitive operation as if the player were actually inputting a direction in the space, by actually adjusting the attitude of the terminal device 7 with one hand while performing a touch input on the touch panel 52 with the other hand. Moreover, since the player can perform an operation on the attitude of the terminal device 7 and an input operation on the touch panel 52 simultaneously in parallel to each other, it is possible to quickly perform the operation of specifying a direction in a three-dimensional space.

Note that in the second game example, while the image displayed on the television 2 may be an image from the same viewpoint as the terminal device 7, the game device 3 displays an image from a different viewpoint in FIG. 15. That is, while the second virtual camera for generating the terminal game image is set at the position of the cannon 131, the first virtual camera for generating the television game image is set at a position behind the cannon 131. Here, for example, if a range that cannot be seen on the screen of the terminal device 7 is displayed on the television 2, it is possible to realize such gameplay that the player aims at the target 133, which cannot be seen on the screen of the terminal device 7, while looking at the screen of the television 2. Thus, by having different display ranges for the television 2 and for the terminal device 7, it is possible not only to make it easier to grasp the state of the game space but also to further improve the playability of the game.

As described above, according to the present embodiment, since the terminal device 7 including the touch panel 52 and the inertia sensor can be used as a controller device, it is possible to realize a game with such game play as if the player were directly operating the game image, as in the first and second game examples.

(Third Game Example)

Figure 16:
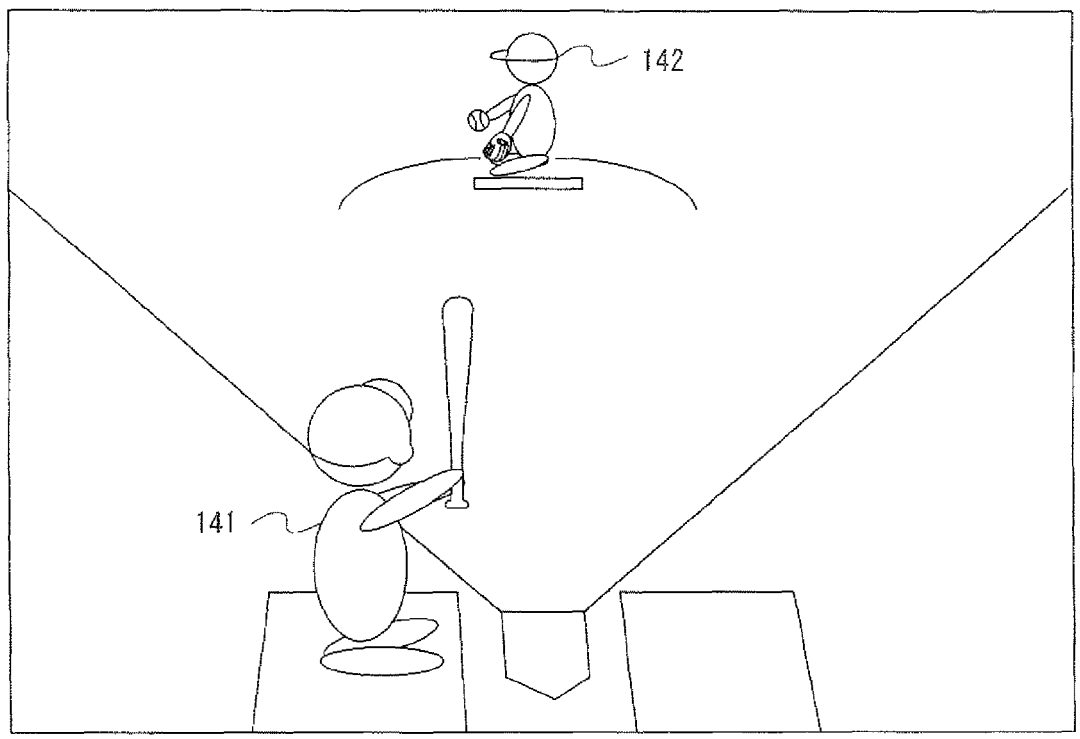
FIG. 16 is a diagram showing an example of a television game image displayed on the television 2 in the third game example.
Figure 17:
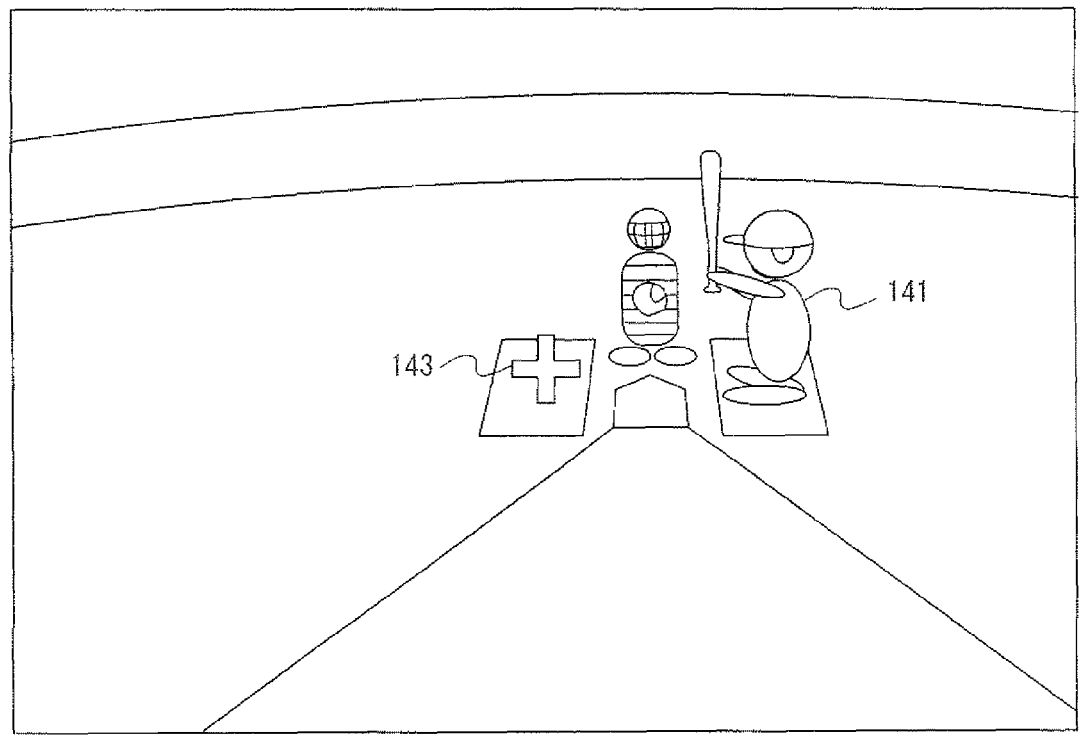
FIG. 17 is a diagram showing an example of a terminal game image displayed on the terminal device 7 in the third game example.

Referring now to FIGS. 16 and 17, the third game example will be described. The third game example is a baseball game in which two players compete with each other. That is, the first player uses the controller 5 to control a batter, while the second player uses the terminal device 7 to control a pitcher. The television 2 and the terminal device 7 display game images which are easy for the respective players to perform operations with.

FIG. 16 is a diagram showing an example of a television game image displayed on the television 2 in the third game example. The television game image shown in FIG. 16 is an image primarily for the first player. That is, the television game image represents the game space showing a pitcher (pitcher object) 142 which is the object to be controlled by the second player as seen from the side of a batter (batter object) 141 which is the object to be controlled by the first player. The first virtual camera for generating the television game image is placed at a position behind the batter 141 so as to be directed from the batter 141 toward the pitcher 142.

On the other hand, FIG. 17 is a diagram showing an example of a terminal game image displayed on the terminal device 7 in the third game example. The terminal game image shown in FIG. 17 is an image primarily for the second player. That is, the terminal game image represents the game space showing the batter 141 which is the object to be controlled by the first player as seen from the side of the pitcher 142 which is the object to be controlled by the second player. Specifically, in step S27, the CPU 10 controls the second virtual camera used for generating the terminal game image based on the attitude of the terminal device 7. The attitude of the second virtual camera is calculated so as to correspond to the attitude of the terminal device 7, as in the second game example described above. The position of the second virtual camera is fixed at a predetermined position. Note that the terminal game image includes a cursor 143 for indicating the direction in which the pitcher 142 is throwing the ball.

Note that the method by which the batter 141 is controlled by the first player, and the method by which the pitcher 142 is controlled by the second player may be any method. For example, the CPU 10 may detect a swing operation on the controller 5 based on output data of the inertia sensor of the controller 5, and have the batter 141 swing the bat in response to the swing operation. For example, the CPU 10 may move the cursor 143 in accordance with an operation on the analog stick 53, and have the pitcher 142 throw the ball to a position indicated by the cursor 143 when a predetermined one of the operation buttons 54 is pressed. The cursor 143 may be moved in accordance with the attitude of the terminal device 7, instead of an operation on the analog stick 53.

As described above, in the third game example, game images are generated from different viewpoints for the television 2 and for the terminal device 7, thus providing game images that are easy to view and easy to operate with for the respective players.

In the third game example, two virtual cameras are set in a single game space so as to display two types of game images of the game space as seen from the virtual cameras (FIGS. 16 and 17). Therefore, for the two types of game images generated in the third game example, most of the game processes performed on the game space (e.g., controlling an object in the game space) are common, and the game images can be generated simply by performing the drawing process twice on a common game space, thus providing an advantage that the process efficiency is higher than when the game processes are performed separately.

In the third game example, since the cursor 143 representing the pitching direction is displayed only on the side of the terminal device 7, the first player cannot see the position indicated by the cursor 143. Therefore, the game does not have such a problem that the first player gets to know the pitching direction to the disadvantage of the second player. Thus, in the present embodiment, if there is a problem in the game for one player if the other player sees a game image, the game image can be displayed on the terminal device 7. Thus, it is possible to prevent a problem of, for example, detracting from the strategic aspect of the game. Note that in other embodiments, the game device 3 may display the terminal game image on the television 2 along with the television game image depending on the content of the game (e.g., where no such problem as described above occurs even if the terminal game image is seen by the first player).

(Fourth Game Example)

Figure 18:
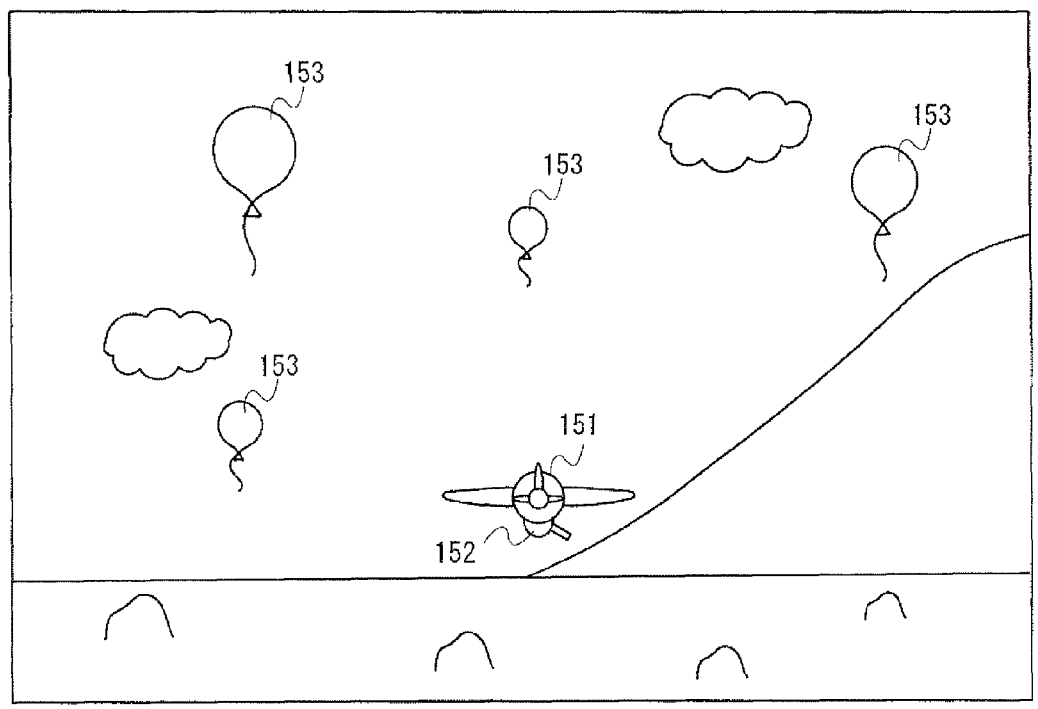
FIG. 18 is a diagram showing an example of a television game image displayed on the television 2 in the fourth game example.
Figure 19:
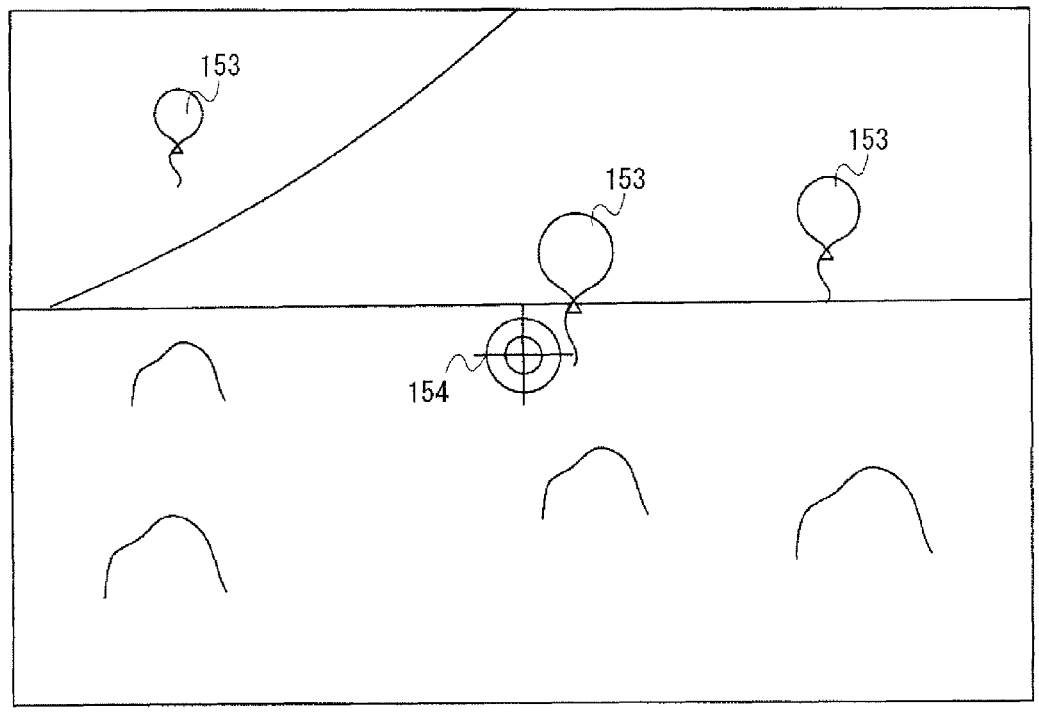
FIG. 19 is a diagram showing an example of a terminal game image displayed on the terminal device 7 in the fourth game example.

Referring now to FIGS. 18 and 19, the fourth game example will be described. The fourth game example is a shooting game of such a format where two players cooperate with each other. That is, the first player uses the controller 5 to perform an operation of moving an airplane, and the second player uses the terminal device 7 to perform an operation of controlling the cannon-firing direction of the airplane. In the fourth game example, as in the third game example, game images that are easy for the respective players to perform game operations with are displayed on the television 2 and on the terminal device 7.

FIG. 18 is a diagram showing an example of a television game image displayed on the television 2 in the fourth game example. FIG. 19 is a diagram showing an example of a terminal game image displayed on the terminal device 7 in the fourth game example. As shown in FIG. 18, an airplane (airplane object) 151 and a target (balloon object) 153 appear in the virtual game space in the fourth game example. The airplane 151 has a cannon (cannon object) 152.

As shown in FIG. 18, an image of the game space including the airplane 151 is displayed as the television game image. The first virtual camera for generating the television game image is set so as to produce an image of the game space showing the airplane 151 as seen from behind. That is, the first virtual camera is placed behind the airplane 151 at such an attitude that the airplane 151 is included in the image-capturing range (range of viewing field). The first virtual camera is controlled so as to be moved in accordance with the movement of the airplane 151. That is, in the process of step S27, the CPU 10 controls the movement of the airplane 151 based on the controller operation data, and also controls the position and the attitude of the first virtual camera. Thus, the position and the attitude of the first virtual camera are controlled in accordance with the operation of the first player.

On the other hand, as shown in FIG. 19, an image of the game space as seen from the airplane 151 (more specifically, the cannon 152) is displayed as the terminal game image. Therefore, the second virtual camera for generating the terminal game image is placed at the position of the airplane 151 (more specifically, the position of the cannon 152). In the process of step S27, based on the controller operation data, the CPU 10 controls the movement of the airplane 151 and also controls the position of the second virtual camera. Note that the second virtual camera may be placed at a position around the airplane 151 or the cannon 152 (e.g., a position slightly behind the cannon 152). As described above, the position of the second virtual camera is controlled by the operation of the first player (operating the movement of the airplane 151). Therefore, in the fourth game example, the first virtual camera and the second virtual camera move in cooperation with each other.

An image of the game space as seen in the firing direction of the cannon 152 is displayed as the terminal game image. Here, the firing direction of the cannon 152 is controlled so as to correspond to the attitude of the terminal device 7. That is, in the present embodiment, the attitude of the second virtual camera is controlled so that the line-of-sight direction of the second virtual camera coincides with the firing direction of the cannon 152. In the process of step S27, the CPU 10 controls the orientation of the cannon 152 and the attitude of the second virtual camera in accordance with the attitude of the terminal device 7 calculated in step S24. Thus, the attitude of the second virtual camera is controlled by the operation of the second player. The second player can change the firing direction of the cannon 152 by changing the attitude of the terminal device 7.

Note that when firing a cannonball from the cannon 152, the second player presses a predetermined button of the terminal device 7. When the predetermined button is pressed, a cannonball is fired in the orientation of the cannon 152. In the terminal game image, a sight 154 is displayed at the center of the screen of the LCD 51, and the cannonball is fired in the direction indicated by the sight 154.

As described above, in the fourth game example, the first player operates the airplane 151 (so that it moves in the direction of an intended target 153, for example) while looking primarily at the television game image (FIG. 18) representing the game space viewing in the traveling direction of the airplane 151. On the other hand, the second player operates the cannon 152 while looking primarily at the terminal game image (FIG. 19) representing the game space viewing in the firing direction of the cannon 152. Thus, in the fourth game example, in a game of such a format where two players cooperate with each other, game images that are easy to view and easy to operate with for the respective players are displayed on the television 2 and on the terminal device 7.

In the fourth game example, the positions of the first virtual camera and the second virtual camera are controlled by the operation of the first player, and the attitude of the second virtual camera is controlled by the operation of the second player. That is, in the present embodiment, the position or the attitude of a virtual camera changes in accordance with the game operation by each player, thereby changing the display range of the game space to be displayed on each display device. Since the display range of the game space to be displayed on the display device changes in accordance with the operation of each player, each player can realize that one's game operation is sufficiently reflected in the progress of the game, and can thus enjoy the game sufficiently.

Note that in the fourth game example, a game image as seen from behind the airplane 151 is displayed on the television 2, and a game image as seen from the position of the cannon of the airplane 151 is displayed on the terminal device 7. Here, in other game examples, the game device 3 may display a game image as seen from behind the airplane 151 on the terminal device 7, and a game image as seen from the position of the cannon 152 of the airplane 151 on the television 2. Then, the roles of the players are switched around from the fourth game example so that the first player uses the controller 5 to operate the cannon 152 while the second player uses the terminal device 7 to operate the airplane 151.

(Fifth Game Example)

Figure 20:
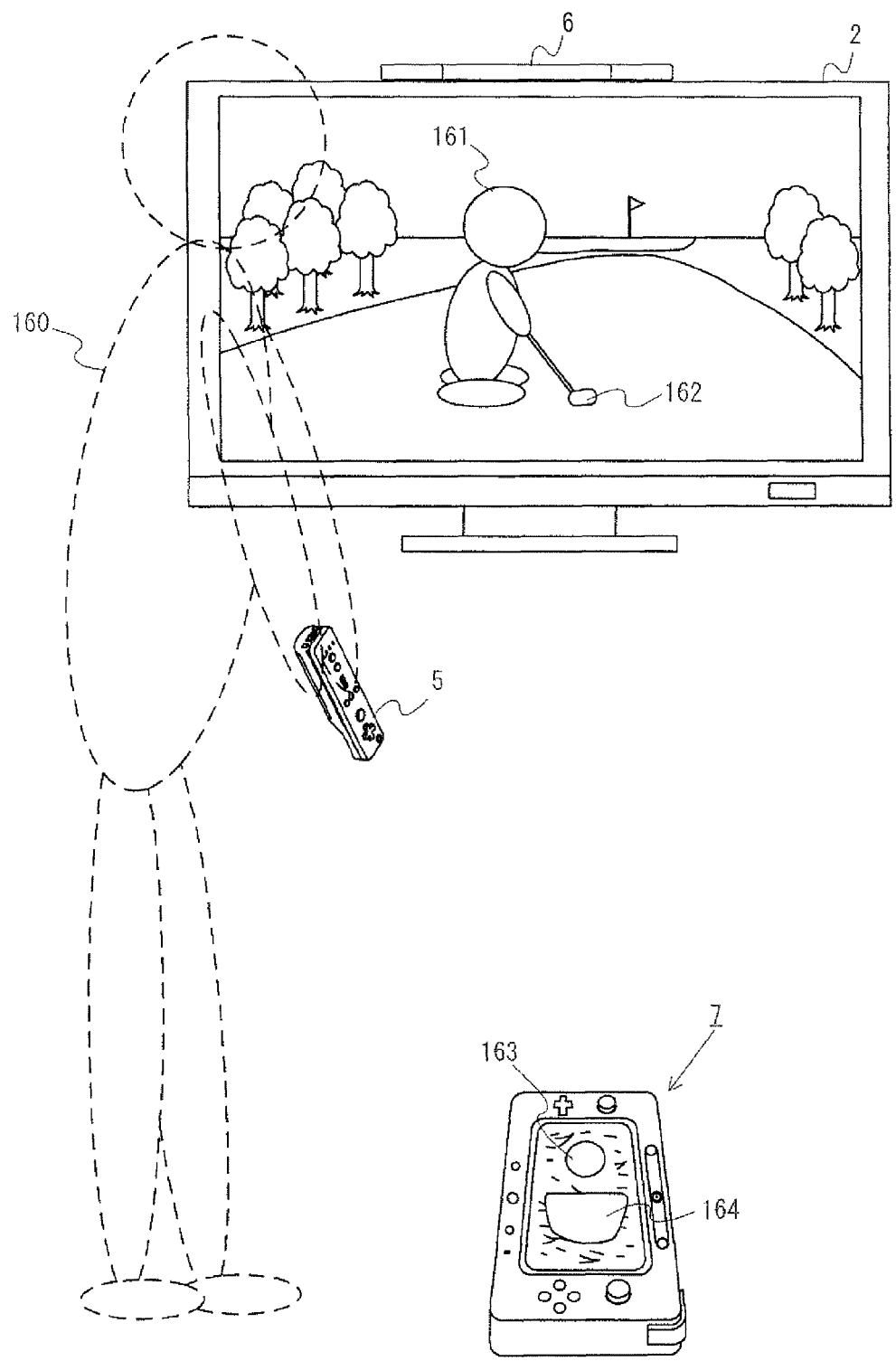
FIG. 20 is a diagram showing how the game system 1 is used in the fifth game example.

Referring now to FIG. 20, the fifth game example will be described. The fifth game example is a game in which a player uses the controller 5 to perform an operation, and the terminal device 7 is used as a display device, not as a controller device. Specifically, the fifth game example is a golf game, wherein the game device 3 has a player character in the virtual game space take a golf swing in accordance with the player performing an operation (swing operation) of swinging the controller 5 as if it were a golf club.

FIG. 20 is a diagram showing how the game system 1 is used in the fifth game example. In FIG. 20, an image of the game space including (an object of) a player character 161 and (an object of) a golf club 162 is displayed on the screen of the television 2. Note that (an object of) a ball 163 placed in the game space is also displayed on the television 2 though it is not shown in FIG. 20 as being hidden behind the golf club 162. On the other hand, as shown in FIG. 20, the terminal device 7 is placed on the floor surface in front of the television 2 so that the screen of the LCD 51 is facing vertically upward. An image representing the ball 163, an image representing a part of the golf club 162 (specifically, a head 162a of the golf club), and an image representing the ground of the game space are displayed on the terminal device 7. The terminal game image is an image of the vicinity of the ball as seen from above.

When playing the game, a player 160 stands near the terminal device 7, and performs a swing operation of swinging the controller 5 as if it were a golf club. Then, in step S27, the CPU 10 controls the position and the attitude of the golf club 162 in the game space in accordance with the attitude of the controller 5 calculated in the process of step S23. Specifically, the golf club 162 is controlled so that the golf club 162 in the game space hits the ball 163 when the tip direction of the controller 5 (the Z-axis positive direction shown in FIG. 3) is pointing toward the image of the ball 163 displayed on the LCD 51.

When the tip direction of the controller 5 is pointing toward the LCD 51, an image (head image) 164 representing a part of the golf club 162 is displayed on the LCD 51 (see FIG. 20). Note that for the terminal game image, the image of the ball 163 may be shown in the actual size, and the orientation of the head image 164 may be shown to rotate in accordance with the rotation of the controller 5 about the Z axis, in order to enhance the reality. The terminal game image may be generated using a virtual camera provided in the game space, or generated using pre-prepared image data. When it is generated using pre-prepared image data, detailed and realistic images can be generated with low computational load without constructing the terrain model of a golf course in detail.

As a result of the player 160 performing the swing operation so as to swing the golf club 162, if the golf club 162 hits the ball 163, the ball 163 travels (flies). That is, the CPU 10 determines in step S27 whether the golf club 162 and the ball 163 have contacted each other, and moves the ball 163 when there has been a contact. Here, the television game image is generated so that the ball 163 after the travel is included therein. That is, the CPU 10 controls the position and the attitude of the first virtual camera for generating the television game image so that the traveling ball is included in the image-capturing range thereof. On the other hand, on the terminal device 7, when the golf club 162 hits the ball 163, the image of the ball 163 is moved and immediately disappears to the outside of the screen. Thus, in the fifth game example, the travel of the ball is displayed primarily on the television 2, and the player 160 can check, on the television game image, the destination of the ball hit by the swing operation.

As described above, in the fifth game example, the player 160 can swing the golf club 162 by swinging the controller 5 (have the player character 161 swing the golf club 162). Here, in the fifth game example, the golf club 162 in the game space is controlled to hit the ball 163 when the tip direction of the controller 5 is pointing toward the image of the ball 163 displayed on the LCD 51. Therefore, the player can perform the swing operation and thereby feel as if the player were taking a swing with an actual golf club, thus making the swing operation feel more realistic.

Moreover, in the fifth game example, the head image 164 is displayed on the LCD 51 when the tip direction of the controller 5 is pointing toward the terminal device 7. Therefore, as the player points the tip direction of the controller 5 toward the terminal device 7, the player can feel that the attitude of the golf club 162 in the virtual space corresponds to the attitude of the controller 5 in the real space, thus making the swing operation feel more realistic.

As described above, in the fifth game example, where the terminal device 7 is used as a display device, it is possible to make the operation using the controller 5 feel more realistic by locating the terminal device 7 at an appropriate position.

In the fifth game example, the terminal device 7 is placed on the floor surface, and an image representing the game space showing only the vicinity of the ball 163 is displayed on the terminal device 7. Therefore, the position/attitude of the entire golf club 162 in the game space cannot be displayed on the terminal device 7, and how the ball 163 travels after the swing operation cannot be displayed on the terminal device 7. In view of this, in the fifth game example, the entire golf club 162 is displayed on the television 2 before the ball 163 travels, and how the ball 163 travels is displayed on the television 2 after the ball 163 starts traveling. Thus, in the fifth game example, it is possible to provide the player with a realistic operation, and game images that are easy to view can be presented to the player by using two screens of the television 2 and the terminal device 7.

In the fifth game example, the marker section 55 of the terminal device 7 is used for calculating the attitude of the controller 5. That is, the CPU 10 lights the marker section 55 (does not light the marker device 6) in the initialization process of step S1, and the CPU 10 calculates the attitude of the controller 5 based on the marker coordinate data 96 in step S23. Then, it is possible to accurately determine whether the tip direction of the controller 5 is in an attitude pointing toward the marker section 55. Note that while steps S21 and S22 do not have to be performed in the fifth game example, a marker or markers to be lit may be changed in the middle of the game in other game examples by performing the process of steps S21 and S22. For example, the CPU 10 may determined in step S21 whether the tip direction of the controller 5 is pointing in the direction of gravity based on the first acceleration data 94, and in step S22, the CPU 10 may light the marker section 55 if it is pointing in the direction of gravity and light the marker device 6 if it is not pointing in the direction of gravity. Then, where the tip direction of the controller 5 is pointing in the direction of gravity, the attitude of the controller 5 can be calculated with high precision by obtaining marker coordinate data of the marker section 55, and where the tip direction of the controller 5 is pointing toward the television 2, the attitude of the controller 5 can be calculated with high precision by obtaining marker coordinate data of the marker device 6.

As described above in the fifth game example, in the game system 1, the terminal device 7 canoe placed at an arbitrary position and used as a display device. Then, where the marker coordinate data is used as a game input, the controller 5 can be used while pointing in an arbitrary direction by setting the terminal device 7 at an intended position, in addition to using the controller 5 while pointing toward the television 2. That is, according to the present embodiment, since the orientation in which the controller 5 is used is not limited to any particular orientation, it is possible to improve the degree of freedom in operations to be performed on the controller 5.

[7. Other Operation Examples of Game System]

In the game system 1, it is possible to perform operations for playing various games as described above. While the terminal device 7 can be used as a portable display or a second display, it may also be used as a controller for making a touch input or a motion-based input, and it is therefore possible to realize a wide variety of games with the game system 1. Operations as follows can also be performed, including applications other than games.

(Operation Example where Player Plays Game Only Using Terminal Device 7)

In the present embodiment, the terminal device 7 can function as a display device and can also function as a controller device. Therefore, one can use the terminal device 7 like a portable game device by using the terminal device 7 as display means and as operation means and without using the television 2 and the controller 5.

Specifically, according to the game process shown in FIG. 12, the CPU 10 obtains the terminal operation data 97 from the terminal device 7 in step S3, and performs a game process using only the terminal operation data 97 as a game input (without using the controller operation data) in step S4. Then, a game image is generated in step S6, and the game image is transmitted to the terminal device 7 in step S10. Note that steps S2, S5 and S9 may not be performed. Thus, a game process is performed in accordance with an operation on the terminal device 7, and a game image representing the game process results is displayed on the terminal device 7. Then, the terminal device 7 can be used as a portable game device (though the game process is actually performed by the game device). Therefore, according to the present embodiment, the user can play a game using the terminal device 7 even in a case where a game image cannot be displayed on the television 2 for reasons such as the television 2 being used (e.g., someone else watching a TV broadcast).

Note that in addition to the game image, the CPU 10 may transmit an image of the menu screen described above to be displayed after power-up to the terminal device 7 so that the image is displayed thereon. This is convenient because the player can play a game without using the television 2 from the beginning.

Moreover, in the above description, the display device on which the game image is displayed can be changed from the terminal device 7 to the television 2 in the middle of the game. Specifically, the CPU 10 can further perform step S9 to output the game image to the television 2. Note that the image to be outputted to the television 2 in step S9 is the same as the game image to be transmitted to the terminal device 7 in step S10. Then, by switching the input of the television 2 so that the input from the game device 3 is displayed thereon, the same game image as that on the terminal device 7 is displayed on the television 2. Thus, the display device on which the game image is displayed can be changed to the television 2. Note that after the game image is displayed on the television 2, the display of the screen of the terminal device 7 may be turned OFF.

Note that the game system 1 may be such that the infrared remote controller signal for the television 2 can be outputted from infrared outputting means (the marker device 6, the marker section 55 or the infrared communication module 72). Then, the game device 3 can perform an operation on the television 2 by outputting the infrared remote controller signal from the infrared outputting means in accordance with an operation on the terminal device 7. In such a case, since the user can operate the television 2 by using the terminal device 7 without operating the remote controller of the television 2, it is convenient when, for example, switching the input of the television 2 from one to another as described above.

(Operation Example where System Communicates with Another Device Via Network)

Figure 21:
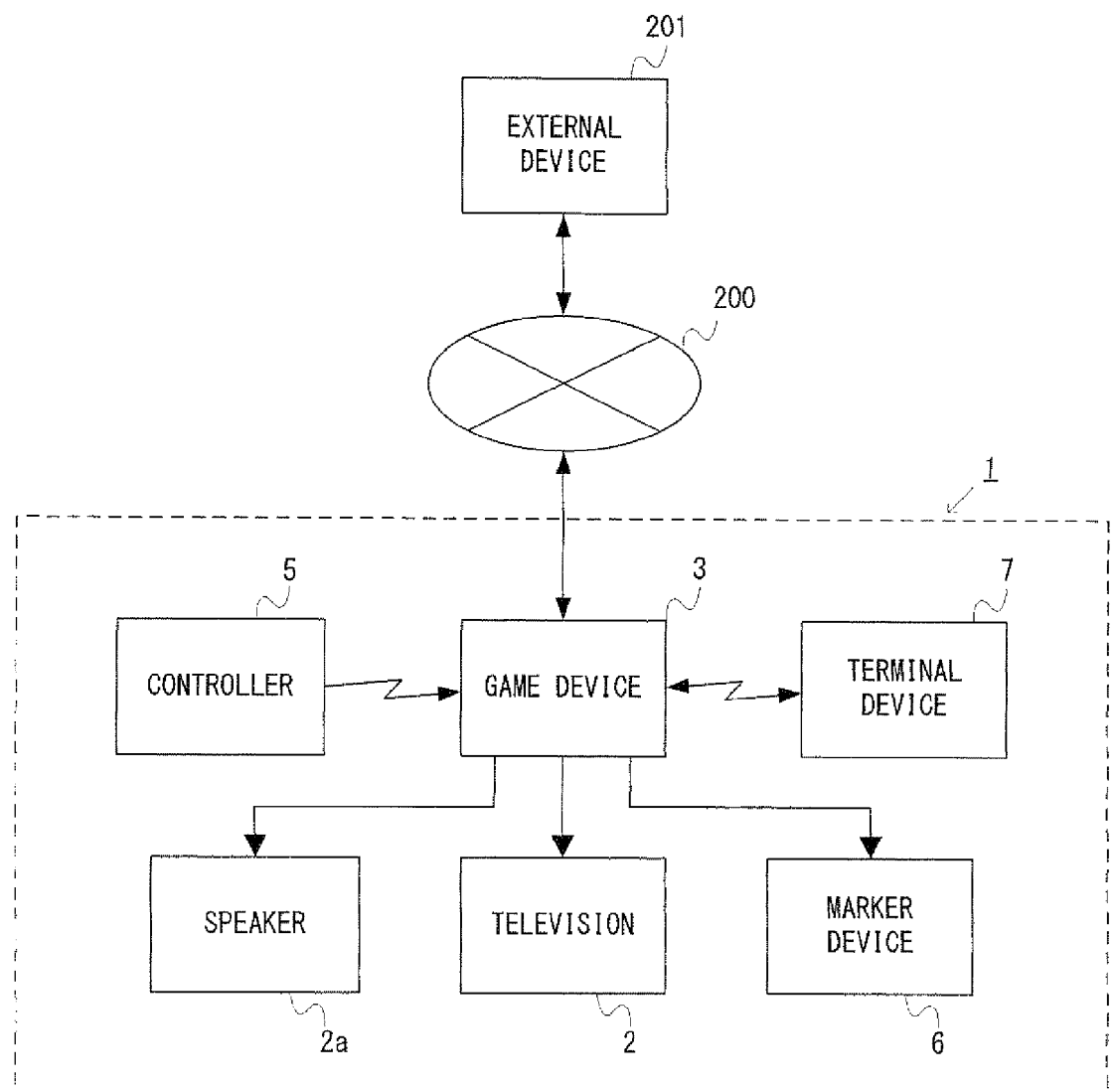
FIG. 21 is a diagram showing how devices included in the game system 1 are connected with one another in a case where the game system 1 is connected to an external device via a network.

Since the game device 3 has a network connection function as described above, the game system 1 can be used in a case where it communicates with an external device via a network. FIG. 21 is a diagram showing how devices included in the game system 1 are connected with one another in a case where the game system 1 is connected to an external device via a network. As shown in FIG. 21, the game device 3 can communicate with an external device 201 via a network 200.

Where the external device 201 and the game device 3 can communicate with each other as described above, the game system 1 can communicate with the external device 201 using the terminal device 7 as an interface. For example, the game system 1 can be used, as a video telephone by exchanging image and sound between the external device 201 and the terminal device 7. Specifically, the game device 3 receives the image and sound from the external device 201 (the image and the sound of the other person) via the network 200, and transmits the received image and sound to the terminal device 7. Then, the terminal device 7 displays the image from the external device 201 on the LCD 51 and outputs from the speaker 67 the sound from the external device 201. The game device 3 receives from the terminal device 7 the camera image captured by the camera 56 and the microphone sound detected by the microphone 69, and transmits the camera image and the microphone sound to the external device 201 via the network 200. The game system 1 can be used as a video telephone as the game device 3 repeats the exchange of the image and the sound described above with the external device 201.

Note that since the terminal device 7 is portable in the present embodiment, the user can use the terminal device 7 at an arbitrary position or direct the camera 56 in an arbitrary direction. In the present embodiment, since the terminal device 7 includes the touch panel 52, the game device 3 can transmit the input information made on the touch panel 52 (the touch position data 100) to the external device 201. For example, the game system 1 can be used as a so-called e-learning system when outputting from the terminal device 7 the image and sound from the external device 201, and transmitting characters, etc., the user has written on the touch panel 52 to the external device 201.

(Operation Example where System Cooperates with TV Broadcasting)

The game system 1 can also operate in cooperation with TV broadcasting when a TV broadcast is being watched on the television 2. That is, when a TV program is being watched on the television 2, the game system 1 can output on the terminal device 7 information regarding the TV program, etc. An operation example where the game system 1 operates in cooperation with TV broadcasting will now be described.

In the operation example described above, the game device 3 can communicate with a server via a network (in other words, the external device 201 shown in FIG. 21 is the server). The server stores, for each channel of TV broadcasting, various information relating to TV broadcasting (TV information). The TV information may be program-related information such as subtitles and cast information, EPG (Electronic Program Guide) information, or information to be broadcast as a data broadcast. The TV information may be image, sound, text, or information of a combination thereof. The number of servers does not need to be one, a server may be provided for each channel or each program of TV broadcasting, and the game device 3 may be able to communicate with the servers.

Where video/sound of a TV broadcast is being outputted from the television 2, the game device 3 prompts the user to input the channel of the TV broadcast being watched by using the terminal device 7. Then, a request is given via the network to the server to transmit TV information corresponding to the inputted channel. In response to this, the server transmits data of TV information corresponding to the channel. When receiving data transmitted from the server, the game device 3 outputs the received data to the terminal device 7. The terminal device 7 displays image and text data of that data on the LCD 51, and outputs sound data from the speaker. As described above, the user can enjoy information relating to the TV program being watched currently, etc., using the terminal device 7.

As described above, the game system 1 can communicate with an external device (server) via a network so that information linked to TV broadcasting can be presented to the user by the terminal device 7. Particularly, this gives great convenience since the terminal device 7 is portable in the present embodiment, and the user can use the terminal device 7 at an arbitrary position.

As described above, in the present embodiment, the user can use the terminal device 7 in various applications/forms, in addition to game applications.

[8. Variations]

The above embodiment is an example of how the present invention can be carried out, and the present invention may also be carried out with, for example, the following configurations in other embodiments.

(Variation Using Plurality of Terminal Devices)

While the game system 1 includes only one terminal device in the above embodiment, the game system 1 may include a plurality of terminal devices. That is, the game device 3 may be able to wirelessly communicate with each of a plurality of terminal devices, wherein the game device 3 transmits game image data, game sound data and control data to each terminal device, and receives operation data, camera image data and microphone sound data from each terminal device. Note that while the game device 3 wirelessly communicates with the plurality of terminal devices, the game device 3 can realize the wireless communication with the terminal devices by time division multiple access or frequency division multiple access.

In a case where there are a plurality of terminal devices as described above, a greater variety of games can be played using the game system. For example, where the game system 1 includes two terminal devices, the game system 1 has three display devices, and the game system 1 can therefore generate game images for the three players and display the game images on the respective display devices. Where the game system 1 includes two terminal devices, two players can simultaneously play a game in which a controller and a terminal device are used as a set (e.g., the fifth game example). Moreover, where the game process of step S27 is performed based on marker coordinate data outputted from two controllers, two players can each perform a game operation while pointing the controller toward the marker (the marker device 6 or the marker section 55). That is, one player can perform a game operation while pointing the controller toward the marker device 6, and the other player can perform a game operation while pointing the controller toward the marker section 55.

(Variation Regarding Function of Terminal Device)

In the above embodiment, the terminal device 7 functions as a so-called thin client terminal, and does not perform the game process. Here, in other embodiments, some of a series of game processes performed by the game device 3 in the above embodiment may be performed by other devices such as the terminal device 7. For example, some processes (e.g., the process of generating the terminal game image) may be performed by the terminal device 7. For example, in a game system including a plurality of information processing devices (game devices) that can communicate with each other, the game processes may be divided among the plurality of information processing devices.

Industrial Applicability

As described above, the present invention is applicable to, for example, a game system, a terminal device used in a game system, etc., aiming at, for example, making the player perform a novel game operation.

DESCRIPTION OF THE REFERENCE NUMERALS

1: Game system
2: Television
3: Game device
4: Optical disc
5: Controller
6: Marker device
7: Terminal device
10: CPU
11e: Internal main memory
12: External main memory
19: Controller communication module
28: Terminal communication module
35: Image capturing/processing section
37: Acceleration sensor
44: Wireless module
48: Gyrosensor
51: LCD
52: Touch panel
53: Analog stick
54: Operation button
55: Marker section
56: Camera
62: Magnetic sensor
63: Acceleration sensor
64: Gyrosensor
66: Codec LSI
67: Speaker
69: Microphone
70: Wireless module
92: Controller operation data
97: Terminal operation data
98: Camera image data
105: Microphone sound data

The invention claimed is:

1. A game system comprising a home-console type game device, a controller device and a portable display device,
the game device comprising:
an operation data reception section for receiving operation data from the controller device;
a game process section for performing a game process based on the operation data;
a game image generation section for successively generating first game images based on the game process;
a game image compression section for successively compressing the first game images to generate compressed image data; and
a data transmission section for successively wirelessly transmitting the compressed image data to the portable display device,
the controller device comprising:
an image-capturing section capable of detecting infrared light;
an inertia sensor;
at least one operation button; and
an operation data transmission section for wirelessly transmitting the operation data to the game device, wherein the operation data includes data representing a detection result from the image-capturing section, data representing a detection result from the inertia sensor, and data representing an operation performed on the operation button,
the portable display device comprising:
an infrared light-emitting portion capable of emitting infrared light;
a game image reception section for successively receiving the compressed image data from the game device;
a game image expansion section for successively expanding the compressed image data to obtain the first game images; and
a display section for successively displaying the first game images obtained by the expansion.

2. The game system according to claim 1, wherein:
the game system further comprises a marker device capable of emitting infrared light;
the game image generation section further generates second game images based on the game process; and
the game device further comprises:
an image outputting section for successively outputting the second game images to an external display device which is separate from the portable display device; and
a light emission control section for controlling the light emission of the marker device.

3. The game system according to claim 2, wherein:
the game system includes two controller devices; and
the game process section performs the game process based on operation data received from the controller devices.

4. The game system according to claim 2, wherein the light emission control section controls the light emission of the marker device and the infrared light-emitting portion in accordance with content of the game process.

5. The game system according to claim 4, wherein:
the light emission control section generates control data representing control instructions for light emission of the infrared light-emitting portion;
the data transmission section wirelessly transmits the control data to the portable display device;
the portable display device further comprises a control data reception section for receiving the control data from the game device; and
the infrared light-emitting portion operates based on the received control data.

6. A portable display device capable of wirelessly communicating with a game device, comprising:
an infrared light-emitting portion capable of emitting infrared light;
a game image reception section for successively receiving compressed image data from the game device;

a game image expansion section for successively expanding the compressed image data to obtain game images; and a display section for successively displaying the game images obtained by the expansion, wherein the game device receives, from a controller device including an image-capturing section capable of detecting infrared light, data representing a detection result of the image-capturing section, and the game device successively transmits, to the display device, the compressed image data which is obtained by compressing game images generated based on a game process performed based on the detection result data.

7. The display device according to claim 6, further comprising:

a touch panel provided on a screen of the display section;

an inertia sensor; and an operation data transmission section for wirelessly transmitting to the game device operation data including output data of the touch panel and the inertia sensor, wherein the game device performs the game process based on the operation data.

8. The display device according to claim 6, wherein:

the game device wirelessly transmits a game sound generated based on the game process to the display device; and the display device further comprises:

a game sound reception section for receiving the game sound from the game device; and a speaker for outputting the game sound received by the game sound reception section.

9. The display device according to claim 7, wherein:

the display device further comprises a microphone; and the operation data transmission section further wirelessly transmits data of sound detected by the microphone to the game device.

10. The display device according to claim 7, further comprising:

a camera; and a camera image compression section for compressing a camera image captured by the camera to generate compressed captured image data, wherein the operation data transmission section further wirelessly transmits the compressed captured image data to the game device.

11. The display device according to claim 7, further comprising:

a plurality of front surface operation buttons provided on a front surface of the display device, on which a screen of the display section is provided, on opposite sides of the screen; and direction input sections capable of specifying directions, provided on the front surface on opposite sides of the screen, wherein the operation data further comprises data representing operations performed on the plurality of front surface operation buttons and the direction input sections.

12. The display device according to claim 7, further comprising:

a plurality of back surface operation buttons provided on a back surface of the display device opposite to a front surface of the display device, on which the screen of the display section is provided; and a plurality of side surface operation buttons provided on a side surface between the front surface and the back surface, wherein the operation data further comprises data representing operations performed on the plurality of back surface operation buttons and the side surface operation buttons.

13. The display device according to claim 7, further comprising a magnetic sensor, wherein the operation data further comprises data of a detection result of the magnetic sensor.

14. The display device according to claim 7, wherein the inertia sensor includes a 3-axis acceleration sensor and a 3-axis gyrosensor.

15. A game process method carried out in a game system comprising a home-console type game device, a controller device and a portable display device, wherein:

the portable display device comprises an infrared light-emitting portion capable of emitting infrared light;

the controller device includes an image-capturing section capable of detecting infrared light, an inertia sensor and at least one operation button, and performs an operation data transmission step of wirelessly transmitting operation data to the game device, wherein the operation data includes data representing a detection result of the image-capturing section, data representing a detection result of the inertia sensor, and data representing an operation performed on the operation button; and the game device performs functionality comprising:

an operation data reception step of receiving operation data from the controller device;

a game process step of performing a game process based on the operation data;

a game image generation step of successively generating first game images based on the game process;

a game image compression step of successively compressing the first game images to generate compressed image data; and a data transmission step of successively wirelessly transmitting the compressed image data to the portable display device; and the portable display device performs functionality comprising:

a game image reception step of successively receiving the compressed image data from the game device;

a game image expansion step of successively expanding the compressed image data to obtain the first game images; and a display step of successively displaying the first game images obtained by the expansion.

* * * * *